(12) United States Patent
Sasaki

(10) Patent No.: US 6,605,196 B2
(45) Date of Patent: Aug. 12, 2003

(54) METHOD OF FORMING MAGNETIC LAYER PATTERN AND METHOD OF MANUFACTURING THIN FILM MAGNETIC HEAD

(75) Inventor: Yoshitaka Sasaki, Chuo-ku (JP)

(73) Assignee: TDK Corporation, Tokyo (JP)

(*) Notice: Subject to any disclaimer, the term of this patent is extended or adjusted under 35 U.S.C. 154(b) by 92 days.

(21) Appl. No.: 09/836,203

(22) Filed: Apr. 18, 2001

(65) Prior Publication Data

US 2001/0035357 A1 Nov. 1, 2001

(30) Foreign Application Priority Data

Apr. 21, 2000 (JP) ......................................... 2000-121300

(51) Int. Cl.$^7$ ........................... C23C 14/34; B05D 3/12; B44C 1/22; B24B 1/00; C25D 5/02
(52) U.S. Cl. ................... 204/192.12; 427/355; 427/402; 427/130; 427/131; 216/38; 216/22; 216/52; 216/67; 216/39; 451/29; 205/122; 205/922; 205/90; 205/255
(58) Field of Search ................................ 427/355, 402, 427/130, 131; 216/38, 22, 52, 67, 39; 451/29; 204/192.12; 205/122, 922, 90, 255

(56) References Cited

U.S. PATENT DOCUMENTS 6,115,216 A * 9/2000 Yoda et al. .................. 360/113
6,264,848 B1 * 7/2001 Belser et al. .................. 216/22

* cited by examiner

Primary Examiner—Steven H. VerSteeg
(74) Attorney, Agent, or Firm—Oliff & Berridge PLC

(57) ABSTRACT

Provided are a method of forming a magnetic layer pattern and a method of manufacturing a thin film magnetic head, which can reduce the number of manufacturing steps and thus reduce the manufacturing time. A precursory nonmagnetic layer and a precursory bottom pole layer are formed in this sequence so as to cover a frame pattern formed on an underlayer (a top shield layer) and having an opening. Then, the precursory nonmagnetic layer and the precursory bottom pole layer are patterned by polishing the overall surface by CMP until at least the frame pattern is exposed, and thus a nonmagnetic layer and a bottom pole are selectively formed. The number of manufacturing steps can be reduced and thus the manufacturing time can be reduced, as compared to the case of forming the nonmagnetic layer and the bottom pole without forming the frame pattern.

28 Claims, 37 Drawing Sheets

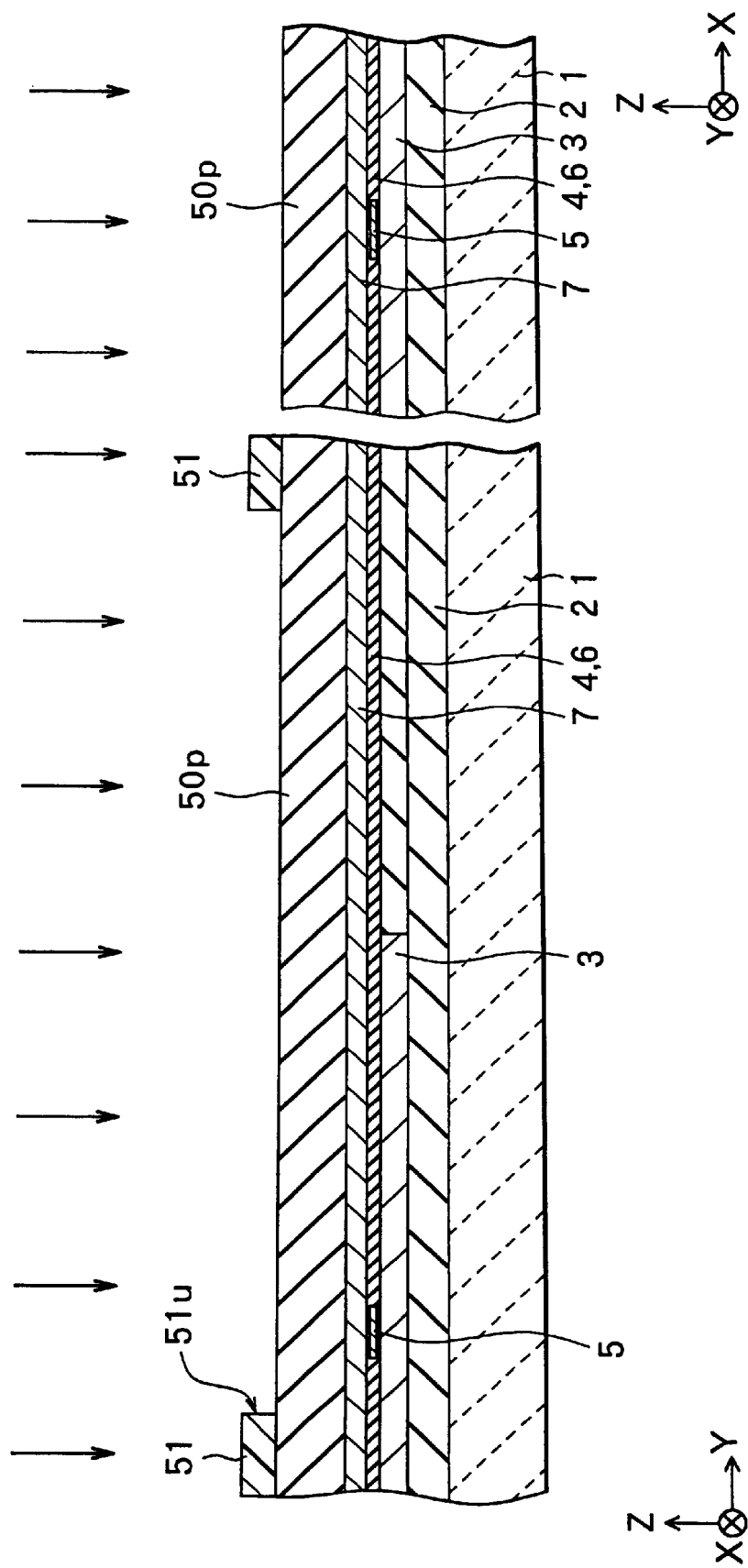

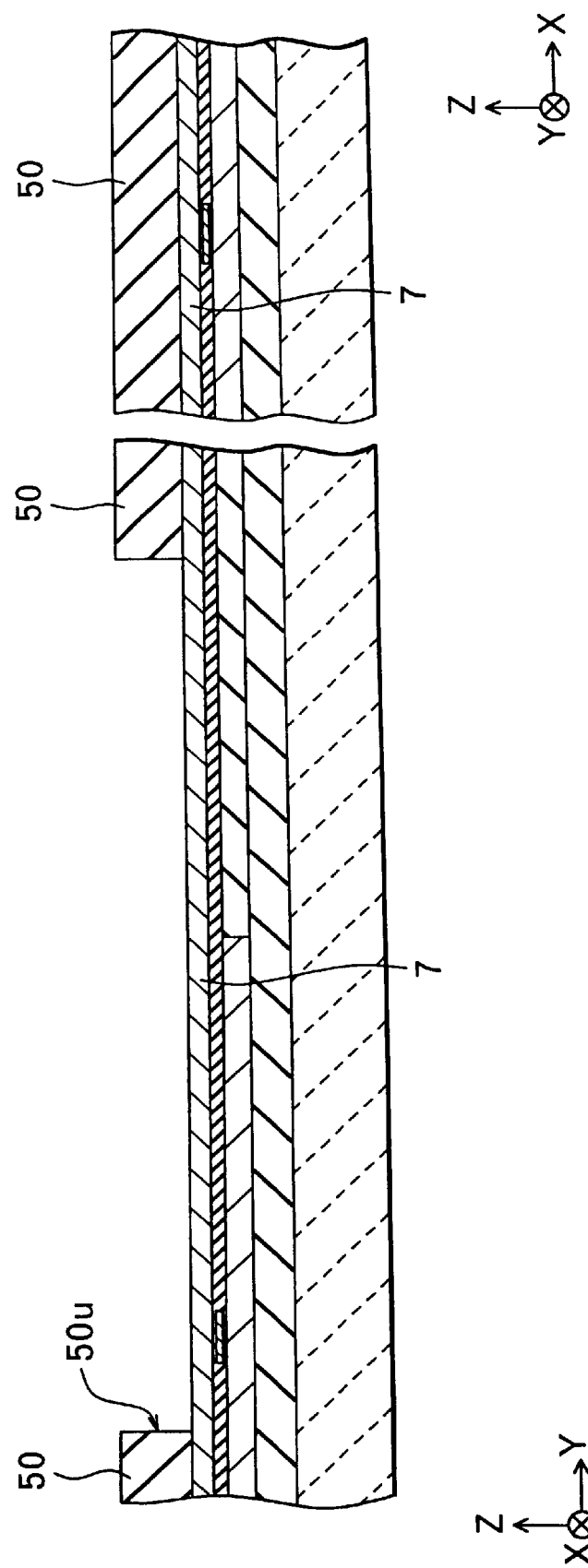

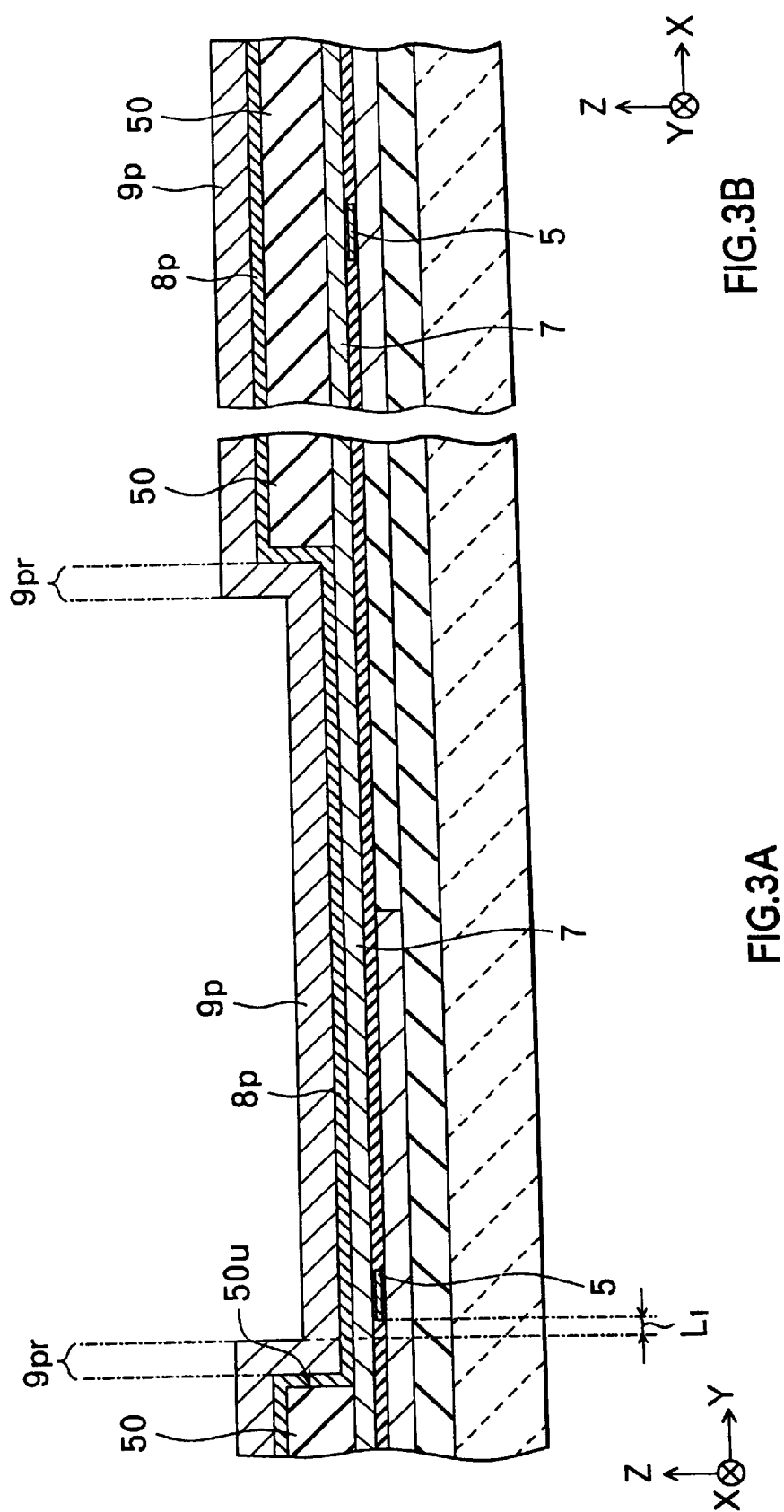

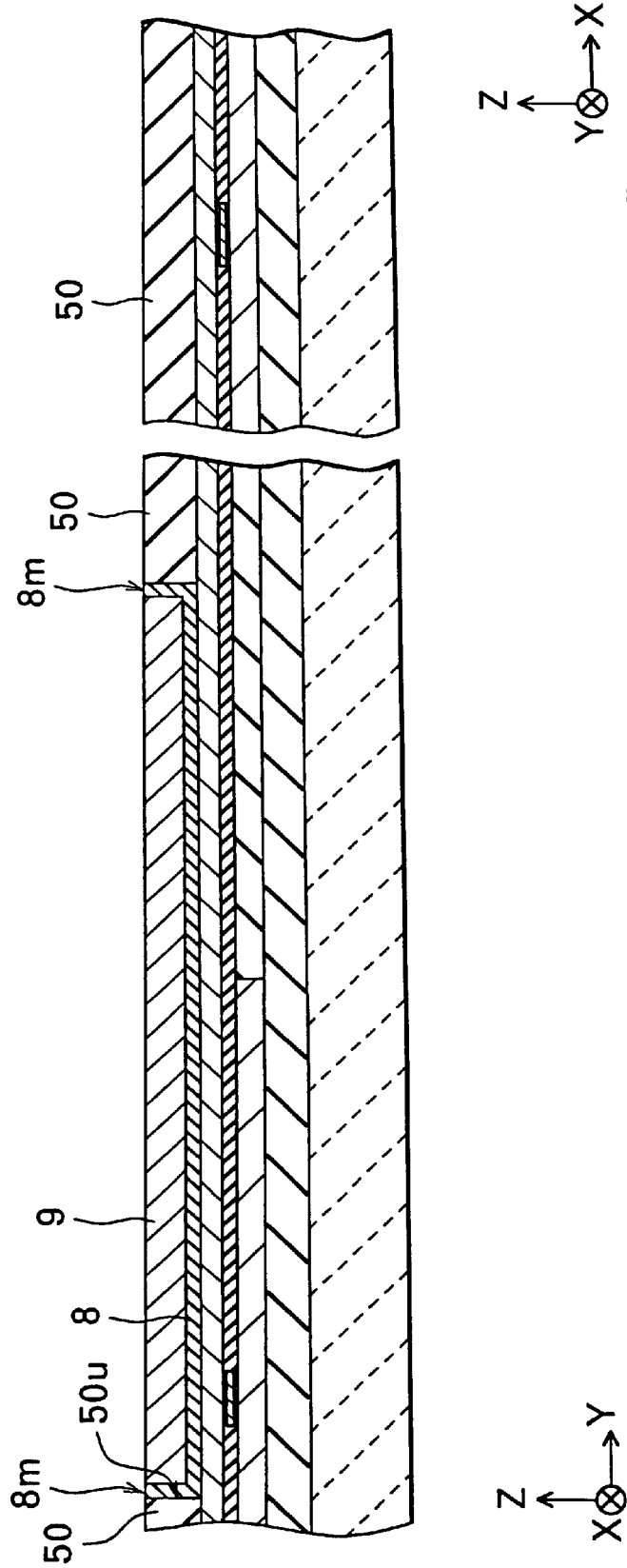

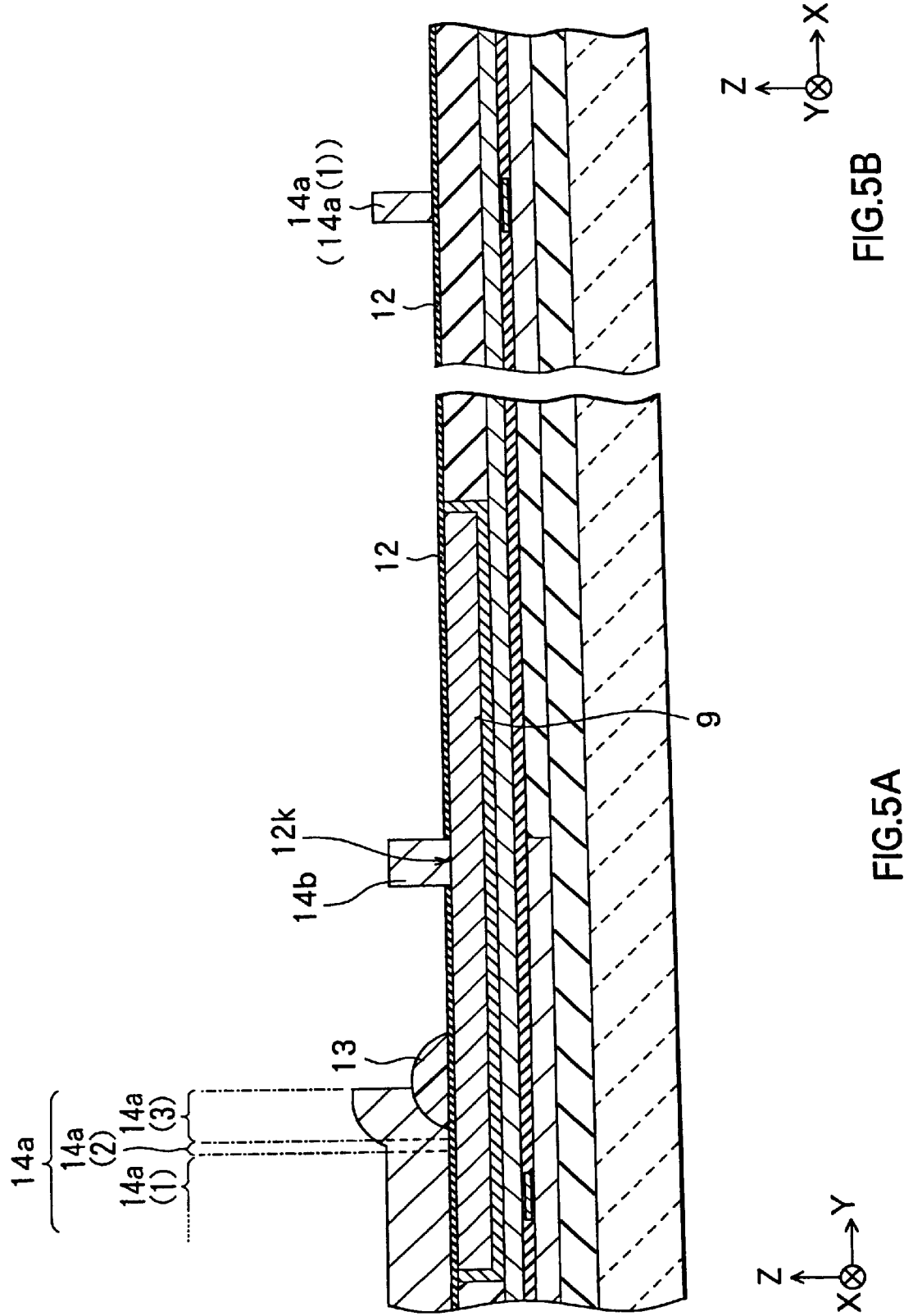

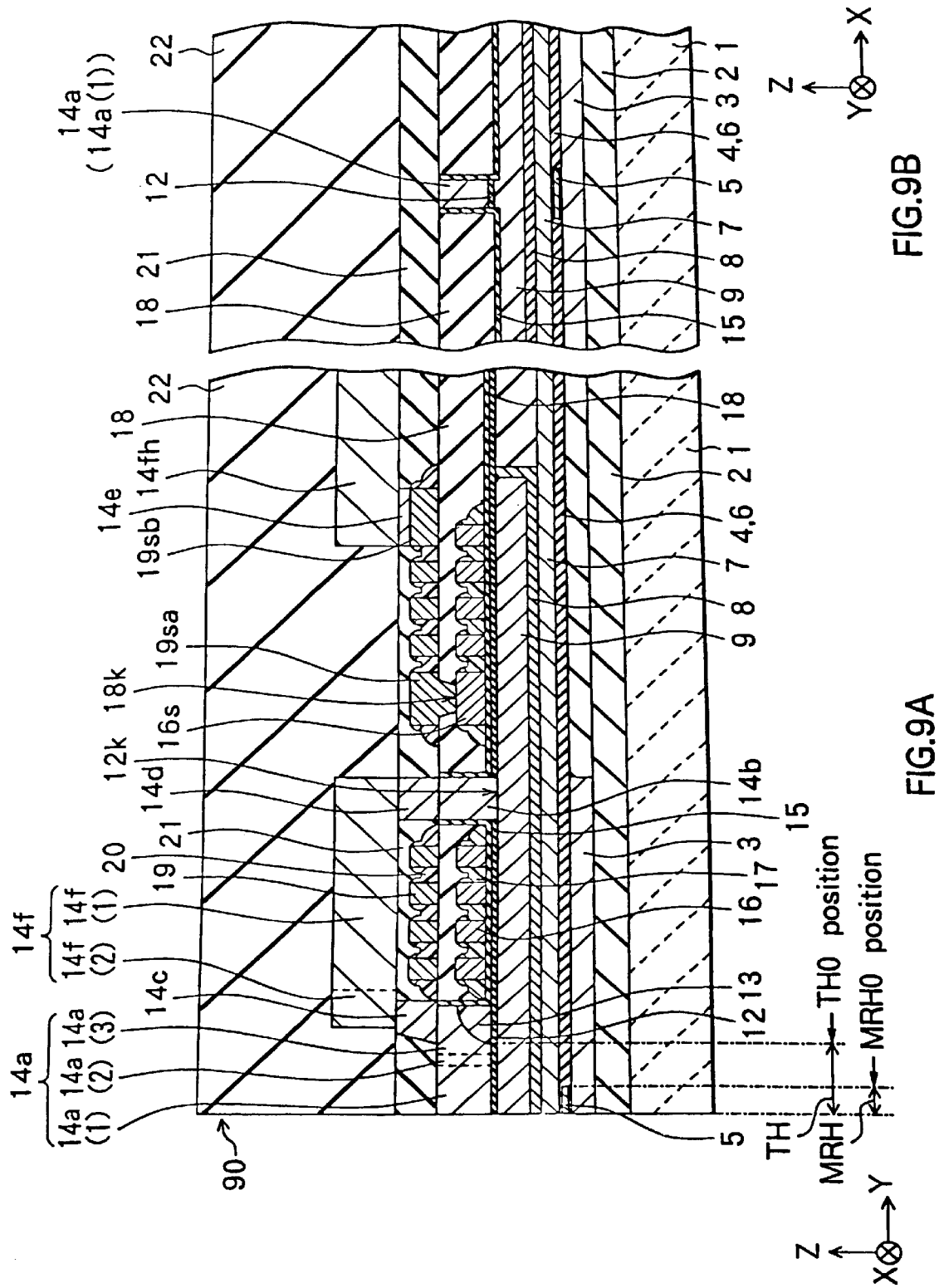

| Comparision | | Embodiment | |
|---|---|---|---|
| Step | Formed mask | Step | Formed mask |
| A1: formation of precursory nonmagnetic layer 81p | — | B1: formation of frame pattern 50 | Frame pattern 50 |
| A2: formation of electrode film 61 | — | B2: formation of precursory nonmagnetic layer 8p | — |
| A3: formation of photoresist pattern 62 | Photoresist pattern 62 | B3: formation of precursory bottom pole layer 9p | — |
| A4: formation of bottom pole 91 | — | B4: formation of nonmagnetic layer 8 and bottom pole 9 by CMP | — |
| A5: removal of photoresist pattern 62 | — | Total=4 steps | Total=1 mask |
| A6: formation of etching mask 63 | Etching mask 63 | | |
| A7: selsctive removal of electrode film 61, and formation of nonmagnetic layer 81 | — | | |
| Total=7 steps | Total=2 masks | | |

Frame plating (bracket covering A2–A4)

FIG.22

|  | Method of forming top shield layer | Method of forming precursory bottom pole layer | Change in number of manufacturing steps | Change in number of used masks |
|---|---|---|---|---|
| I | Frame plating | Sputtering | 13→10 | 4→3 |
| II | Frame plating | Electroplating | 13→10 | 4→3 |
| III | Sputtering | Sputtering | 13→5 | 4→1 |
| IV | Sputtering | Electroplating | 13→6 | 4→1 |

FIG.25

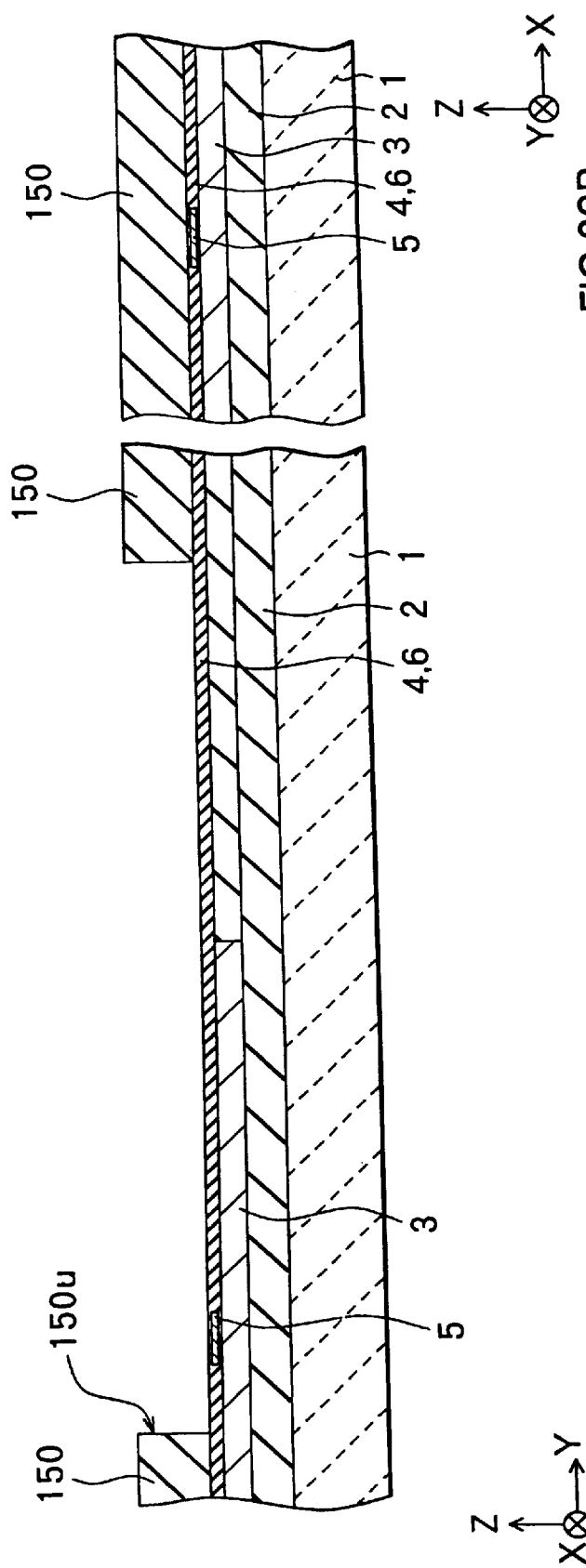

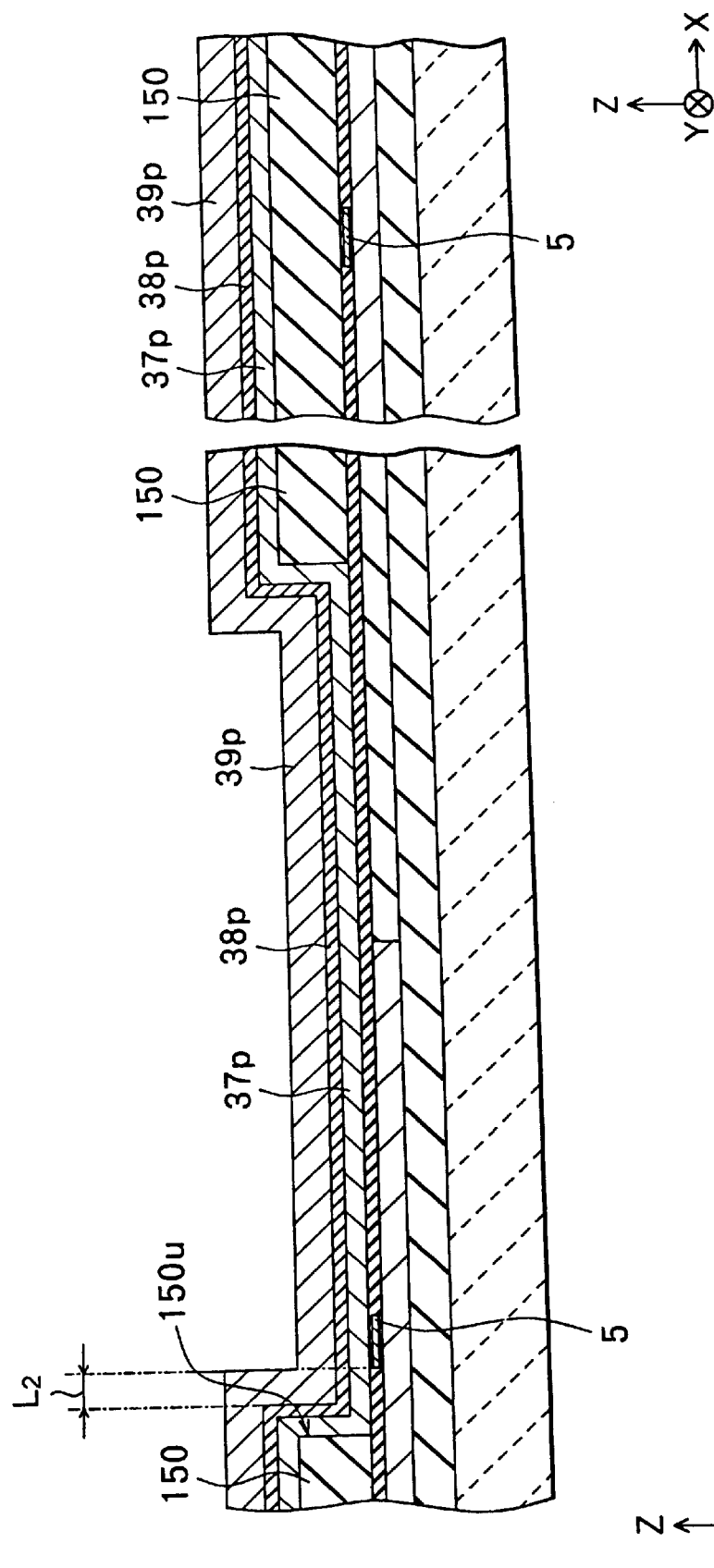

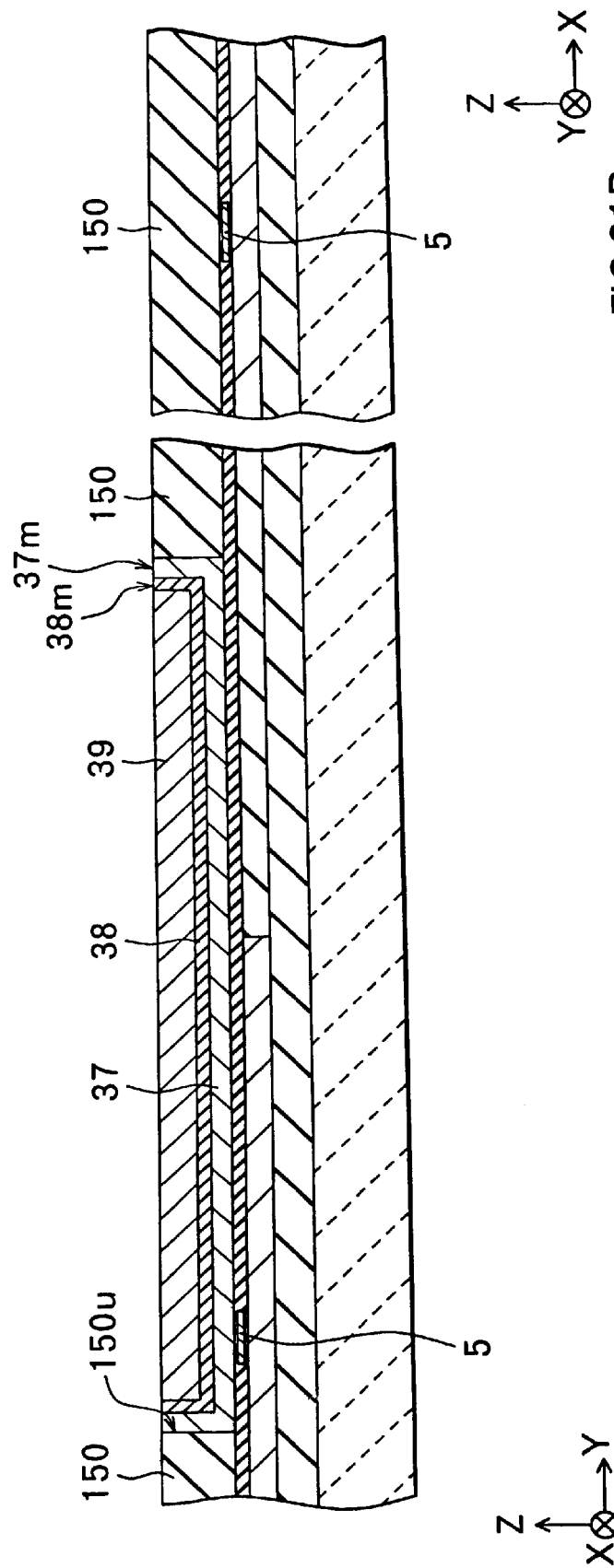

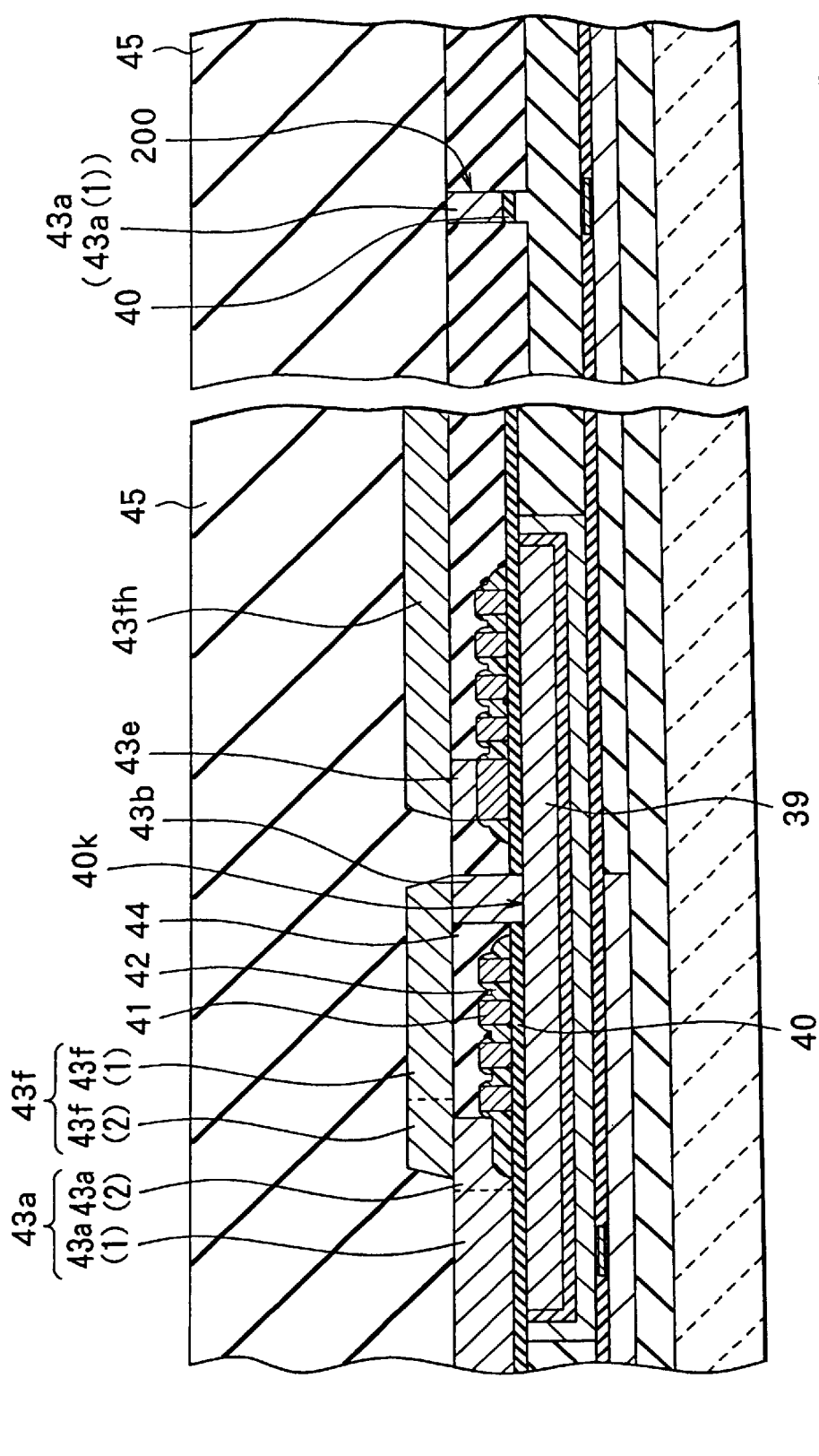

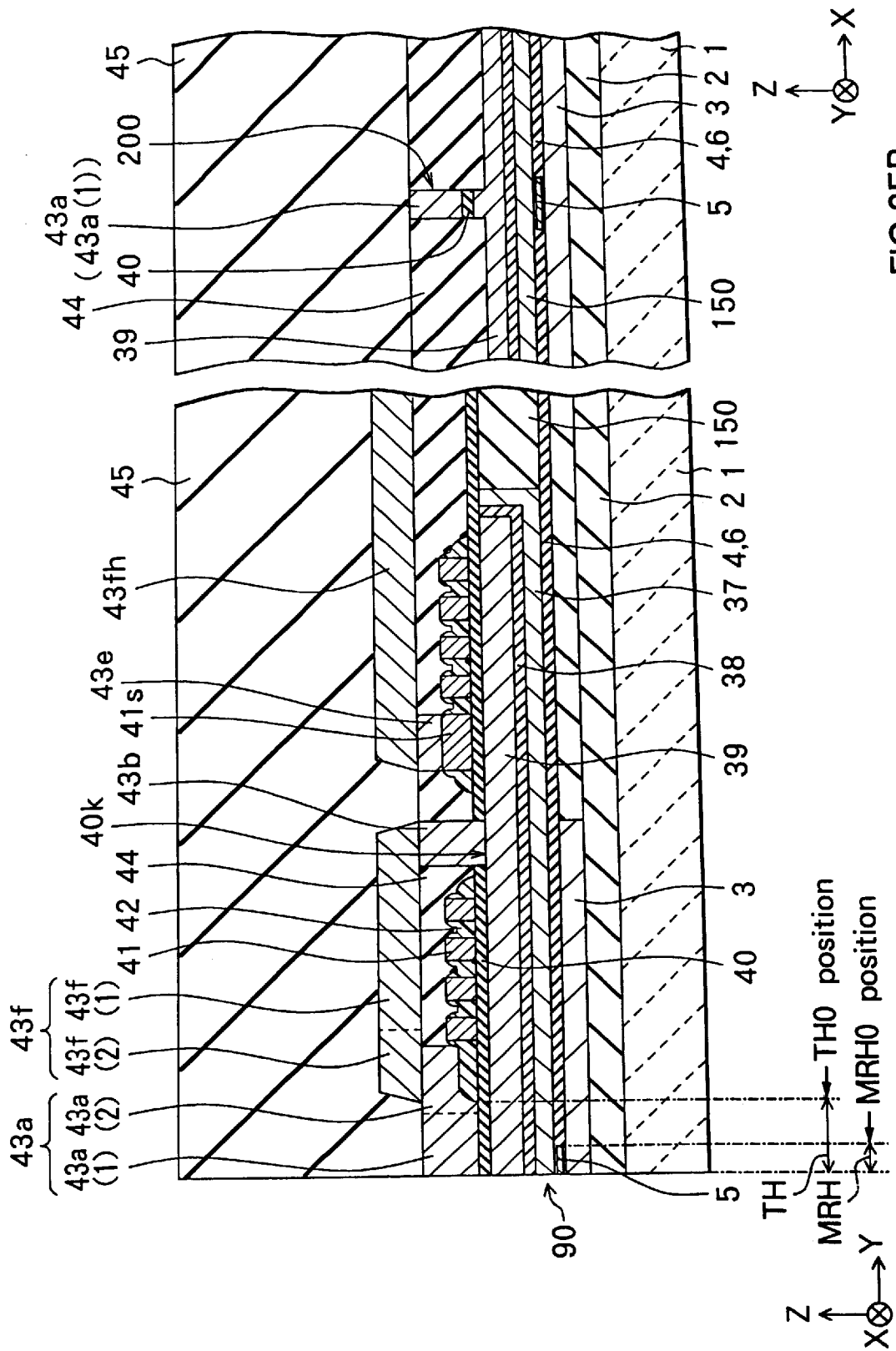

| | Method of forming top shield layer | Method of forming precursory bottom pole layer | Change in number of manufacturing steps | Change in number of used masks |
|---|---|---|---|---|
| V | Electroplating | Sputtering | 13 → 6 | 4 → 1 |
| VI | Electroplating | Electroplating | 13 → 7 | 4 → 1 |
| VII | Sputtering | Sputtering | 13 → 5 | 4 → 1 |
| VIII | Sputtering | Electroplating | 13 → 6 | 4 → 1 |

FIG.42

METHOD OF FORMING MAGNETIC LAYER PATTERN AND METHOD OF MANUFACTURING THIN FILM MAGNETIC HEAD

BACKGROUND OF THE INVENTION

1. Field of Invention

The present invention relates to a method of manufacturing a thin film magnetic head having at least an inductive-type magnetic transducer for writing.

2. Description of Related Art

Recently, improvements in the performance of thin film magnetic heads, has been sought in accordance with an increase in the surface recording density of a hard disk drive. A composite thin film magnetic head, which has a stacked structure comprising a recording head having an inductive-type magnetic transducer for writing and a reproducing head having a magnetoresistive (hereinafter referred to as MR) element for reading, is widely used as the thin film magnetic head. MR elements include an AMR element using an anisotropic magnetoresistive (hereinafter referred to as AMR) effect, and a GMR element using a giant magnetoresistive (hereinafter referred to as GMR) effect. A reproducing head using the AMR element is called an AMR head or simply an MR head, and a reproducing head using the GMR element is called a GMR head. The AMR head is used as the reproducing head having a surface recording density of more than 1 gigabit per square inch, and the GMR head is used as the reproducing head having a surface recording density of more than 3 gigabits per square inch.

The composite thin film magnetic head having the recording head and the reproducing head as described above is manufactured through a plurality of manufacturing steps such as a sputtering step, a photolithography step, an electroplating step, an etching step and a polishing step. The above-mentioned electroplating step and etching step, in particular, also require a step of forming a photoresist pattern for serving as a mask to be used to selectively grow a plated film, an etching mask for serving as a mask to be used to selectively perform an etching process, and so on.

A series of processes of manufacturing the thin film magnetic head including a variety of steps as described above has a problem that the manufacturing lead time required for manufacturing becomes longer. Therefore, specific means for improving, such as reducing the number of steps, is required in order to realize further reductions of the manufacturing lead time for mass-production.

SUMMARY OF THE INVENTION

The invention is designed to overcome the foregoing problem. It is an object of the invention to provide a method of forming a magnetic layer pattern and a method of manufacturing a thin film magnetic head, which can reduce the number of manufacturing steps and thus reduce the manufacturing time.

The method of forming a magnetic layer pattern of the invention for forming the magnetic layer pattern on a surface of a predetermined underlayer includes: a first step of forming a frame pattern having an opening with a predetermined shape on the underlayer; a second step of forming at least a precursory magnetic layer as a preparatory layer for the magnetic layer pattern so as to cover at least a region including the opening of the frame pattern; and a third step of forming the magnetic layer pattern by polishing at least the precursory magnetic layer until at least the frame pattern is exposed.

In the method of forming a magnetic layer pattern of the invention, in the first step, a frame pattern having an opening with a predetermined shape is formed on a predetermined underlayer; in the second step, at least a precursory magnetic layer is formed so as to cover at least a region including the opening of the frame pattern; and in the third step, the magnetic layer pattern is formed on the predetermined underlayer by polishing the precursory magnetic layer until at least the frame pattern is exposed.

In the method of forming a magnetic layer pattern of the invention, preferably, a nonmagnetic material is used as a material of the frame pattern.

In the method of forming a magnetic layer pattern of the invention, the second step may include the steps of: forming a plurality of precursory magnetic layers; and forming a precursory nonmagnetic layer between the plurality of precursory magnetic layers; and the third step may include polishing the plurality of precursory magnetic layers and the precursory nonmagnetic layer.

According to a first aspect of the invention, a method of manufacturing a thin film magnetic head including two magnetic layers magnetically coupled to each other and having two magnetic poles, which face each other with a gap layer in between, in a recording-medium-facing surface, a thin film coil portion provided between the two magnetic layers, and an insulating layer for insulating the thin film coil portion from the two magnetic layers includes: a first step of forming a frame pattern with an opening having a predetermined shape on a predetermined underlayer; a second step of forming a precursory magnetic layer as a preparatory layer for a magnetic layer pattern forming at least part of the two magnetic layers, so as to cover at least a region including the opening of the frame pattern; and a third step of forming at least part of the two magnetic layers by polishing the precursory magnetic layer until at least the frame pattern is exposed.

In the method of manufacturing a thin film magnetic head according to the first aspect of the invention, in the first step, a frame pattern having an opening with a predetermined shape is formed on a predetermined underlayer; in the second step, a precursory magnetic layer is formed so as to cover at least a region including the opening of the frame pattern; and in the third step, at least part of the two magnetic layers is formed by polishing the precursory magnetic layer until at least the frame pattern is exposed.

According to a second aspect of the invention, a method of manufacturing a thin film magnetic head including: a first magnetic layer and a second magnetic layer magnetically coupled to each other and having two magnetic poles which face each other with a gap layer in between, in a recording-medium-facing surface to be faced with a recording medium, a thin film coil portion provided between the two magnetic layers, an insulating layer for insulating the thin film coil portion from the two magnetic layers, and a nonmagnetic layer and a third magnetic layer which are provided on the side opposite to the first magnetic layer with respect to the second magnetic layer includes: a first step of forming the third magnetic layer on an underlayer; a second step of forming a frame pattern with an opening having a predetermined shape on the third magnetic layer; a third step of forming a precursory nonmagnetic layer as a preparatory layer for the nonmagnetic layer and then forming a precursory magnetic layer as a preparatory layer for the second magnetic layer, so as to cover at least a region including the opening of the frame pattern; and a fourth step of forming the nonmagnetic layer and the second magnetic layer by polishing the respective surfaces of the precursory nonmagnetic layer and the precursory magnetic layer until at least the frame pattern is exposed.

In the method of manufacturing a thin film magnetic head according to the second aspect of the invention, in the first step, the third magnetic layer is formed on a predetermined underlayer; in the second step, a frame pattern having an opening with a predetermined shape is formed on the third magnetic layer; in the third step, a precursory nonmagnetic layer and then a precursory magnetic layer are formed so as to cover at least a region including the opening of the frame pattern; and in the fourth step, the nonmagnetic layer and the second magnetic layer are formed by polishing the respective surfaces of the precursory nonmagnetic layer and the precursory magnetic layer until at least the frame pattern is exposed.

In the method of manufacturing a thin film magnetic head according to the second aspect of the invention, the third magnetic layer may be formed by growing a plated film and both the precursory nonmagnetic layer and the precursory magnetic layer may be formed by sputtering, or both the third magnetic layer and the precursory magnetic layer may be formed by growing a plated film and the precursory nonmagnetic layer may be formed by sputtering.

According to a third aspect of the invention, a method of manufacturing a thin film magnetic head including a first magnetic layer and a second magnetic layer magnetically coupled to each other and having two magnetic poles which face each other with a gap layer in between, in a recording-medium-facing surface, a thin film coil portion provided between the two magnetic layers, an insulating layer for insulating the thin film coil portion from the two magnetic layers, and a nonmagnetic layer and a third magnetic layer which are provided on the side opposite to the first magnetic layer with respect to the second magnetic layer, includes: a first step of forming a frame pattern having an opening with a predetermined shape on a predetermined underlayer; a second step of forming a first precursory magnetic layer as a preparatory layer for the third magnetic layer, then forming a precursory nonmagnetic layer as a preparatory layer for the nonmagnetic layer, and then forming a second precursory magnetic layer as a preparatory layer for the second magnetic layer, so as to cover at least a region including the opening of the frame pattern; and a third step of forming the third magnetic layer, the nonmagnetic layer and the second magnetic layer by polishing the first precursory magnetic layer, the precursory nonmagnetic layer and the second precursory magnetic layer until at least the frame pattern is exposed.

In the method of manufacturing a thin film magnetic head according to the third aspect of the invention, in the first step, a frame pattern having an opening with a predetermined shape is formed on a predetermined underlayer; in the second step, a first precursory magnetic layer, then a precursory nonmagnetic layer and then a second precursory magnetic layer are formed so as to cover at least a region including the opening of the frame pattern; and in the third step, the third magnetic layer, the nonmagnetic layer and the second magnetic layer are formed by polishing the first precursory magnetic layer, the precursory nonmagnetic layer and the second precursory magnetic layer until at least the frame pattern is exposed.

In the method of manufacturing a thin film magnetic head according to the third aspect of the invention, the first precursory magnetic layer may be formed by growing a plated film and both the precursory nonmagnetic layer and the second precursory magnetic layer may be formed by sputtering, or both the first precursory magnetic layer and the second precursory magnetic layer may be formed by growing a plated film and the precursory nonmagnetic layer may be formed by sputtering.

In the method of manufacturing a thin film magnetic head according to the first, second and third aspects of the invention, layers capable of magnetically shielding the second magnetic layer may be used as the nonmagnetic layer and the third magnetic layer.

In the method of manufacturing a thin film magnetic head according to the first, second and third aspects of the invention, a predetermined nonmagnetic material may be used as a material of the frame pattern. In this case, preferably, a material containing either aluminum oxide or silicon oxide is used as the nonmagnetic material.

In the method of manufacturing a thin film magnetic head according to the first, second and third aspects of the invention, preferably, the frame pattern is formed by reactive ion etching.

In the method of manufacturing a thin film magnetic head according to the first, second and third aspects of the invention, a material containing either nickel iron or iron nitride may be used as a material of at least part of the first magnetic layer and the second magnetic layer, or a material containing an amorphous alloy may be used as a material of at least part of the first magnetic layer and the second magnetic layer. Preferably, either a cobalt-iron alloy or a zirconium-cobalt-iron alloy is used as the amorphous alloy.

Other and further objects, features and advantages of the invention will appear more fully from the following description.

BRIEF DESCRIPTION OF THE DRAWINGS

FIGS. 1A and 1B are cross sectional views for describing a step of a method of manufacturing a thin film magnetic head according to a first embodiment of the invention;

FIGS. 2A and 2B are cross sectional views for describing a step following the step of FIGS. 1A and 1B;

FIGS. 3A and 3B are cross sectional views for describing a step following the step of FIGS. 2A and 2B;

FIGS. 4A and 4B are cross sectional views for describing a step following the step of FIGS. 3A and 3B;

FIGS. 5A and 5B are cross sectional views for describing a step following the step of FIGS. 4A and 4B;

FIGS. 9A and 9B are cross sectional views for describing a step following the step of FIGS. 8A and 8B;

FIG. 22 is a table for describing the respective numbers of manufacturing steps and the respective numbers of used masks of the method of manufacturing a thin film magnetic head according to the embodiment and the method of manufacturing a thin film magnetic head of the comparison;

FIG. 25 is a table for describing a modification of the method of manufacturing the thin film magnetic head according to the first embodiment of the invention;

FIGS. 29A and 29B are cross sectional views for describing a step of a method of manufacturing a thin film magnetic head according to a second embodiment of the invention;

FIGS. 30A and 30B are cross sectional views for describing a step following the step of FIGS. 29A and 29B;

FIGS. 31A and 31B are cross sectional views for describing a step following the step of FIGS. 30A and 30B;

FIGS. 34A and 34B are cross sectional views for describing a step following the step of FIGS. 33A and 33B;

FIGS. 35A and 35B are cross sectional views for describing a step following the step of FIGS. 34A and 34B;

FIG. 42 is a table for describing a modification of the method of manufacturing the thin film magnetic head according to the second embodiment of the invention;

DETAILED DESCRIPTION OF PREFERRED EMBODIMENTS

Embodiments of the invention will be described in detail below with reference to the drawings.

First Embodiment

Firstly, the description is given with reference to FIGS. 1A to 15 with regard to an example of a method of manufacturing a composite thin film magnetic head as "a method of manufacturing a thin film magnetic head" according to a first embodiment of the invention. Since "a method of forming a magnetic layer pattern" of the invention is embodied by the method of manufacturing a thin film magnetic head according to the embodiment, the method of forming a magnetic layer pattern will be described below in conjunction with the method of manufacturing a thin film magnetic head.

Figure 10:
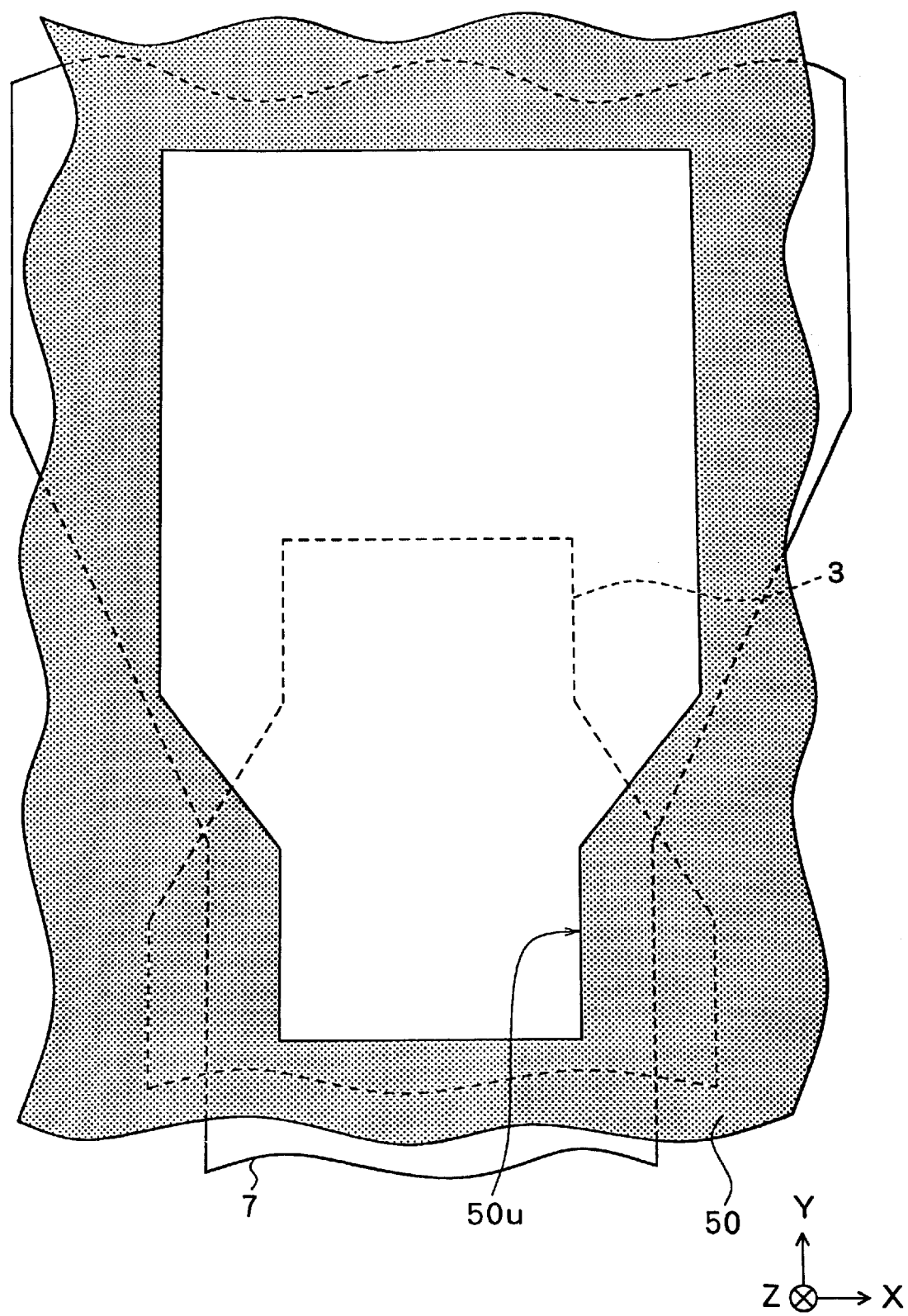
FIG. 10 is a plan view corresponding to the cross sectional views shown in FIGS. 2A and 2B.
Figure 11:
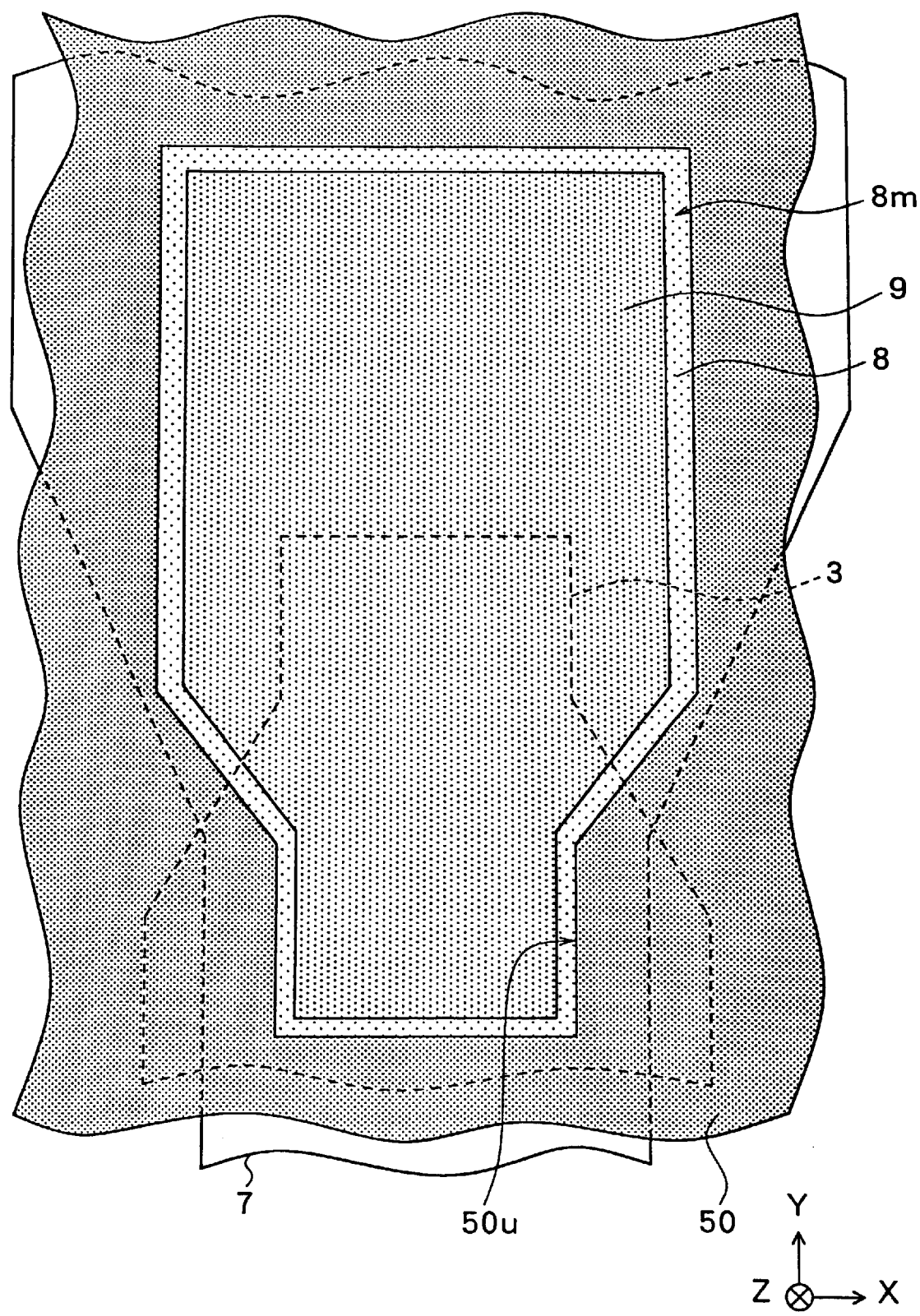
FIG. 11 is a plan view corresponding to the cross sectional views shown in FIGS. 4A and 4B.
Figure 12:
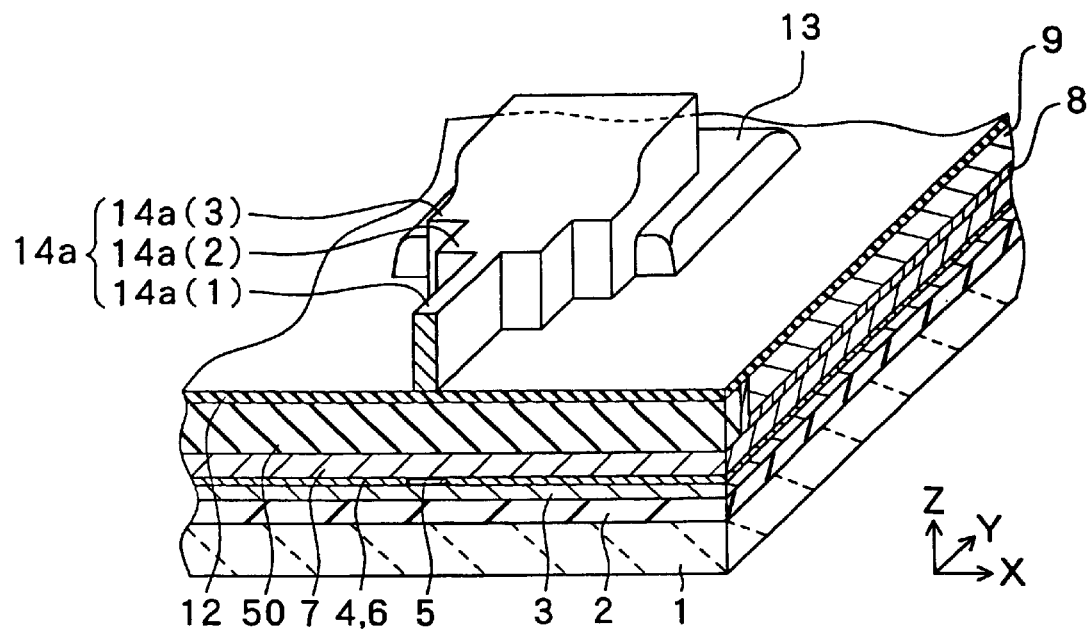
FIG. 12 is a perspective view corresponding to the cross sectional views shown in FIGS. 5A and 5B.
Figure 13:
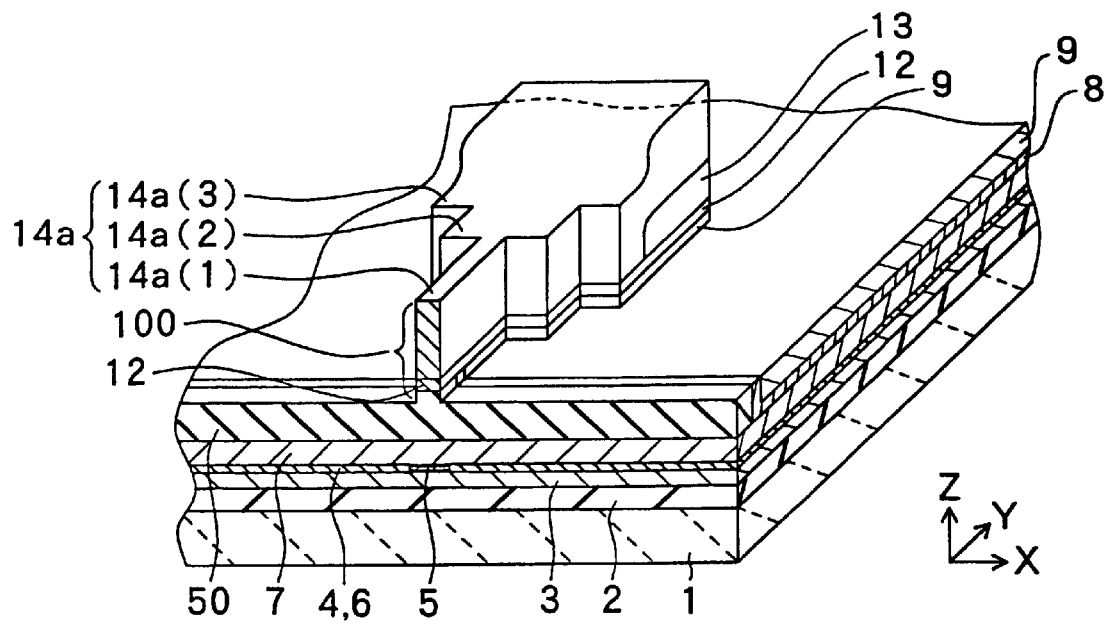
FIG. 13 is a perspective view corresponding to the cross sectional views shown in FIGS. 6A and 6B.
Figure 14:
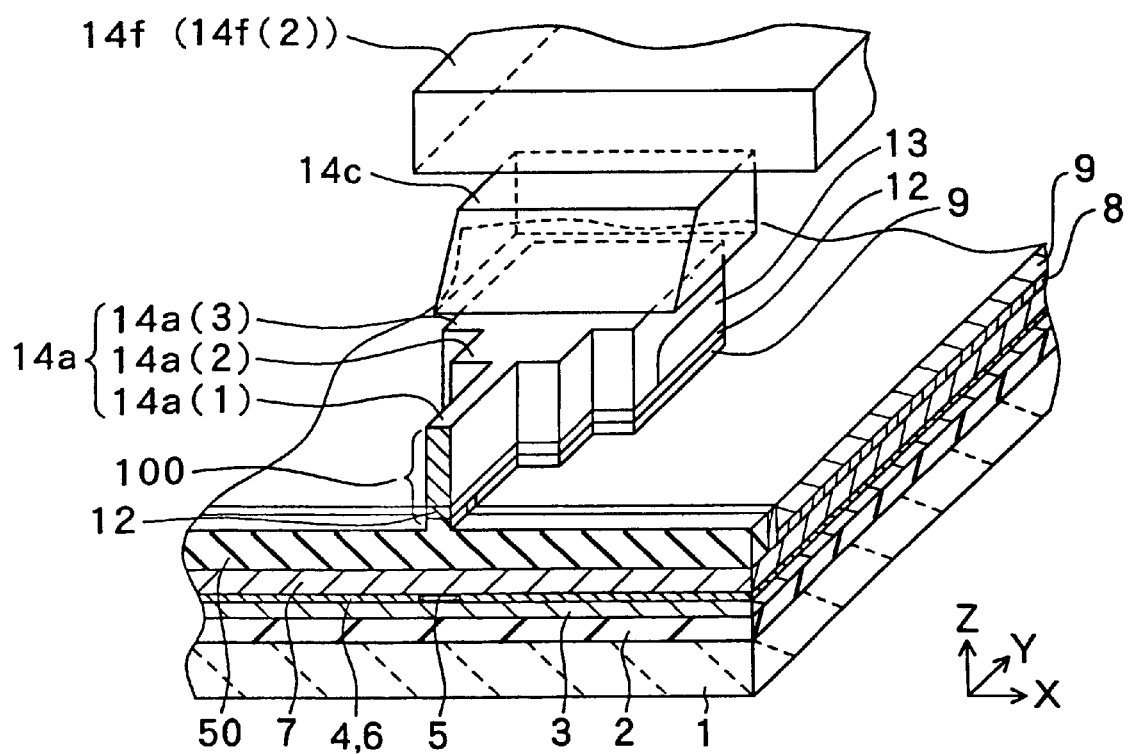
FIG. 14 is a perspective view corresponding to the cross sectional views shown in FIGS. 9A and 9B.

FIGS. 1A, 2A, 3A, 4A, 5A, 6A, 7A, 8A and 9A show a cross section perpendicular to an air bearing surface, and FIGS. 1B, 2B, 3B, 4B, 5B, 6B, 7B, 8B and 9B show a cross section of a pole portion parallel to the air bearing surface. FIGS. 10 and 11 are plan views corresponding to main manufacturing steps, and FIGS. 12 to 14 are perspective views corresponding to the main manufacturing steps. FIG. 10 corresponds to a state shown in FIGS. 2A and 2B, and FIG. 11 corresponds to a state shown in FIGS. 4A and 4B. FIG. 12 corresponds to a state shown in FIGS. 5A and 5B, FIG. 13 corresponds to a state shown in FIGS. 6A and 6B, and FIG. 14 corresponds to a state shown in FIGS. 9A and 9B. FIGS. 10 and 11 do not show a substrate 1, an insulating layer 2, shield gap films 4 and 6 and so on shown in FIGS. 2A and 2B and FIGS. 4A and 4B. FIG. 13 does not show insulating films 15 and 17, an alumina layer 18$p$, a thin film coil 16 and so on shown in FIGS. 6A and 6B, and FIG. 14 does not show insulating films 15, 17, 18, 20 and 21, thin film coils 16 and 19, an overcoat layer 22 and so on shown in FIGS. 9A and 9B.

Figure 15:
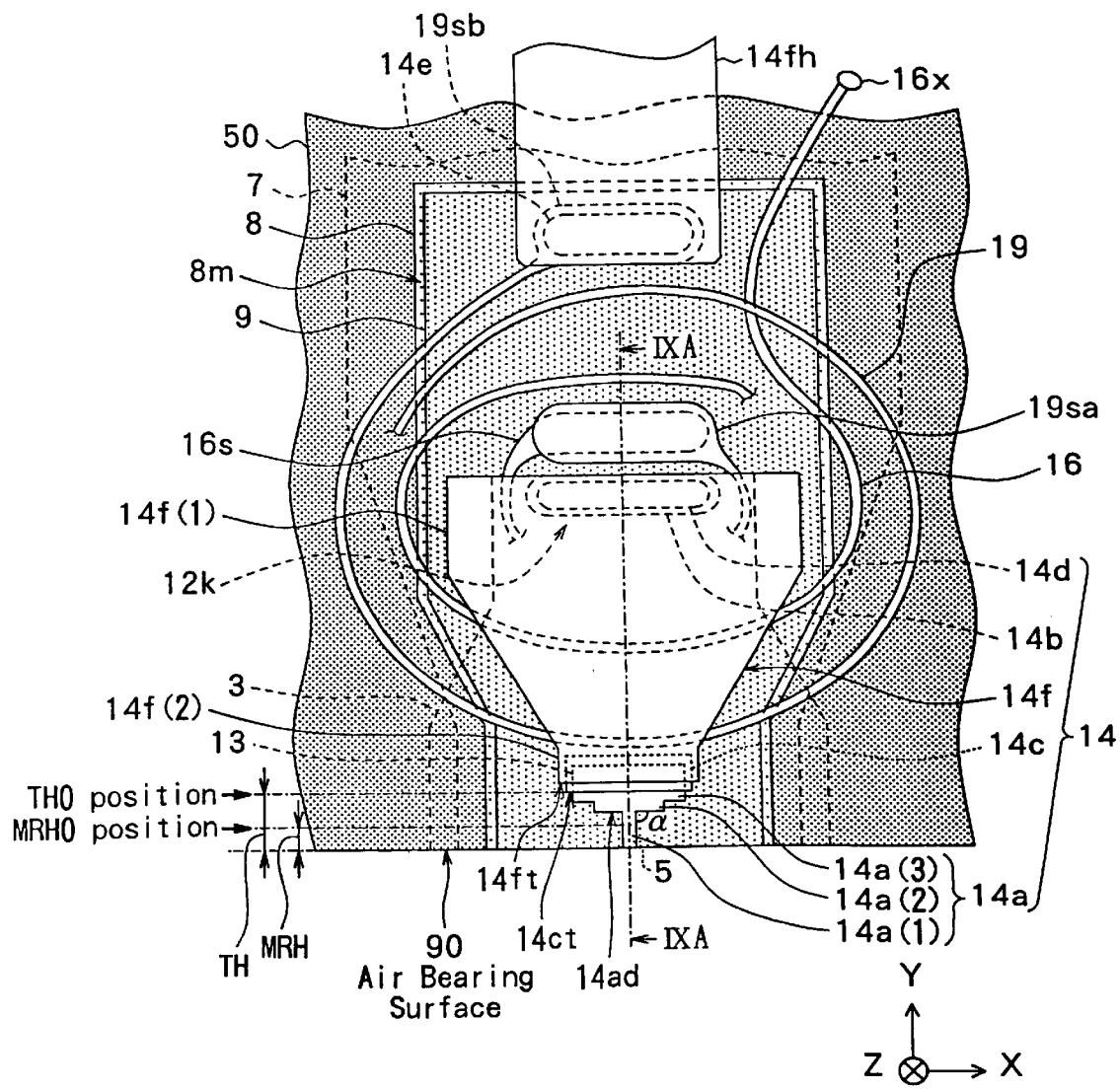
FIG. 15 is a plan view of a planar structure of a thin film magnetic head according to the first embodiment of the invention.

FIG. 15 shows a schematic representation of a planar structure of a thin film magnetic head manufactured by the method of manufacturing a thin film magnetic head according to the embodiment. FIG. 15 does not show the insulating films 15, 17, 18, 20 and 21, the overcoat layer 22 and so on. FIG. 15 shows the thin film coils 16 and 19 but shows only the outermost periphery portions thereof. FIG. 9A corresponds to a cross section taken in the direction of the arrows along the line IXA—IXA of FIG. 15.

In the following description, an X-axis direction, a Y-axis direction and a Z-axis direction in FIGS. 1A to 15 are expressed as "a width direction", "a length direction" and "a thickness direction (or a vertical direction)", respectively. The side close to an air bearing surface 90 in the Y-axis direction (or the side to form the air bearing surface 90 in the following step) is expressed as "a front side (or a frontward side)", and the opposite side is expressed as "a rear side (or a rearward side)".

In the method of manufacturing a thin film magnetic head according to the embodiment, first, as shown in FIGS. 1A and 1B, the insulating layer 2 made of, for example, aluminum oxide ($Al_2O_3$, hereinafter referred to as "alumina") is deposited with a thickness of about 3.0 $\mu$m to 5.0 $\mu$m on the substrate 1 made of, for example, altic ($Al_2O_3$.TiC). Then, Permalloy (Ni: 80 wt %, Fe: 20 wt %), for example, is selectively formed with a thickness of about 3.0 $\mu$m on the insulating layer 2 by using, for example, frame plating, and thus a bottom shield layer 3 for a reproducing head is formed. The description is given later with regard to the detailed procedure of "frame plating" that is a method of forming the bottom shield layer 3 and other magnetic layer portions (a top shield layer 7, a top pole tip 14a, magnetic path connecting portions 14b and 14d, an intermediate connecting portion 14c, an intermediate connecting pattern 14e, a top yoke 14f, a coil connecting wiring 14fh and so on) for constituting the thin film magnetic head (see FIGS. 16 to 21). Then, an insulating film made of, for example, alumina is formed with a thickness of about 4.0 $\mu$m to 5.0 $\mu$m so as to cover the overall surface of the layer structure as mentioned above, thereafter a surface of the insulating film is polished by, for example, CMP (Chemical Mechanical Polishing) until the bottom shield layer 3 is exposed, and thus the overall surface is planarized. The substrate 1 corresponds to a specific example of "an underlayer" of the method of manufacturing a thin film magnetic head of the invention.

Next, as shown in FIGS. 1A and 1B, the shield gap film 4 made of, for example, alumina is formed with a thickness of about 100 nm to 200 nm over the overall surface of the layer structure as mentioned above by sputtering, for example. Then, an MR film 5 for constituting an MR element that is a principal part of the reproducing head is formed on the shield gap film 4 by high-accuracy photolithography so as to have a desired shape. Then, lead layers (not shown) for functioning as lead electrode layers to be electrically connected to the MR film 5 are formed on both sides of the MR film 5. After that, the shield gap film 6 is formed on the lead layers, the shield gap film 4 and the MR film 5, and thus the MR film 5 is buried in the shield gap films 4 and 6.

Next, as shown in FIGS. 1A and 1B, the top shield layer 7 made of, for example, Permalloy (Ni: 80 wt %, Fe: 20 wt %) is selectively formed with a thickness of about 1.0 $\mu$m to 1.5 $\mu$m on the shield gap film 6 by frame plating, for example. The top shield layer 7 has a planar shape shown in FIG. 15, for example. The top shield layer 7 made of Permalloy is formed by using a plating process, so that the composition of Permalloy can be properly controlled. During a reproducing operation of the thin film magnetic head, magnetic noise can be therefore avoided from being caused by an improper composition of Permalloy, adversely affecting the MR film 5 and thus interfering with the reproducing operation. The top shield layer 7 corresponds to a specific example of "a third magnetic layer" of the method of manufacturing a thin film magnetic head of the invention (claim 5).

Next, as shown in FIGS. 1A and 1B, a precursory frame pattern layer 50p made of a nonmagnetic material, e.g., an inorganic insulating material such as alumina, is formed with a thickness of about 4.0 $\mu$m on the top shield layer 7 by sputtering, for example. The precursory frame pattern layer 50p is a preparatory layer that is to be formed into a frame pattern 50 by patterning using an etching process in the following step. In the following description, a preparatory layer, which is to be patterned so as to have a predetermined shape in the following step as mentioned above, is called "a precursory layer" and is expressed in the same manner. Besides alumina, silicon oxide ($SiO_2$, for example) or the like may be used as the above-mentioned nonmagnetic material.

Next, for example, a photoresist film (not shown) is formed by covering a surface of the precursory frame pattern layer 50p with a photoresist, and thereafter the photoresist film is patterned by photolithography. Thus, as shown in FIG. 1A, a mask 51 having an opening 51u is formed on the precursory frame pattern layer 50p. For example, the mask 51 has substantially the same planar shape as the frame pattern 50 to be formed in the following step (see FIGS. 2A, 2B, 10 and 15). A nonmagnetic material having relatively low reflectance, such as alumina, is used as a material of the precursory frame pattern layer 50p, so that, during exposure for patterning the photoresist film by photolithography, light can be prevented from being reflected from the surface of an underlayer (the precursory frame pattern layer 50p). Therefore, an increase or a reduction in an exposed region due to an influence of reflected light is suppressed, so that the mask 51 can be formed with high accuracy.

Next, as shown in FIGS. 1A and 1B, the precursory frame pattern layer 50p is etched and patterned by, for example, reactive ion etching (hereinafter referred to as "RIE") using the mask 51. A portion of the precursory frame pattern layer 50p corresponding to the opening 51u of the mask 51 is selectively removed by this etching process, so that the frame pattern 50 having an opening 50u is formed as shown in FIGS. 2A and 2B. In general, a processing speed in the case of using RIE as the etching method is higher than a processing speed in the case of using ion milling. Thus, the use of RIE as the etching method for patterning the precursory frame pattern layer 50p allows forming the frame pattern 50 in a shorter time, as compared to the use of ion milling or the like. The frame pattern 50 is formed, for example, in such a manner that an inner wall surface of the frame pattern 50 in the opening 50u is substantially perpendicular to a surface of an underlayer (the top shield layer 7). The opening 50u is formed, for example, in such a manner that the shape thereof substantially corresponds to the planar shapes of both of a nonmagnetic layer 8 and a bottom pole 9 to be formed in the following step. A planar shape of the frame pattern 50 is as shown in FIGS. 10 and 15, for example. Near the opening 50u, a position of a surface of the frame pattern 50 is located higher than a position of a surface of the top shield layer 7. In other words, a step is created in the thickness direction between the surface of the frame pattern 50 and the surface of the top shield layer 7. The mask 51 itself is also etched by the above-mentioned etching process, so that the film thickness thereof is reduced. At the time of completion of the etching process, the mask 51 may not remain (see FIGS. 2A and 2B) or may remain.

Next, as shown in FIGS. 3A and 3B, a precursory nonmagnetic layer 8p made of a nonmagnetic material, e.g., an inorganic insulating material such as alumina, is formed with a thickness of about 0.15 $\mu$m to 0.2 $\mu$m by, for example, sputtering so as to cover both of the surface of the top shield layer 7 and the surface of the frame pattern 50 that are exposed in the opening 50u. Besides the above-mentioned inorganic insulating material, a nonmagnetic material such as metal or the like may be used as the material for the precursory nonmagnetic layer 8p. Then, a precursory bottom pole layer 9p made of a magnetic material having high saturation magnetic flux density, e.g., iron nitride (FeN), is formed with a thickness of about 2.0 μm to 2.5μ by, for example, sputtering so as to cover the overall surface of the precursory nonmagnetic layer 8p. The precursory bottom pole layer 9p extends in such a manner that the layer 9p includes a step region 9pr and is partially bent, corresponding to a step portion between the surface of the frame pattern 50 and the surface of the top shield layer 7. Besides the above-mentioned iron nitride, Permalloy (Ni: 45 wt %, Fe: 55 wt %) or an amorphous alloy that is a magnetic material having high saturation magnetic flux density similarly to iron nitride, for example, may be used as a material of the precursory bottom pole layer 9p. For example, a cobalt-iron alloy (CoFe), a zirconium-cobalt-iron alloy (ZrCoFe) or the like can be used as the amorphous alloy. The precursory bottom pole layer 9p corresponds to a specific example of "a precursory magnetic layer" of the method of forming a magnetic layer pattern of the invention and corresponds to a specific example of "a precursory magnetic layer" of the method of manufacturing a thin film magnetic head of the invention (claim 5).

Preferably, the frame pattern 50 is formed on the top shield layer 7 in such a manner that the step region 9pr of the precursory bottom pole layer 9p to be formed over the top shield layer 7 and the frame pattern 50 are located frontward at a sufficient distance from a region where the MR film 5 is located, namely, in such a manner that a distance L1 between the step region 9pr and the MR film 5 is properly determined so as to be sufficiently long. Specifically, it is preferable that the distance L1 is equal to or more than 4.0 μm to 5.0 μm, for example. The description is given later with regard to the details of the functions and effects of the above-mentioned proper determination of the distance L1.

Next, the overall surface of the layer structure as mentioned above is polished by, for example, CMP until at least the frame pattern 50 is exposed, and thus the overall surface is planarized. By this polishing process, the precursory bottom pole layer 9p and the precursory nonmagnetic layer 8p covering the frame pattern 50 are, in part, selectively removed, so that the precursory nonmagnetic layer 8p and the precursory bottom pole layer 9p are patterned into a predetermined.shape. That is, as shown in FIGS. 4A and 4B, the nonmagnetic layer 8 and the bottom pole 9 are selectively formed so as to be filled into the opening 50u of the frame pattern 50. The nonmagnetic layer 8 and the bottom pole 9 have a planar shape as shown in FIGS. 11 and 15, for example. As shown in FIGS. 4A, 4B, 11 and 15, on the polished surface, the bottom pole 9 is exposed, and an end face (8m) of the nonmagnetic layer 8 is exposed around the bottom pole 9. A peripheral region around the bottom pole 9 is filled with the nonmagnetic layer 8 and the frame pattern 50 made of a nonmagnetic material (e.g., alumina). The bottom pole 9 is magnetically separated from the peripheral region by the top shield layer 7, the nonmagnetic layer 8, the frame pattern 50 and so on which are located under or around the bottom pole 9. The nonmagnetic layer 8 made of a nonmagnetic material (e.g., alumina) is located between the bottom pole 9 and the top shield layer 7, so that the nonmagnetic layer 8 functions as a shield against a magnetic flux and thus magnetic noise caused by the bottom pole 9 is avoided from reaching to the MR film 5. The bottom pole 9 corresponds to a specific example of "a magnetic layer pattern" of the method of forming a magnetic layer pattern of the invention and corresponds to a specific example of "a second magnetic layer" of the method of manufacturing a thin film magnetic head of the invention (claim 5).

Next, as shown in FIGS. 5A and 5B and FIG. 12, a write gap layer 12 made of, for example, alumina is formed with a thickness of about 0.15 μm to 0.2 μm on the planarized surface obtained through polishing, by means of sputtering, for example. The write gap layer 12 is flat over the overall surface thereof. When forming the write gap layer 12, a region where the magnetic path connecting portion 14b is to be formed in the following step is not covered with the write gap layer 12. The above-mentioned region is to be an opening 12k for connecting the bottom pole 9 to a top pole 14 to be formed in the following step. The write gap layer 12 corresponds to a specific example of "a gap layer" of the method of manufacturing a thin film magnetic head of the invention.

Next, an organic photoresist film, for example, is selectively formed by high-accuracy photolithography with a thickness of about 1.0 μm at a predetermined position on the write gap layer 12 in a flat region located frontward with respect to a region where the opening 12k (not shown in FIG. 12) is to be formed. Then, the photoresist film is subjected to heat treatment at a temperature of about 200 to 250 degrees, for example. Thus, portions of the photoresist film near the edges thereof each have a round inclined surface declining in the direction of each edge, so that an insulating film pattern 13 made of the photoresist film is formed as shown in FIGS. 5A and 12. The above-mentioned "predetermined position" at which the insulating film pattern 13 is formed is, for example, such a position that a position of a leading edge of the insulating film pattern 13 is displaced rearward from a position of a rear most edge of the MR film 5. Preferably, a distance (a length of displacement) between the position of the rear most edge of the MR film 5 and the position of the leading edge of the insulating film pattern 13 is about 0.3 μm or less, for example. The position of the insulating film pattern 13 is not necessarily limited to this case, and the position of the rear most edge of the MR film 5 may coincide with the position of the leading edge of the insulating film pattern 13. The position of the leading edge of the insulating film pattern 13 corresponds to a reference position for determining a throat height (TH), namely, a throat height zero position (a TH0 position).

Next, as shown in FIGS. 5A and 5B and FIG. 12, the top pole tip 14a for constituting part of the top pole 14 is selectively formed by, for example, frame plating with a thickness of about 2.5 μm to 3.5 μm on a region extending from a front inclined surface region of the insulating film pattern 13 to the flat write gap layer 12 located forward of the front inclined surface region. At the same time when the top pole tip 14a is formed, the magnetic path connecting portion 14b for constituting a part of the top pole 14 is formed in the opening 12k. A magnetic material having high saturation magnetic flux density, such as Permalloy (Ni: 45 wt %, Fe: 55 wt %), is used as materials of the top pole tip 14a and the magnetic path connecting portion 14b. Besides the above-mentioned Permalloy, for example, iron nitride, an amorphous alloy (cobalt iron, zirconium cobalt iron, etc.) or the like having high saturation magnetic flux density similarly to the above-mentioned Permalloy may be used as the materials of the top pole tip 14a and the magnetic path connecting portion 14b.

With reference to FIGS. 5A, 5B, 12 and 15, the description is now given with regard to an example of a structure of the top pole tip 14a and a position at which the top pole tip 14a is positioned.

For example, the top pole tip 14a has a structure including a front end portion 14a(1), an intermediate portion 14a(2) and a rear end portion 14a(3), which are arranged in this order when being viewed from the side to form the air bearing surface 90 in the following step (or the air bearing surface 90). Each of these portions 14a(1), 14a(2) and 14a(3) has a rectangular planar shape, for example. The front end portion 14a(1) has a substantially uniform width over the overall area thereof. A width of the front end portion 14a(1) determines a write track width at the time of recording. A width of the intermediate portion 14a(2) is greater than the width of the front end portion 14a(1), and a width of the rear end portion 14a(3) is greater than the width of the intermediate portion 14a(2). In other words, a step is created in the width direction at a coupling portion between the front end portion 14a(1) and the intermediate portion 14a(2). The respective centers of the front end portion 14a(1), the intermediate portion 14a(2) and the rear end portion 14a(3) match one another in the width directions thereof.

For example, the top pole tip 14a is positioned in such a manner that a rearward portion of the rear end portion 14a(3) extends on an inclined surface portion of the insulating film pattern 13 and the other portion thereof extends on the flat write gap layer 12. For example, a step surface 14ad (see FIG. 15) of a step portion of the top pole tip 14a close to the intermediate portion 14a(2) is located frontward with respect to the throat height zero position (the TH0 position).

Preferably, an angle α of a corner portion at which a side edge surface of the front end portion 14a(1) of the top pole tip 14a crosses the step surface 14ad lies between, for example, 90 and 120 degrees in order to smooth the flow of a magnetic flux from the intermediate portion 14a(2) toward the front end portion 14a(1). Referring to FIG. 15, the angle α is about 90 degrees, for example.

Figures 6A, 6B:
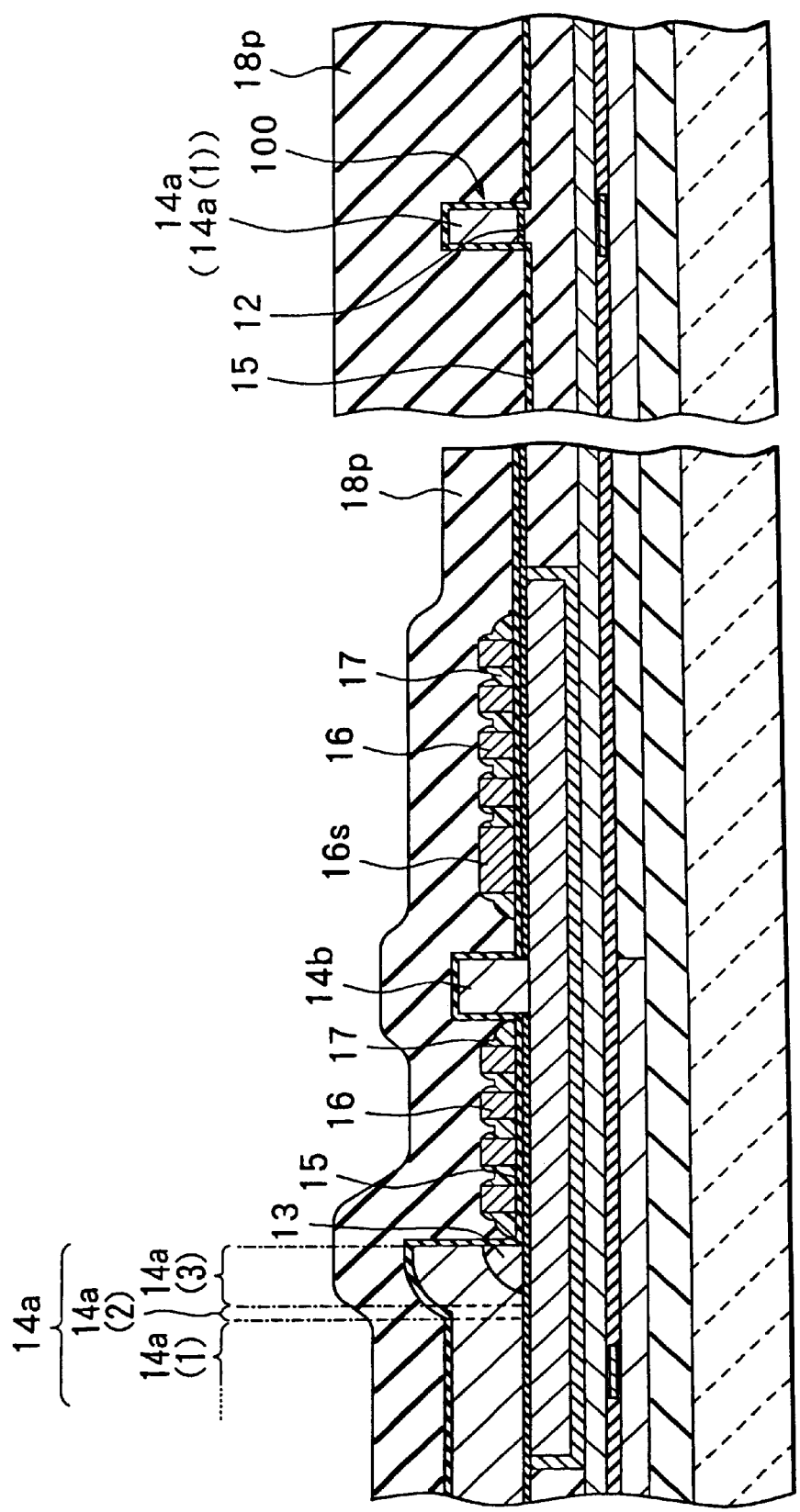
FIGS. 6A and 6B are cross sectional views for describing a step following the step of FIGS. 5A and 5B.

Subsequently, the method of manufacturing a thin film magnetic head according to the embodiment will be described with reference to FIGS. 6A and 6B and FIG. 13. After forming the top pole tip 14a, as shown in FIGS. 6A and 6B and FIG. 13, a peripheral region around the top pole tip 14a is etched by about 0.3 μm to 0.4 μm by means of, for example, RIE using the top pole tip 14a as a mask. By this etching process, the write gap layer 12, the bottom pole 9, the nonmagnetic layer 8 and the frame pattern 50 in the peripheral region around the top pole tip 14a are, in part, selectively removed and thus grooved. At this time, a rear part of the insulating film pattern 13 is also etched and thus removed. By this etching process, a pole portion 100 having a trim structure is formed. The pole portion 100 comprises the front end portion 14a(1) of the top pole tip 14a, a portion of the bottom pole 9 corresponding to the front end portion 14a(1), and part of the write gap layer 12 sandwiched between the front end portion 14a(1) and the portion of the bottom pole 9, and these portions have substantially the same width. The pole portion 100 having the trim structure can be formed in a shorter time by using RIE rather than by using ion milling.

Next, as shown in FIGS. 6A and 6B, the insulating film 15 made of, for example, alumina is formed with a thickness of about 0.3 μm to 0.5 μm over the overall surface of the layer structure as mentioned above by sputtering, for example.

Next, as shown in FIGS. 6A and 6B, the first-layer thin film coil 16 made of, for example, copper (Cu) for an inductive recording head is selectively formed by, for example, electroplating with a thickness of about 1.0 □m to 1.5 □m on the flat insulating film 15 in a region located rearward with respect to a region where the top pole tip 14a is located (except a region where the magnetic path connecting portion 14b is located). The thin film coil 16 has a spiral planar structure as shown in FIG. 15, for example. At the same time when the thin film coil 16 is formed, for example, a coil connecting portion 16s is integrally formed with the thin film coil 16 on the insulating film 15 at an inner terminal end of the thin film coil 16. The coil connecting portion 16s is a portion for electrically connecting the thin film coil 16 to a coil connecting portion 19sa (see FIG. 7A) to be formed in the following step.

Next, a material exhibiting fluidity during heating, e.g., an organic insulating material such as a photoresist is formed into a predetermined pattern between turns of the thin film coil 16 (including the coil connecting portion 16s) and in a peripheral region around the turns by high-accuracy photolithography. Then, the photoresist is subjected to heat treatment at a temperature lying between 200 and 250 degrees, for example. By this heat treatment, the photoresist flows and fills up a gap between the turns of the thin film coil 16, so that the insulating film 17 for providing insulation between the turns of the thin film coil 16 is formed as shown in FIG. 6A. As mentioned above, an organic insulating material such as a photoresist exhibiting fluidity during heating is used as a material of the insulating film 17, so that the photoresist can fill up the gap between the turns of the thin film coils 16, 19 and so on and thus the insulating film 17 can ensure that the turns are insulated, as distinct from when a material that does not exhibit fluidity during heating (e.g., alumina) is used. The insulating film 17 may be formed in such a manner that the insulating film 17 does not cover top surfaces of both of the thin film coil 16 and the coil connecting portion 16s (see FIG. 6A) or the insulating film 17 covers the top surfaces thereof.

Next, as shown in FIGS. 6A and 6B, the alumina layer 18p, for example, is formed with a thickness of about 3.0 μm to 4.0 μm by, for example, sputtering so as to cover the overall surface of the layer structure as mentioned above, so that a region having a concave and convex structure comprising the top pole tip 14a, the magnetic path connecting portion 14b, the thin film coil 16, the coil connecting portion 16s and so on is filled with the alumina layer 18p.

Figures 7A, 7B:
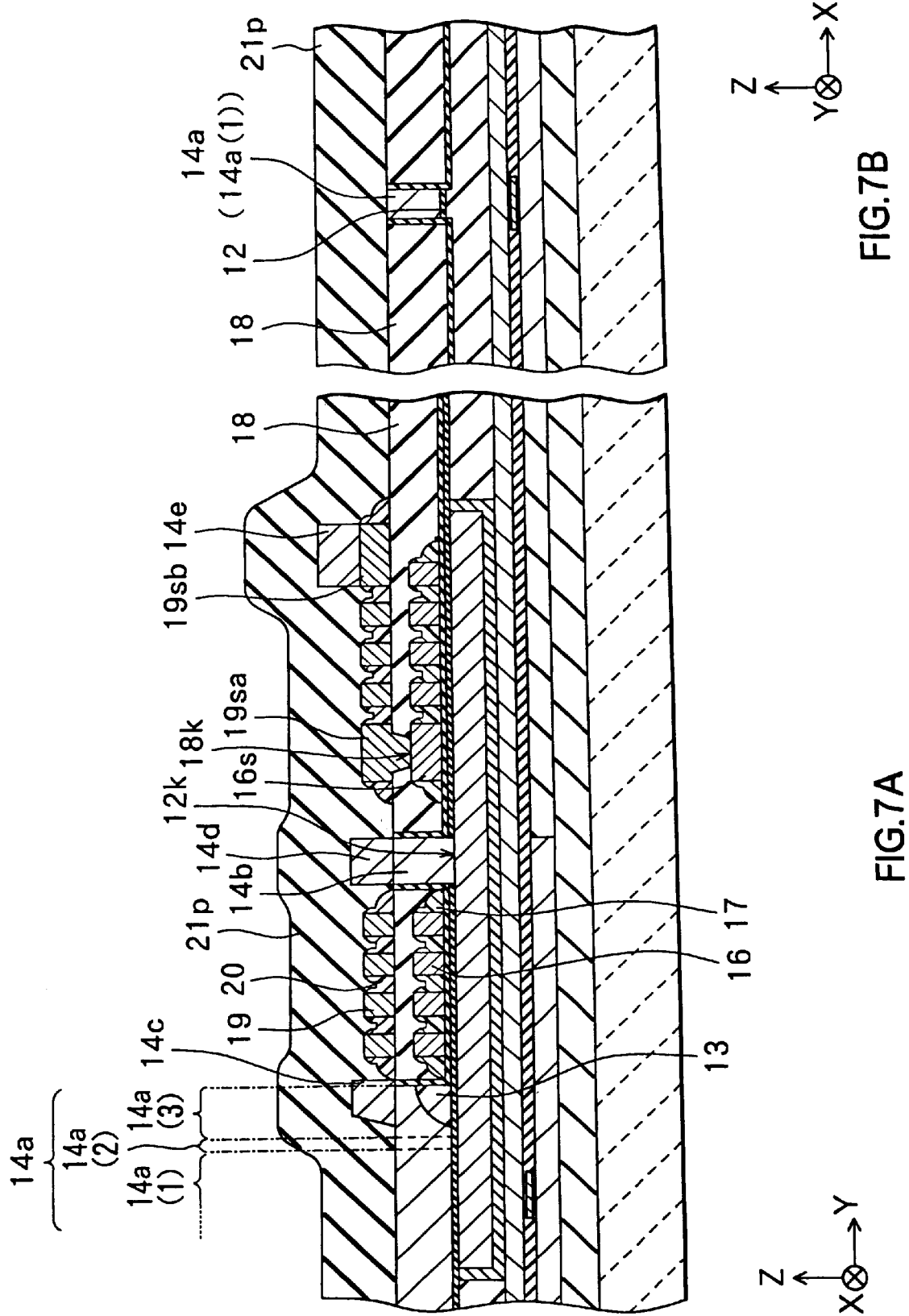
FIGS. 7A and 7B are cross sectional views for describing a step following the step of FIGS. 6A and 6B.

Next, the overall surface of the alumina layer 18p is polished and planarized by CMP, for example. By this polishing process, the insulating film 18 which the thin film coil 16 and so on are to be filled with is formed as shown in FIGS. 7A and 7B. The polishing process takes place until at least both of the top pole tip 14a and the magnetic path connecting portion 14b are exposed. Specifically, it is preferable that, for example, the polishing process take place in such a manner that a thickness of the polished top pole tip 14a is about 1.5 μm to 2.5 μm. An inorganic insulating material such as alumina is used as a material of the insulating film 18, so that a polishing surface of a CMP polishing disc can be prevented from being clogged and the polished surface can be made smoother, as distinct from when a soft insulating material such as a photoresist is used.

Next, as shown in FIGS. 7A and 7B, the insulating film 18 covering the coil connecting portion 16s is partly etched and removed by, for example, RIE or ion milling, so that an opening 18k for connecting the coil connecting portion 16s to the coil connecting portion 19sa to be formed in the following step is formed.

Next, as shown in FIGS. 7A and 7B, the second-layer thin film coil 19 made of, for example, copper (Cu) is selectively formed with a thickness of about 1.0 μm to 1.5 μm on the planarized insulating film 18 over the thin film coil 16 by electroplating as in the case of forming the first-layer thin film coil 16. The thin film coil 19 has the same planar structure as the thin film coil 16 has, and the planar structure thereof is as shown in FIG. 15, for example. At the same time when the thin film coil 19 is formed, for example, the coil connecting portion 19sa is formed on the coil connecting portion 16s at an inner terminal end of the thin film coil 19, and a wiring connecting portion 19sb is formed on the insulating film 18 at an outer terminal end of the thin film coil 19. The coil connecting portion 19sa and the wiring connecting portion 19sb are integral with the thin film coil 19. The thin film coils 16 and 19 are electrically connected through the coil connecting portions 16s and 19sa in the opening 18k.

Next, as shown in FIGS. 7A and 7B, the insulating film 20 is selectively formed between turns of the thin film coil 19 (including the coil connecting portion 19sa and the wiring connecting portion 19sb) and in a peripheral region around the turns by using the same material and forming method as in the case of the above-mentioned insulating film 17. The insulating film 20 may be formed in such a manner that the insulating film 20 does not cover the respective top surfaces of the thin film coil 19 and the coil connecting portion 19sa (see FIG. 7A) or the insulating film 20 covers the top surfaces thereof. Since the intermediate connecting pattern 14e to come into contact with and be electrically connected to the wiring connecting portion 19sb is to be located over the wiring connecting portion 19sb in the following step, the insulating film 20 is formed in such a manner that a surface of the wiring connecting portion 19sb is not covered with the insulating film 20.

Next, as shown in FIGS. 7A and 7B, the intermediate connecting portion 14c for constituting part of the top pole 14 is selectively formed with a thickness of about 2.0 $\mu$m to 3.0 $\mu$m on a flat surface in a region extending from over the insulating film 18 to over the rear end portion 14a(3) of the top pole tip 14a by frame plating, for example. The intermediate connecting portion 14c partly overlaps and is in contact with part of the rear end portion 14a(3) of the top pole tip 14a, and thus the intermediate connecting portion 14c is magnetically coupled to the part of the rear end portion 14a(3).

At the same time when the intermediate connecting portion 14c is formed, the magnetic path connecting portion 14d for constituting a part of the top pole 14 is formed on the magnetic path connecting portion 14b, and the intermediate connecting pattern 14e is formed on the wiring connecting portion 19sb. Materials of the intermediate connecting portion 14c, the magnetic path connecting portion 14d and the intermediate connecting pattern 14e are the same as the material of the top pole tip 14a. Since the thin film coil 19 is covered with and protected by the insulating film 20, the thin film coil 19 is avoided from suffering damage due to an influence of the etching process or the like for forming the intermediate connecting portion 14c or the like. The intermediate connecting pattern 14e is a pattern for electrically connecting the thin film coils 16 and 19 to the coil connecting wiring 14fh (see FIG. 8A) to be formed in the following step.

The intermediate connecting portion 14c has a structure in which, for example, as shown in FIG. 15, the intermediate connecting portion 14c has a rectangular planar shape and a width of the intermediate connecting portion 14c is greater than the width of the rear end portion 14a(3) of the top pole tip 14a. However, the width of the intermediate connecting portion 14c may be smaller than the width of the rear end portion 14a(3). Also, for example, a front edge portion of the intermediate connecting portion 14c forms an inclined surface with respect to a flat surface of an underlayer. The intermediate connecting portion 14c is positioned in such a manner that, as shown in FIG. 15, for example, a position of a most front edge 14ct of the intermediate connecting portion 14c substantially coincides with the position of the most front edge of the insulating film pattern 13. The thin film coils 16 and 19, the coil connecting portions 16s and 19sa, the wiring connecting portion 19sb and the intermediate connecting pattern 14e correspond to a specific example of "a thin film coil portion" of the method of manufacturing a thin film magnetic head of the invention.

Next, as shown in FIGS. 7A and 7B, an alumina layer 21p, for example, is formed with a thickness of about 3.0 $\mu$m to 4.0 $\mu$m by, for example, sputtering so as to cover the overall surface of the layer structure as mentioned above, so that a region having a concave and convex structure comprising the intermediate connecting portion 14c, the magnetic path connecting portion 14d, the intermediate connecting pattern 14e, the thin film coil 19 and so on is filled with the alumina layer 21p.

Figures 8A, 8B:
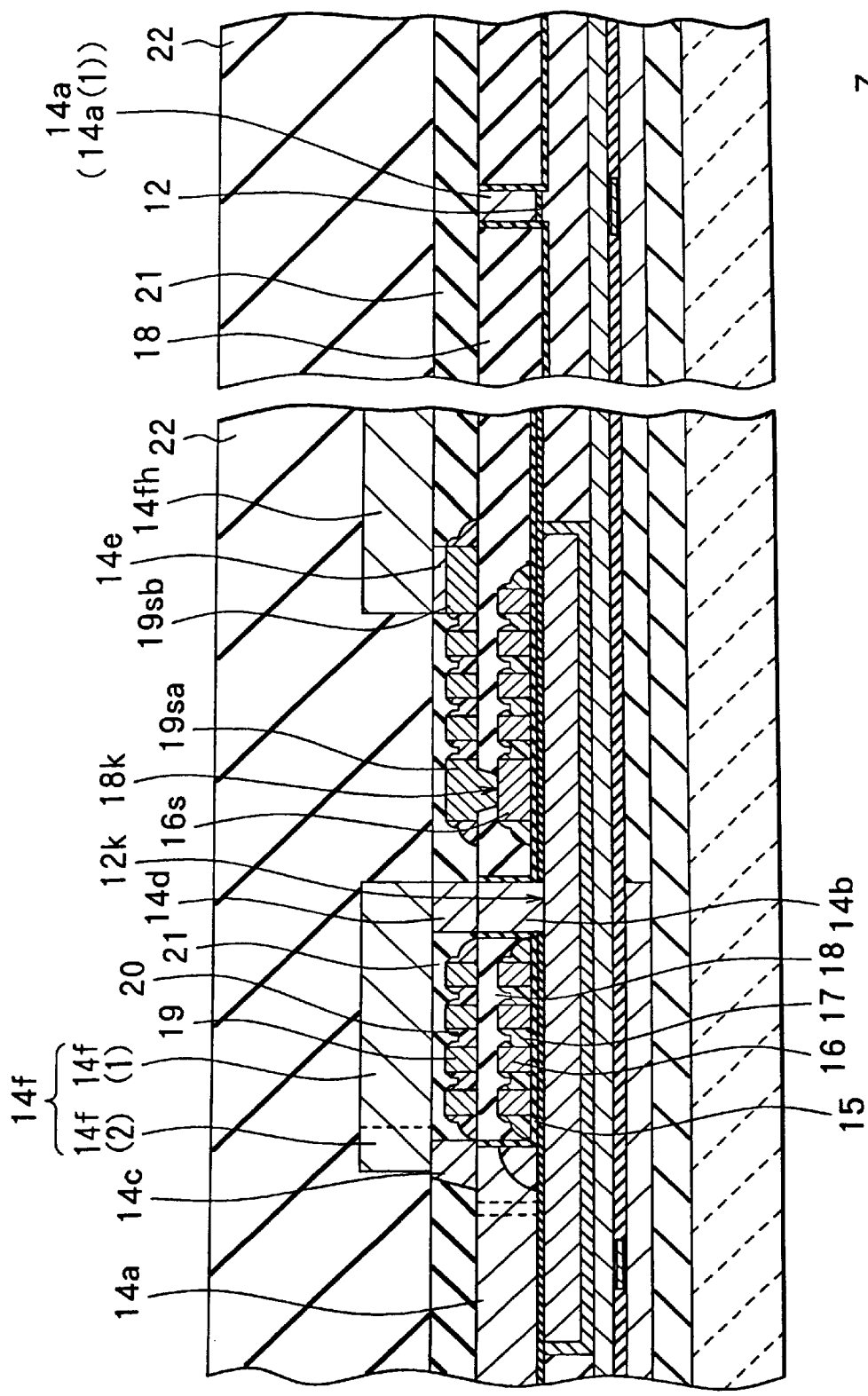
FIGS. 8A and 8B are cross sectional views for describing a step following the step of FIGS. 7A and 7B.

Next, the overall surface of the alumina layer 21p is polished and planarized by CMP, for example. By this polishing process, the insulating film 21 which the thin film coil 19 and so on are to be filled with is formed as shown in FIGS. 8A and 8B. The polishing process takes place until at least the intermediate connecting portion 14c, the magnetic path connecting portion 14d and the intermediate connecting pattern 14e are exposed. The insulating film pattern 13 and the insulating films 15, 17, 18, 20 and 21 correspond to a specific example of "an insulating layer" of the method of manufacturing a thin film magnetic head of the invention.

Next, as shown in FIGS. 8A and 8B, the top yoke 14f for constituting part of the top pole 14 is selectively formed by, for example, frame plating with a thickness of about 2.0 $\mu$m to 3.0 $\mu$m in a region of a planarized region extending from over the magnetic path connecting portion 14d to over the intermediate connecting portion 14c. At the same time when the top yoke 14f is formed, the coil connecting wiring 14fh is formed in a region extending from over the intermediate connecting pattern 14e to an external circuit (not shown). The coil connecting wiring 14fh is a wiring for electrically connecting the intermediate connecting pattern 14e to the external circuit (not shown). Materials of the top yoke 14f and the coil connecting wiring 14fh are the same as the material of the above-mentioned top pole tip 14a.

The top yoke 14f has a structure including a yoke portion 14f(1) having a large area for containing a magnetic flux generated by the thin film coils 16 and 19, and a connecting portion 14f(2) having a uniform width smaller than a width of the yoke portion 14f(1) and extending so as to partly overlap part of the intermediate connecting portion 14c, as shown in FIGS. 8A and 8B and FIG. 15, for example. For instance, the width of the yoke portion 14f(1) is substantially uniform at the rearward portion thereof and is gradually narrower at the frontward portion thereof. For example, the width of the connecting portion 14f(2) is greater than the width of the intermediate connecting portion 14c. However, the width of the connecting portion 14f(2) is not necessarily limited to this case, and, for example, the width of the connecting portion 14f(2) may be smaller than the width of the intermediate connecting portion 14c.

The top yoke 14f is positioned in such a manner that, for example, as shown in FIGS. 8A and 8B and FIG. 15, a most front edge 14ft (see FIG. 15) of the top yoke 14f is recessed with respect to the position of the front edge surface 14ct of the intermediate connecting portion 14c. That is, the intermediate connecting portion 14c and the top yoke 14f are positioned in such a manner that both of them are located away from the air bearing surface 90. For example, a position of a most rear edge of the top yoke 14f substantially coincides with positions of most rear edges of the magnetic path connecting portions 14b and 14d. The positions of the intermediate connecting portion 14c and the top yoke 14f are not necessarily limited to the above-mentioned case. For example, the position of the edge surface 14ct may coincide with the position of the step surface 14ad, or the positions of both of the edge surfaces 14ct and 14ft may coincide with the position of the step surface 14ad. The top yoke 14f is formed in such a manner that the center of the top yoke 14f in the width direction thereof matches the centers of the intermediate connecting portion 14c and the top pole tip 14a in the width directions thereof.

As shown in FIGS. 8A and 8B and FIG. 15, the top pole 14 comprises, for example, the top pole tip 14a, the magnetic path connecting portions 14b and 14d, the intermediate connecting portion 14c, and the top yoke 14f, which are separately formed. In other words, the top pole 14 comprises a collection of these portions. A rearward portion of the top yoke 14f is magnetically coupled to the bottom pole 9 sandwiching the magnetic path connecting portions 14b and 14d via the opening 12k, and a frontward portion of the top yoke 14f is magnetically coupled to the top pole tip 14a sandwiching the intermediate connecting portion 14c. That is, the top pole 14 (the top pole tip 14a, the magnetic path connecting portions 14b and 14d, the intermediate connecting portion 14c and the top yoke 14f) is connected to the bottom pole 9, so that a propagation path of a magnetic flux, namely, a magnetic path is formed. The top pole 14 comprising the top pole tip 14a, the magnetic path connecting portions 14b and 14d, the intermediate connecting portion 14c and the top yoke 14f corresponds to a specific example of "a first magnetic layer" of the method of manufacturing a thin film magnetic head of the invention.

As shown in FIGS. 8A and 8B and FIG. 15, the thin film coils 16 and 19 are electrically connected to the coil connecting wiring 14fh through the intermediate connecting pattern 14e. As shown in FIG. 15, both of a terminal 16x provided at an outer terminal end of the thin film coil 16 and a rear end portion (not shown) of the coil connecting wiring 14fh are connected to an external circuit (not shown), and thus the external circuit allows current to pass through the thin film coils 16 and 19.

Next, as shown in FIGS. 8A and 8B, the overcoat layer 22 made of, for example, alumina is formed with a thickness of about 20 μm to 40 μm by, for example, sputtering so as to cover the overall surface of the layer structure as mentioned above.

Finally, as shown in FIG. 9A, the air bearing surface 90 of the recording head and the reproducing head is formed by machining and polishing, so that the thin film magnetic head is completed. The above-mentioned machining and polishing take place until the bottom pole 9 is exposed to the air bearing surface 90. In this case, a three-dimensional structure around the connecting portion 14f(2) is as shown in FIG. 14.

As shown in FIGS. 9A and 9B and FIG. 15, the position of the most front edge of the insulating film pattern 13 is the reference position for determining the throat height (TH), namely, the throat height zero position (the TH0 position). The throat height (TH) is defined as the distance between the position (the TH0 position) of the leading edge of the insulating film pattern 13 and the position of the air bearing surface 90. "An MRH0 position" in FIGS. 9A, 9B and 15 represents the position of the rear most edge of the MR film 5, i.e., an MR height zero position. An MR height (MRH) corresponds to the distance between the MR height zero position and the position of the air bearing surface 90.

<Operation of Thin Film Magnetic Head>

Next, the brief description is given with reference to FIGS. 9A, 9B, 14 and 15 with regard to a basic operation of the thin film magnetic head manufactured by the method of manufacturing a thin film magnetic head according to the embodiment, namely, an operation for recording data on a recording medium and an operation for reproducing data from a recording medium.

In the thin film magnetic head according to the embodiment, when current passes through the thin film coils 16 and 19 by an external circuit (not shown) at the time of the recording operation of information, a magnetic flux is generated in response to the current. The generated magnetic flux propagates through the top yoke 14f from the yoke portion 14f(1) to the connecting portion 14f(2), and further propagates from the intermediate portion 14a(2) to the front end portion 14a(1) via the intermediate connecting portion 14c magnetically coupled to the top yoke 14f and the rear end portion 14a(3) of the top pole tip 14a. The magnetic flux that propagates to the front end portion 14a(1) further propagates and reaches to the front end portion close to the air bearing surface 90, so that the magnetic flux generates a signal magnetic field for recording to the outside near the write gap layer 12. The signal magnetic field allows a magnetic recording medium to be partly magnetized, thereby enabling information to be recorded on the magnetic recording medium.

For reproducing, a sense current is passed through the MR film 5 of the reproducing head. Since resistance of the MR film 5 changes in response to a reproducing signal magnetic field from the magnetic recording medium, information recorded on the magnetic recording medium can be read out by detecting a change in the resistance according to a change in the sense current.

<Characteristic Functions and Effects of Method of Manufacturing Thin Film Magnetic Head>

Next, characteristic functions and effects of the method of manufacturing a thin film magnetic head according to the embodiment will be described in detail in comparison with a manufacturing method of a comparison with reference to FIGS. 1A to 4B and FIGS. 16 to 22. The description is mainly given below with regard to advantages in manufacturing in the case where the nonmagnetic layer 8 is provided between the top shield layer 7 and the bottom pole 9 so as to form a three-layer structure constituted of the top shield layer 7, the nonmagnetic layer 8 and the bottom pole 9 for the purpose of avoiding propagation of a magnetic flux between the magnetic layers (i.e., the top shield layer 7 and the bottom pole 9).

Firstly, the description is given in sequence with reference to FIGS. 16 to 22 with regard to a series of manufacturing steps in the case where a nonmagnetic layer 81 and a bottom pole 91 are formed so as to have a predetermined pattern shape by a method of manufacturing a thin film magnetic head of the comparison to the method of manufacturing a thin film magnetic head according to the embodiment.

Figure 16:
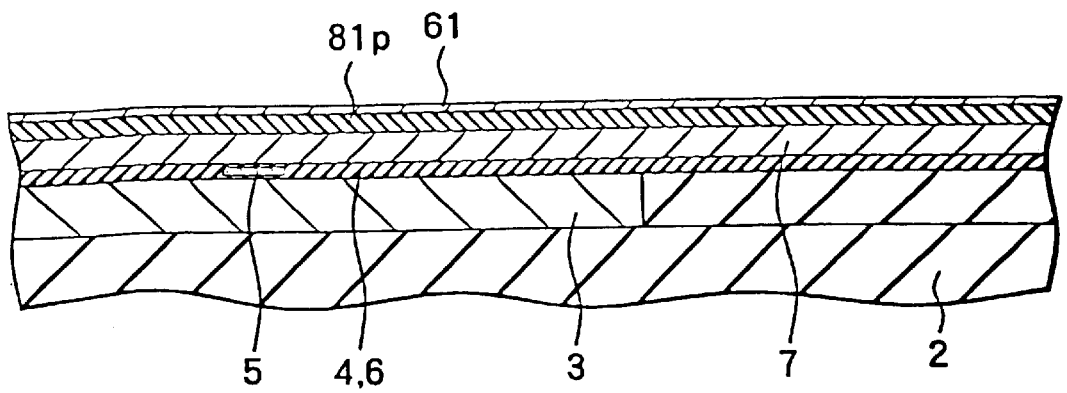
FIG. 16 is a cross sectional view for describing a step of a method of manufacturing a thin film magnetic head of a comparison to the method of manufacturing a thin film magnetic head according to the embodiment.

FIGS. 16 to 21 are cross sectional views for describing a principal part of the manufacturing method of the comparison. FIG. 22 is a table for describing the respective numbers of manufacturing steps and the respective numbers of used masks of the manufacturing method of the comparison and the manufacturing method of the embodiment. In FIGS. 16 to 21, the same parts as the elements shown in FIGS. 1A to 4B are indicated by the same reference numerals. In FIGS. 16 to 21, the substrate 1 is not shown, and the insulating layer 2 is, in part alone, shown. FIGS. 16 to 21 show the manufacturing steps in the case where the top shield layer 7 is formed by, for example, frame plating, and thereafter the nonmagnetic layer 81 and the bottom pole 91 are formed in sequence on the top shield layer 7 by sputtering and electroplating, respectively, without forming the frame pattern 50 (see FIGS. 2A and 2B). The nonmagnetic layer 81 and the bottom pole 91 correspond to the nonmagnetic layer 8 and the bottom pole 9 (see FIGS. 4A and 4B), respectively. Materials and thicknesses of the nonmagnetic layer 81 and the bottom pole 91, methods of forming the nonmagnetic layer 81 and the bottom pole 91 and so on are the same as in the case of the nonmagnetic layer 8 and the bottom pole 9. In FIG. 16, the step of forming the top shield layer 7 and the preceding steps are the same as the above-described steps shown in FIGS. 1A and 1B.

<<Step A1: Formation of Precursory Nonmagnetic Layer 81$p$>>

In the comparison, the top shield layer 7 is formed on the shield gap film 6 by frame plating, and thereafter a precursory nonmagnetic layer 81$p$ is formed on the top shield layer 7 by sputtering as shown in FIG. 16.

<<Step A2: Formation of Electrode Film 61>>

Next, as shown in FIG. 16, an electrode film 61 serving as a seed layer for electroplating is formed with a thickness of about 70 nm on the precursory nonmagnetic layer 81$p$ by sputtering, for example.

<<Step A3: Formation of Photoresist Pattern 62>>

Figure 17:
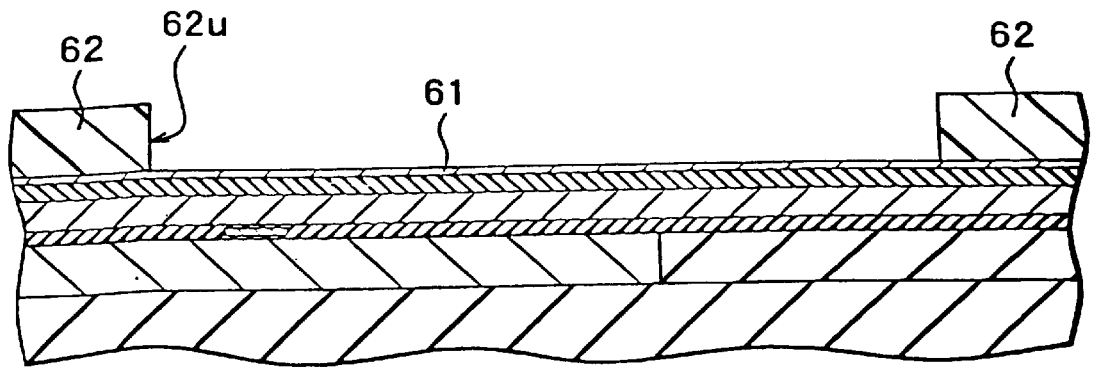
FIG. 17 is a cross sectional view for describing a step following the step of FIG. 16.

Next, a photoresist film (not shown) is formed on the electrode film 61, and thereafter the photoresist film is subjected to photolithography. The photoresist film is patterned by this photolithography, so that a photoresist pattern 62 serving as a frame (an outer frame) to be used to selectively grow a plated film is formed as shown in FIG. 17. The photoresist pattern 62 has an opening 62$u$ corresponding to the planar shapes of the nonmagnetic layer 81 and the bottom pole 91 to be formed in the following step.

<<Step A4: Formation of Bottom Pole 91>>

Figure 18:
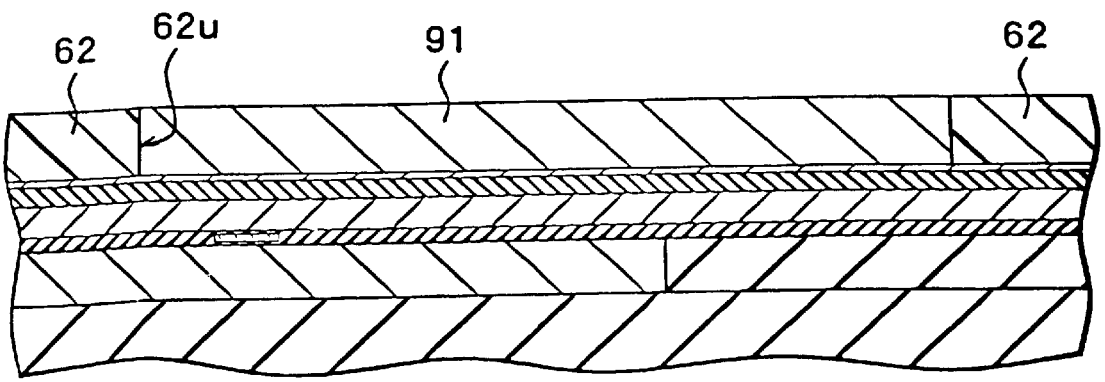
FIG. 18 is a cross sectional view for describing a step following the step of FIG. 17.

Next, a plated film is grown in the opening 62$u$ by electroplating using as a seed layer the electrode film 61 formed in the previous step and using the photoresist pattern 62 as a mask. Thus, the bottom pole 91 having a predetermined pattern shape is formed as shown in FIG. 18. The bottom pole 91 has a planar shape corresponding to a shape of the opening 62$u$.

<<Step A5: Removal of Photoresist Pattern 62>>

Figure 19:
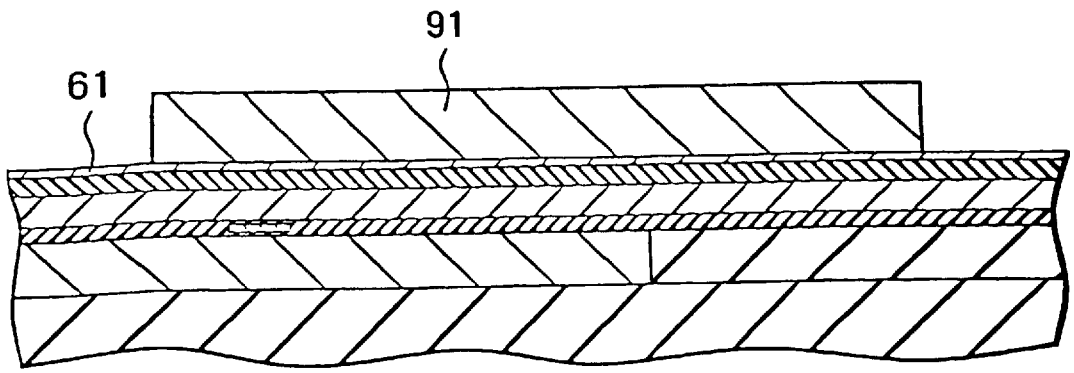
FIG. 19 is a cross sectional view for describing a step following the step of FIG. 18.

Next, the photoresist pattern 62 is removed, so that the electrode film 61 in a region excluding a region where the bottom pole 91 is located is exposed as shown in FIG. 19.

<<Step A6: Formation of Etching Mask 63>>

Next, a photoresist film (not shown) is formed so as to cover the bottom pole 91, and thereafter the photoresist film is subjected to photolithography. The photoresist film is patterned by this photolithography, so that an etching mask 63 made of the photoresist film is selectively formed over the bottom pole 91 as shown in FIG. 20.

<<Step A7: Selective Removal of Electrode Film 61, and Formation of Nonmagnetic Layer 81>>

Figure 20:
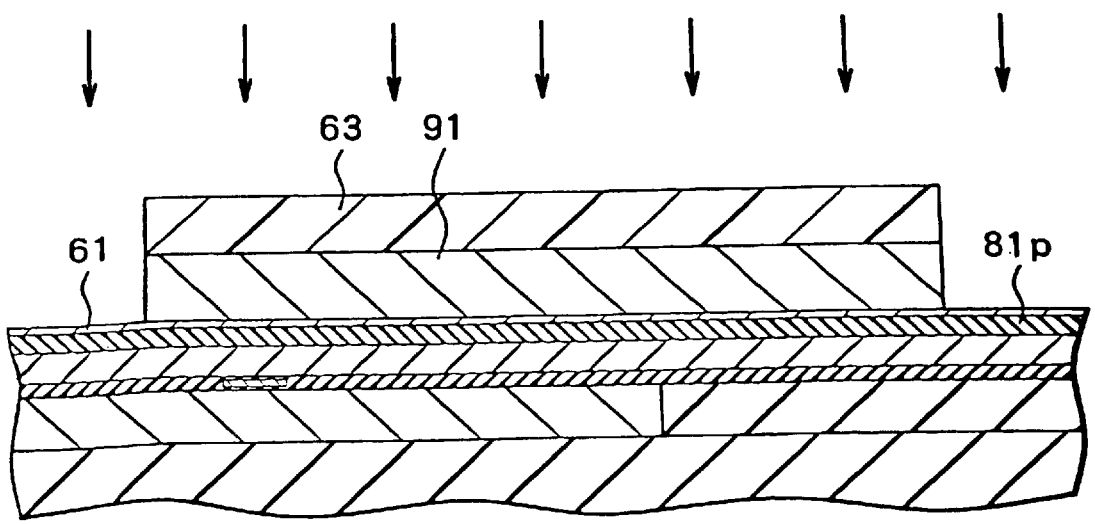
FIG. 20 is a cross sectional view for describing a step following the step of FIG. 19.
Figure 21:
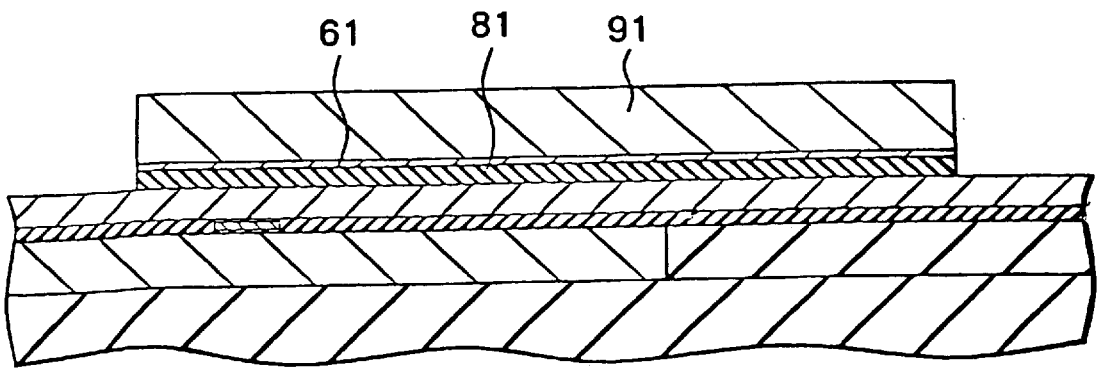
FIG. 21 is a cross sectional view for describing a step following the step of FIG. 20.

Next, as shown in FIG. 20, the overall surface of the layer structure as mentioned above is etched by, for example, ion milling using the etching mask 63. Thus, as shown in FIG. 21, the respective portions of the electrode film 61 and the precursory nonmagnetic layer 81$p$ in the region excluding the region where the bottom pole 91 is located are selectively removed, so that the nonmagnetic layer 81 having a predetermined pattern shape is formed. Referring to FIG. 21, the etching mask 63 itself is also etched by the above-mentioned etching process, so that the etching mask 63 disappears at the time of completion of the etching process.

As described above, the comparison requires at least seven steps (the steps A1 to A7) in order to form the nonmagnetic layer 81 and the bottom pole 91. Of these steps, the step of forming the bottom pole 91 by "frame plating" corresponds to six steps including the steps A2 to A7 (excluding "formation of nonmagnetic layer 81"). To selectively form the top shield layer 7 by frame plating, six steps corresponding to the above-mentioned steps A2 to A7 are additionally required as in the case of forming the bottom pole 91. Therefore, thirteen steps in total, i.e., six steps for forming the top shield layer 7 plus seven steps for forming the nonmagnetic layer 81 and the bottom pole 91 are required in order to form the top shield layer 7, the nonmagnetic layer 81 and the bottom pole 91.

To form the nonmagnetic layer 81 and the bottom pole 91, at least two masks, i.e., the photoresist pattern 62 and the etching mask 63 are used as shown in FIG. 22. To form the top shield layer 7 by frame plating, at least two masks are used as in the case of forming the bottom pole 91. Therefore, at least four masks in total are used in order to form the top shield layer 7, the nonmagnetic layer 81 and the bottom pole 91. To form each of these masks, steps such as a step of forming a mask precursory layer and a step of patterning the mask precursory layer (e.g., photolithography) are required, and therefore a larger number of used masks causes a more complicated manufacturing step and also causes a longer manufacturing time.

On the other hand, the method of manufacturing a thin film magnetic head according to the embodiment shown in FIGS. 1A to 4B and FIG. 22 requires only ten steps in total, i.e., six steps for forming the top shield layer 7 by frame plating plus four steps (steps B1 to B4) for forming the nonmagnetic layer 8 and the bottom pole 9 to be described below, in order to form the top shield layer 7, the nonmagnetic layer 8 and the bottom pole 9.

Step B1: formation of the frame pattern 50 (including the step of forming the precursory frame pattern layer 50$p$, and so on. See FIGS. 1A to 2B)

Step B2: formation of the precursory nonmagnetic layer 8$p$ (see FIGS. 3A and 3B)

Step B3: formation of the precursory bottom pole layer 9$p$ (see FIGS. 3A and 3B)

Step B4: formation of the nonmagnetic layer 8 and the bottom pole 9 by CMP (see FIGS. 4A and 4B)

In the embodiment, only three masks in total, i.e., two masks for forming the top shield layer 7 by frame plating plus one mask (the frame pattern 50) for forming the nonmagnetic layer 8 and the bottom pole 9 are used.

As described above, the embodiment can reduce the number of steps required for forming the top shield layer 7, the nonmagnetic layer 8 and the bottom pole 9 from thirteen to ten and can reduce the number of used masks from four to three, as compared to the comparison. Therefore, the time required for manufacturing a thin film magnetic head can be reduced.

The above-mentioned procedure for forming the bottom pole 91 by "frame plating" is also used to form the bottom shield layer 3, the top shield layer 7 and the top pole 14 (the top pole tip 14$a$, the magnetic path connecting portions 14$b$ and 14$d$, the intermediate connecting portion 14$c$, the top yoke 14$f$) and the coil connecting wiring 14$fh$ and so on.

<Other Effects of Method of Manufacturing Thin Film Magnetic Head>

Figure 23:
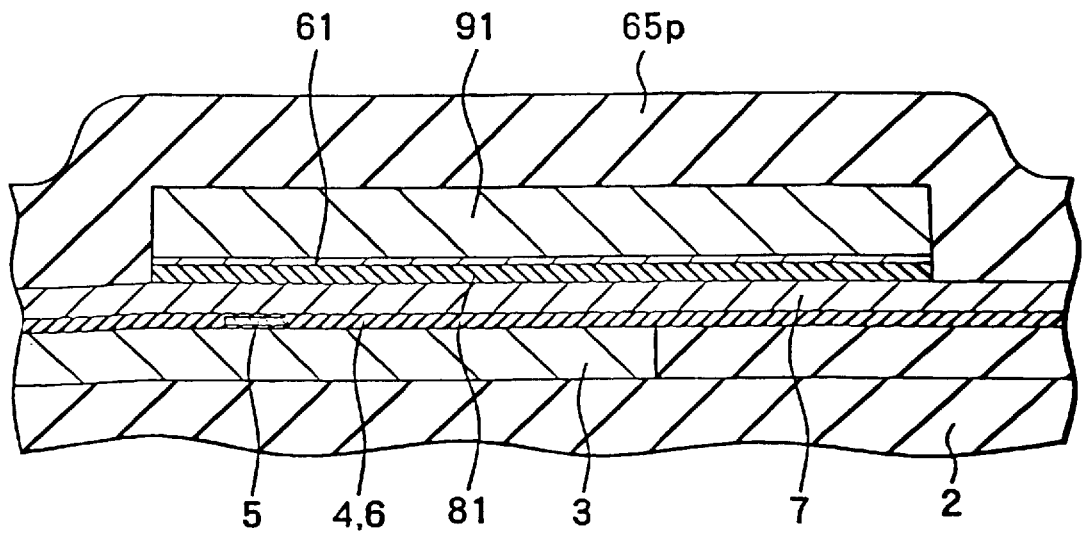
FIG. 23 is a cross sectional view for describing a step following the step of FIG. 21.
Figure 24:
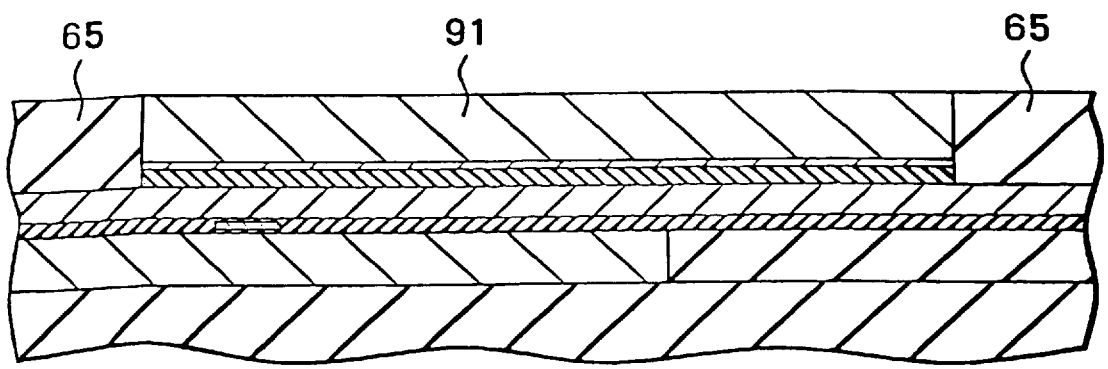
FIG. 24 is a cross sectional view for describing a step following the step of FIG. 23.

Moreover, the embodiment not only can reduce the number of manufacturing steps required for forming the top shield layer 7, the nonmagnetic layer 8 and the bottom pole 9 but also can reduce the number of manufacturing steps from the following viewpoint. For example, the manufacturing method of the comparison additionally requires a step of forming an alumina layer 65p so as to cover the overall surface of the layer structure (see FIG. 23) and a step of forming an insulating film 65 by polishing the alumina layer 65p (see FIG. 24), in order to magnetically separate the bottom pole 91 from a peripheral region around the bottom pole 91 after forming the bottom pole 91 (see FIG. 21). On the other hand, in the embodiment, as shown in FIGS. 3A and 3B and FIGS. 4A and 4B, the frame pattern 50 made of a nonmagnetic material such as alumina not only functions as a mask for patterning the precursory bottom pole layer 9p but also functions as a shield for magnetically separating the bottom pole 9 from a peripheral region around the bottom pole 9 after forming the bottom pole 9. Thus, there is no need for a step of forming an additional member for magnetically separating the bottom pole 9 from the peripheral region around the bottom pole 9, and therefore the number of manufacturing steps can be reduced. This also contributes to the reduced time required for manufacturing a thin film magnetic head.

In the embodiment, since a nickel-iron alloy, iron nitride, an amorphous alloy (a cobalt-iron alloy, a zirconium-cobalt-iron alloy or the like) or the like having high saturation magnetic flux density is used as the materials of the top pole 14 (the top pole tip 14a and so on) and the bottom pole 9, saturation of a magnetic flux within the top pole 14 and the bottom pole 9 can be avoided and thus propagation of a magnetic flux can be smoothed. Therefore, superior overwrite characteristics can be ensured.

In the embodiment, the distance L1 (see FIGS. 3A and 3B) between the step region 9pr and the MR film 5 is properly determined, so that the embodiment has the following advantage. That is, as shown in FIGS. 3A and 3B, the precursory bottom pole layer 9p made of iron nitride includes a cranked step portion (hereinafter sometimes referred to as "the step region 9pr") corresponding to the step portion between the surface of the frame pattern 50 and the surface of the top shield layer 7. A direction in which the step region 9pr extends is substantially perpendicular to the surface of the underlayer (the top shield layer 7), for example. In this case, crystalline anisotropy occurs in a sputtered film made of iron nitride near the step region 9pr, and, as a result, magnetic flux transmittance may deteriorate. This tendency becomes more noticeable, when sputtering is used as a method of forming the precursory bottom pole layer 9p, and as the precursory bottom pole layer 9p bends more sharply, that is, as the direction in which the step region 9pr extends is closer to perpendicular to the surface of the underlayer (the top shield layer 7). When the magnetic flux transmittance deteriorates, a phenomenon of saturation of a magnetic flux occurs in the process of propagation of the magnetic flux, or magnetic noise is caused. Specifically, when the step region 9pr is close to the region where the MR film 5 is located, that is, when the distance L1 is short, magnetic noise caused in the bottom pole 9 near the step region 9pr reaches to the MR film 5 after forming the bottom pole 9, and thus an adverse influence resulting from the magnetic noise interferes with the reproducing operation of the thin film magnetic head. In view of this problem, in the embodiment, the distance L1 is equal to or more than 4.0 $\mu$m to 5.0 $\mu$m, and the step region 9pr is located at a sufficient distance from the region where the MR film 5 is located, so that the above-mentioned disadvantage can be avoided.

In the embodiment, provided that the respective widths of the front end portion 14a(1), the intermediate portion 14a(2) and the rear end portion 14a(3) constituting the top pole tip 14a are W1, W2 and W3, the relative widths of these portions hold for W1<W2<W3. Thus, provided that the allowable volumes of magnetic flux capable of being contained within the above-mentioned portions 14a(1), 14a(2) and 14a(3) (hereinafter referred to as "magnetic volume") are V1, V2 and V3, respectively, the relative magnetic volumes of the portions also hold for V1<V2<V3. Therefore, in the process in which a magnetic flux flowing into the top pole tip 14a propagates from the rear end portion 14a(3) to the front end portion 14a(1) via the intermediate portion 14a(2), the magnetic flux is focused in a stepwise fashion according to a stepwise reduction in the magnetic volume, so that a sufficient volume of magnetic flux is supplied to the front end portion 14a(1). Accordingly, superior overwrite characteristics can be ensured.

In the embodiment, as shown in FIGS. 7A and 7B and FIGS. 8A and 8B, the intermediate connecting pattern 14e is provided on the wiring connecting portion 19sb so that a position of a top surface of the intermediate connecting pattern 14e may be located higher than positions of top surfaces of both of the intermediate connecting portion 14c and the magnetic path connecting portion 14d, and, therefore, when these portions are covered with alumina and then a surface of alumina is polished in order to form the insulating film 21, the intermediate connecting pattern 14e as well as both of the intermediate connecting portion 14c and the magnetic path connecting portion 14d can be exposed. Thus, there is no need for a step of forming an opening by removing part of the insulating film 21 in order to connect the wiring connecting portion 19sb to the coil connecting wiring 14fh, as distinct from the case where the intermediate connecting pattern 14e is not formed. Moreover, an additional step for forming the intermediate connecting pattern 14e is not necessary because the intermediate connecting pattern 14e is formed by the same step as the step of forming both of the intermediate connecting portion 14c and the magnetic path connecting portion 14d. Therefore, the number of manufacturing steps can be reduced.

In the embodiment, the top yoke 14f is formed on the underlayer planarized by a polishing process, so that the top yoke 14f can be formed with high accuracy. This effect is achieved when the intermediate connecting portion 14c, the magnetic path connecting portion 14d, the coil connecting wiring 14fh and so on are formed on the flat underlayer, as well as when the top yoke 14f is formed.

In the embodiment, the insulating film pattern 13 is provided on the write gap layer 12 in a region corresponding to a contact surface between the top pole tip 14a and the intermediate connecting portion 14c, thereby enabling avoiding a phenomenon in which a magnetic flux flowing from the intermediate connecting portion 14c into the top pole tip 14a passes through the thin write gap layer 12 and propagates to the bottom pole 9, i.e., "leakage of magnetic flux", as distinct from the case where the insulating film pattern 13 is not provided. The reason is that the insulating film pattern 13 functions as a shield for shielding propagation of a magnetic flux from a region over the insulating film pattern 13 to a region under the insulating film pattern 13. Therefore, the magnetic flux flowing from the intermediate connecting portion 14c into the top pole tip 14a reaches to the front end portion 14a(1) without loss, so that superior overwrite characteristics can be ensured.

<Modification of Method of Forming Top Shield Layer 7, Nonmagnetic Layer 8 and Bottom Pole 9>

In the above-described embodiment, the top shield layer 7 is formed by frame plating and the precursory bottom pole layer 9p is formed by sputtering, but the methods of forming the top shield layer 7 and the precursory bottom pole layer 9p are not necessarily limited to this case, and, for example, the top shield layer 7 and the precursory bottom pole layer 9p may be formed by using any combination of forming methods listed in II to IV in FIG. 25. FIG. 25 shows an example of the combinations of forming methods for forming the top shield layer 7 and the precursory bottom pole layer 9p. The combination of forming methods listed in I in FIG. 25 corresponds to the combination described by referring to the above-mentioned embodiment. The columns "change in the number of manufacturing steps" and "change in the number of used masks" in FIG. 25 indicate changes in the number of manufacturing steps and the number of used masks, respectively, which are required for forming the top shield layer 7, the nonmagnetic layer 8 and the bottom pole 9. Of numeric values in the column "change in the number of manufacturing steps", each of the numeric values on the left of the arrows (→) represents the number of manufacturing steps of the manufacturing method of the comparison, whereas each of the numeric values on the right of the arrows (→) represents the number of manufacturing steps of the manufacturing method according to the embodiment. The same holds true for numeric values in the column "change in the number of used masks". Sputtering is used as the method of forming the nonmagnetic layer 8, as in the case of the above-described embodiment.

In the case of II shown in FIG. 25, that is, to form the top shield layer 7 by frame plating and form a precursory bottom pole layer 79p by electroplating, there are required eleven steps in total, i.e., six steps for forming the top shield layer 7 plus five steps (steps C1 to C5) for forming the nonmagnetic layer 8 and a bottom pole 79 to be described below.

Figure 26:
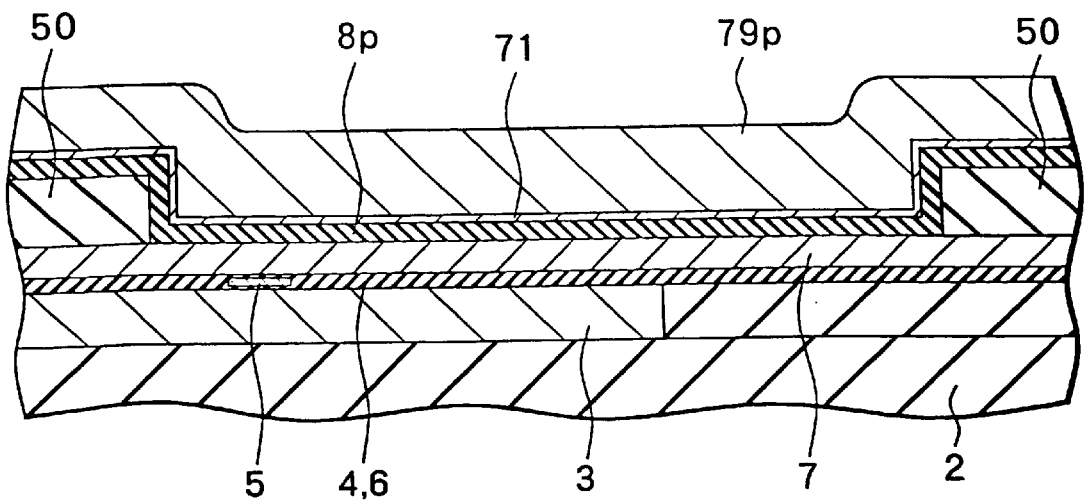
FIG. 26 is a cross sectional view for describing a step of a method of manufacturing a thin film magnetic head of the modification shown in FIG. 25.

Step C1: formation of the frame pattern 50 (see FIG. 26)

Step C2: formation of the precursory nonmagnetic layer 8p (see FIG. 26)

Step C3: formation of an electrode film 71 (see FIG. 26)

Step C4: formation of the precursory bottom pole layer 79p (see FIG. 26)

Figure 27:
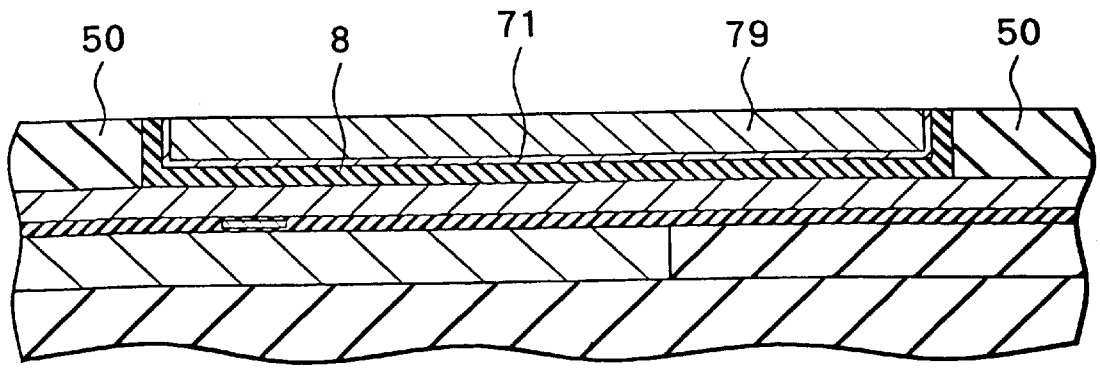
FIG. 27 is a cross sectional view for describing a step following the step of FIG. 26.

Step C5: formation of the nonmagnetic layer 8 and the bottom pole 79 by CMP (see FIG. 27)

In this case, since the precursory bottom pole layer 79p is patterned by a polishing process in "the step C5" so as to have a desired pattern shape, it is not necessary to use a photoresist pattern for serving as a mask for selectively growing a plated film. That is, general electroplating can be used as a method of forming the precursory bottom pole layer 79p, and thus there is no need for the step of forming the photoresist pattern (the step A4, see FIG. 22) and the step of removing the photoresist pattern (the step A5, see FIG. 22). Since part of the electrode film 71 to be removed is removed by the above-mentioned polishing process, there is no need for the steps of forming a new etching mask and removing the electrode film 71 after forming the bottom pole 79 (the steps A6 and A7, see FIG. 22). In this case, the number of used masks is equal to three in total, i.e., two masks for forming the top shield layer 7 plus one mask (the frame pattern 50) for forming the bottom pole 79.

In the case of III shown in FIG. 25, that is, to form both of the top shield layer 7 and the precursory bottom pole layer 9p by sputtering, five steps (steps D1 to D5) to be described below are required. In this case, the number of used masks is only one (the frame pattern 50).

Step D1: formation of the top shield layer 7

Step D2: formation of the frame pattern 50

Step D3: formation of the precursory nonmagnetic layer 8p

Step D4: formation of the precursory bottom pole layer 9p

Step D5: formation of the nonmagnetic layer 8 and the bottom pole 9 by CMP

In the case of IV shown in FIG. 25, that is, to form the top shield layer 7 by sputtering and form the precursory bottom pole layer 9p by electroplating, there are required six steps in total, i.e., one step for forming the top shield layer 7 (the same step as the above-mentioned step D1) plus five steps for forming the nonmagnetic layer 8 and the bottom pole 9 (the same steps as the above-mentioned steps C1 to C5). In this case, the number of used masks is only one (the frame pattern 50).

As described above, in any case of II to IV shown in FIG. 25, the number of manufacturing steps and the number of masks required for forming the top shield layer 7, the nonmagnetic layer 8 and the bottom pole 9 can be reduced, and therefore the time required for manufacturing a thin film magnetic head can be reduced. Preferably, plating (frame plating or electroplating) is used as the method of forming the top shield layer 7 and the precursory bottom pole layer 9p (79p) in that the composition of Permalloy that is the materials of the layers 7 and 9p (79p) is properly controlled. Frame plating may be used as the method of forming the precursory bottom pole layer 9p. In this case, the number of manufacturing steps and the number of used masks can be reduced, as compared to the case of the comparison.

<Another Modification of Method of Manufacturing Thin Film Magnetic Head>

Figure 28:
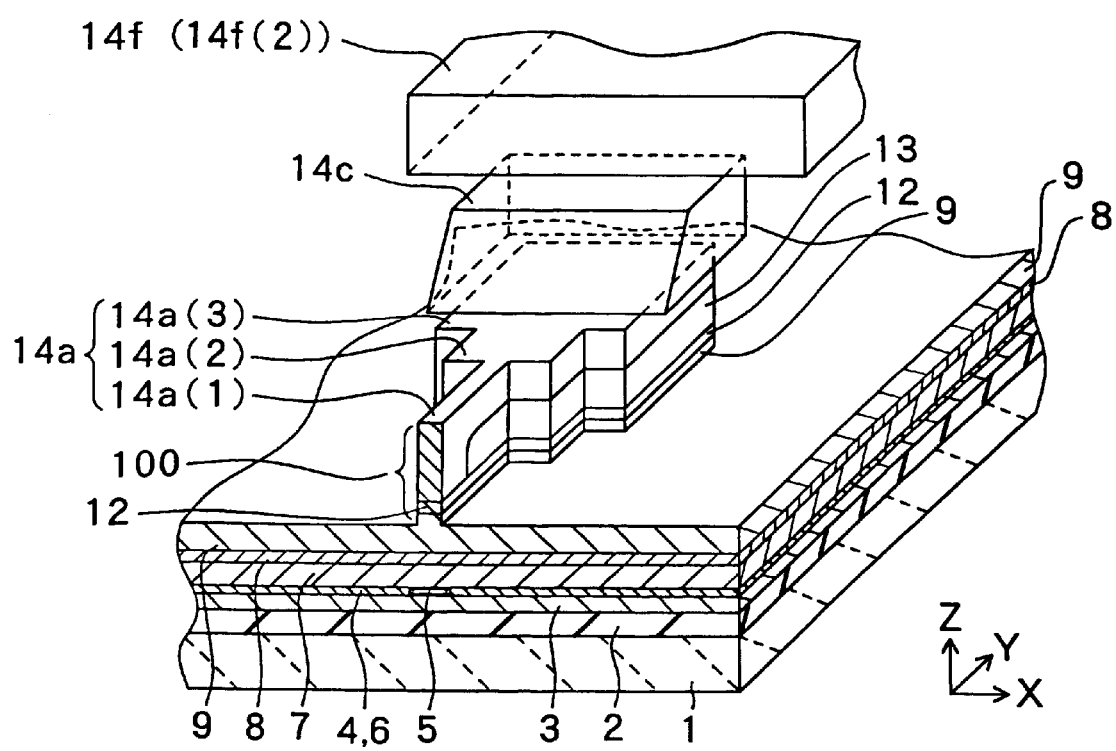
FIG. 28 is a perspective view of another modification of the thin film magnetic head according to the first embodiment of the invention.

In the embodiment, the description has been given with regard to the case where, as shown in FIG. 14, the most front edge of the insulating film pattern 13 is located rearward with respect to a coupling portion between the intermediate portion 14a(2) and the rear end portion 14a(3) of the top pole tip 14a, but the position of the insulating film pattern 13 is not necessarily limited to this case. For example, as shown in FIG. 28, the most front edge of the insulating film pattern 13 may be located in a region where the front end portion 14a(1) of the top pole tip 14a extends. In this case, the phenomenon of "leakage of magnetic flux" can be avoided in a wider range of a region where the insulating film pattern 13 extends, as compared to the case shown in FIG. 14.

Second Embodiment

Next, a second embodiment of the invention will be described.

Figure 36:
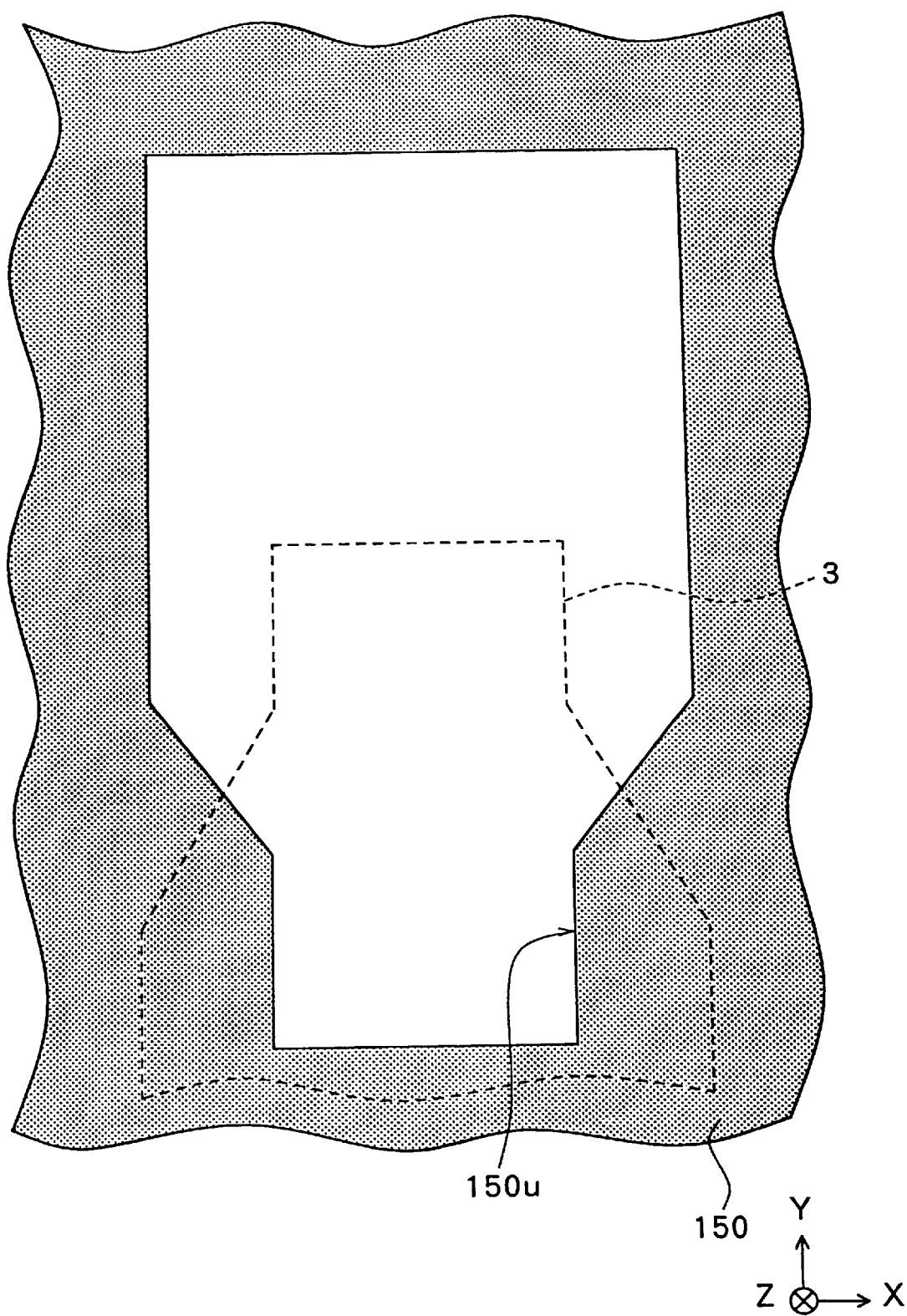
FIG. 36 is a plan view corresponding to the cross sectional views shown in FIGS. 29A and 29B.
Figure 37:
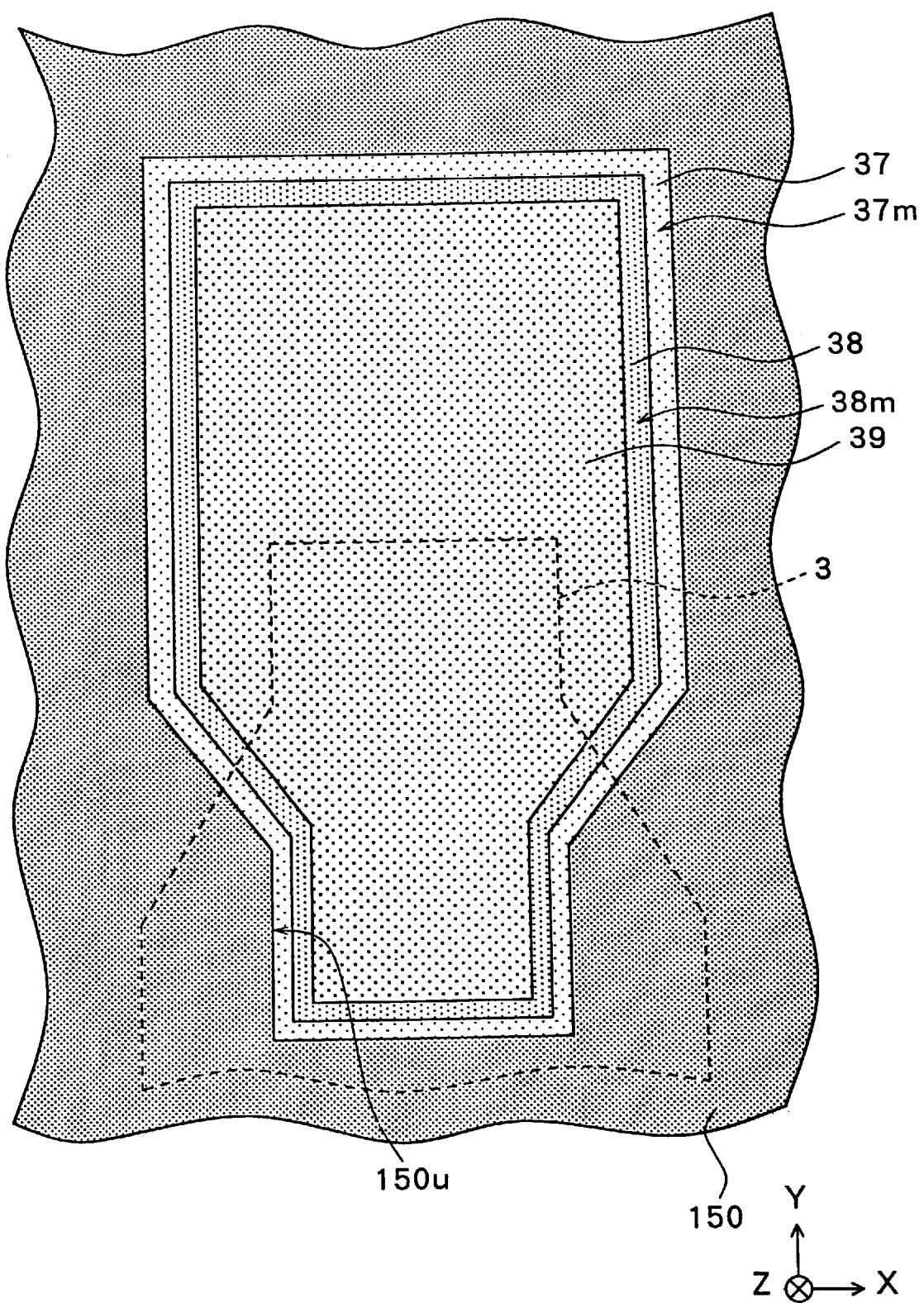
FIG. 37 is a plan view corresponding to the cross sectional views shown in FIGS. 31A and 31B.
Figure 38:
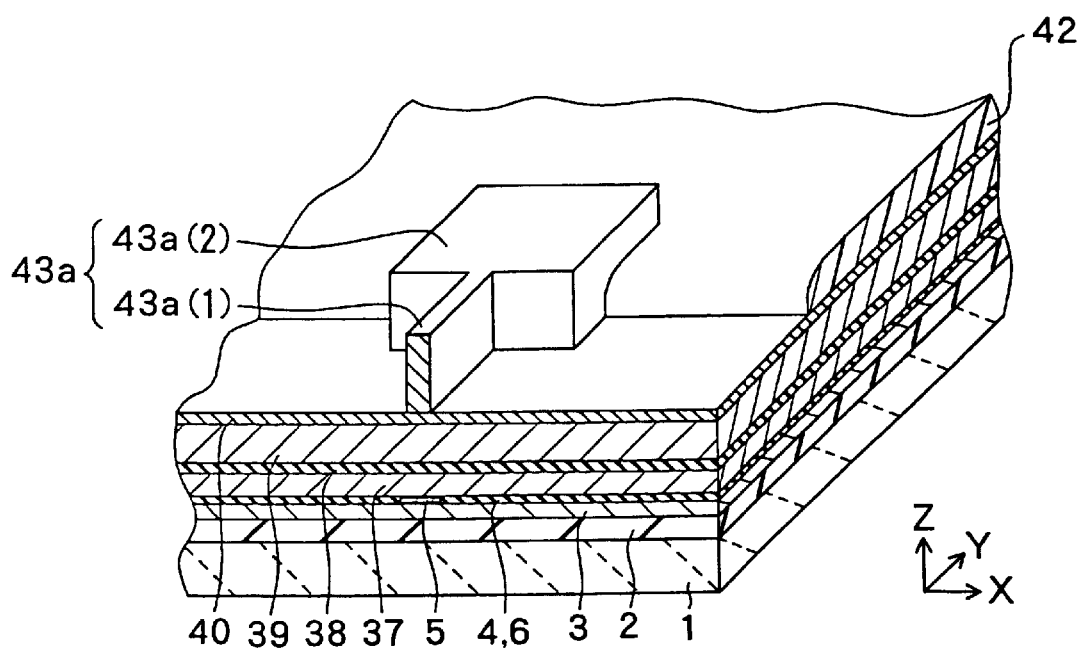
FIG. 38 is a perspective view corresponding to the cross sectional views shown in FIGS. 32A and 32B.
Figure 39:
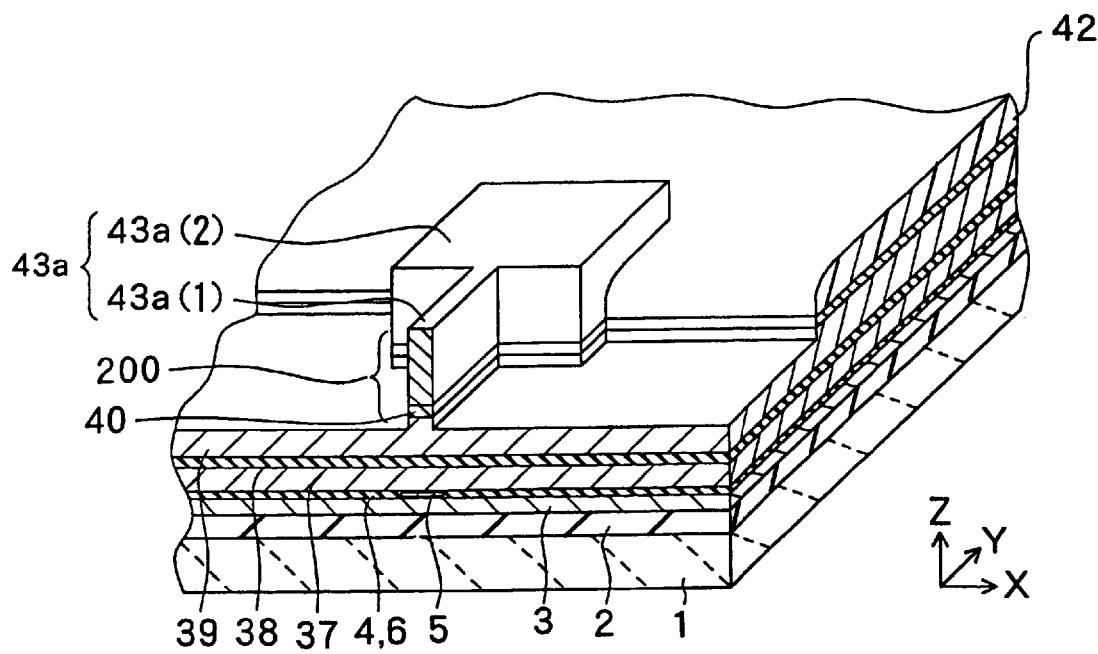
FIG. 39 is a perspective view corresponding to the cross sectional views shown in FIGS. 33A and 33B.
Figure 40:
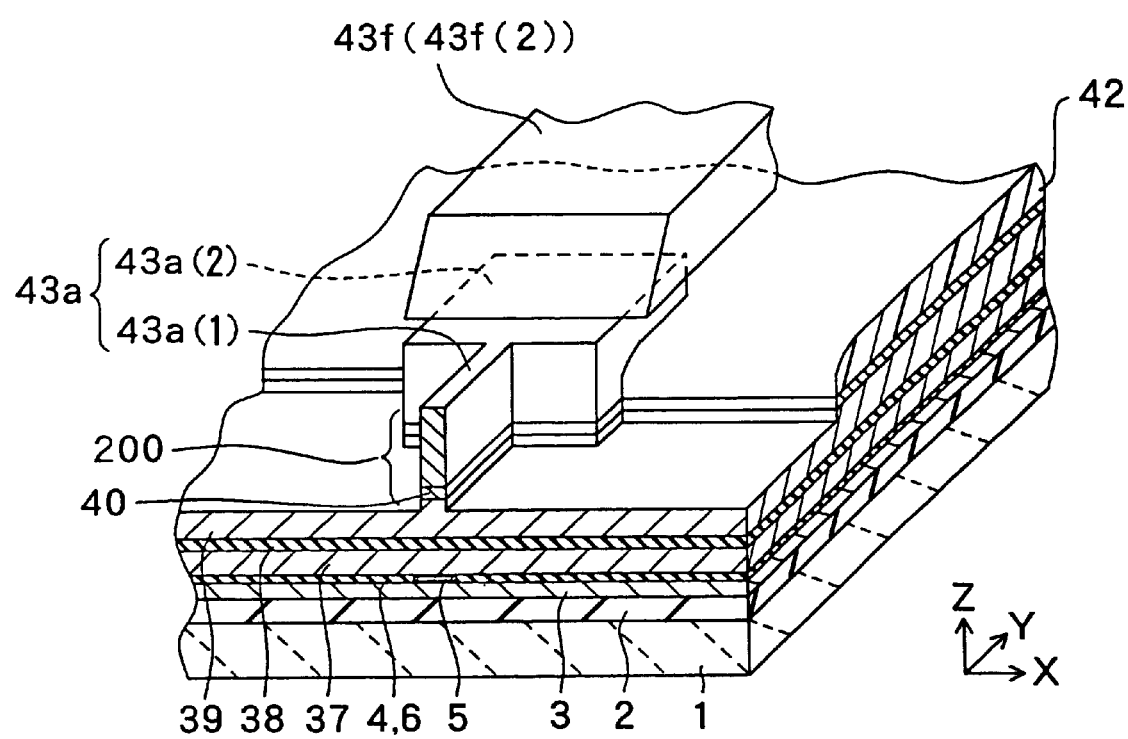
FIG. 40 is a perspective view corresponding to the cross sectional views shown in FIGS. 35A and 35B.

Firstly, the description is given with reference to FIGS. 29A to 41 with regard to a method of manufacturing a composite thin film magnetic head as a method of manufacturing a thin film magnetic head according to the second embodiment of the invention. FIGS. 29A, 30A, 31A, 32A, 33A, 34A and 35A show a cross section perpendicular to an air bearing surface, and FIGS. 29B, 30B, 31B, 32B, 33B, 34B and 35B show a cross section of a pole portion parallel to the air bearing surface. FIGS. 36 and 37 are plan views corresponding to main manufacturing steps, and FIGS. 38 to 40 are perspective views corresponding to the main manufacturing steps. FIG. 36 corresponds to a state shown in FIGS. 29A and 29B, and FIG. 37 corresponds to a state shown in FIGS. 31A and 31B. FIG. 38 corresponds to a state shown in FIGS. 32A and 32B, FIG. 39 corresponds to a state shown in FIGS. 33A and 33B, and FIG. 40 corresponds to a state shown in FIGS. 35A and 35B. FIGS. 36 and 37 do not show the substrate 1, the insulating layer 2 and so on shown in FIGS. 29A and 29B and FIGS. 31A and 31B. FIG. 39 does not show an alumina layer 44p and so on shown in FIGS. 33A and 33B, and FIG. 40 does not show insulating films 42 and 44, a thin film coil 41, an overcoat layer 45 and so on shown in FIGS. 35A and 35B.

Figure 41:
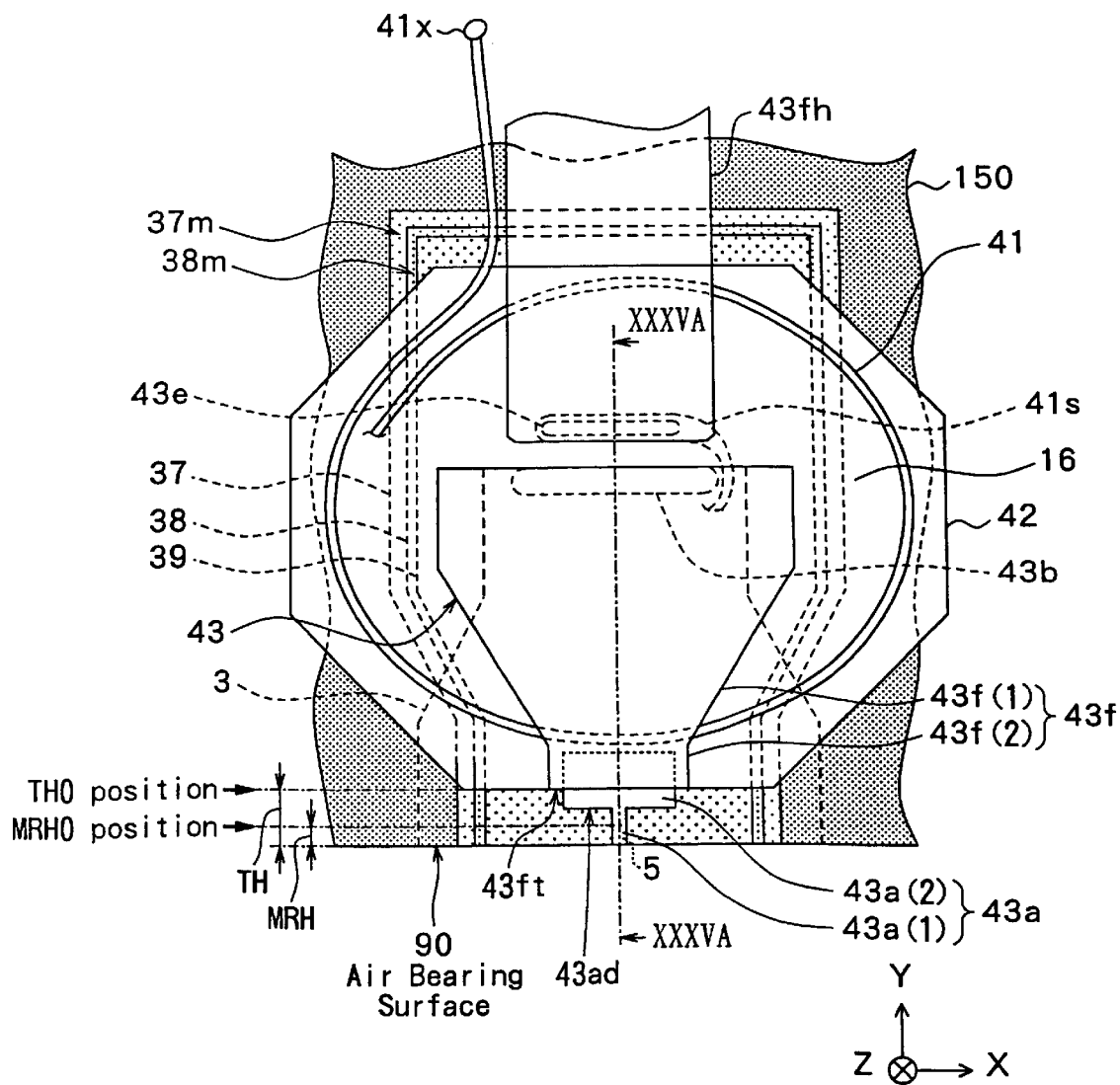
FIG. 41 is a plan view of a planar structure of a thin film magnetic head according to the second embodiment of the invention.

FIG. 41 shows a schematic representation of a planar structure of a thin film magnetic head manufactured by the method of manufacturing a thin film magnetic head according to the embodiment. FIG. 41 does not show the insulating films 42 and 44, the overcoat layer 45 and so on. FIG. 41 shows the thin film coil 41 but shows only the outermost periphery portion thereof FIG. 35A corresponds to a cross section taken in the direction of the arrows along the line XXXVA—XXXVA of FIG. 41.

The expressions about the X-axis, Y-axis and Z-axis directions in FIGS. 29A to 41 are the same as in the case of the above-described first embodiment. In FIGS. 29A to 41, the same parts as the elements of the above-described first embodiment are indicated by the same reference numerals.

In the method of manufacturing a thin film magnetic head according to the second embodiment, the step of forming the shield gap film 6 shown in FIGS. 29A and 29B and the preceding steps are the same as the step of forming the shield gap film 6 of the above-described first embodiment shown in FIGS. 1A and 1B and the preceding steps, and thus the description thereof is omitted.

In the second embodiment, after forming the shield gap film 6, as shown in FIGS. 29A and 29B and FIG. 36, for example, a frame pattern 150 having an opening 150u is selectively formed with a thickness of about 4.0 µm on a surface of the shield gap film 6 by using the same material and forming method as in the case of forming the frame pattern 50 of the above-described first embodiment. The frame pattern 150 is made of a nonmagnetic material, e.g., an inorganic insulating material such as alumina. Structural features of the frame pattern 150 are substantially the same as those of the frame pattern 50 (see FIGS. 2A and 2B). For example, a shape of the opening 150u is substantially the same as the shape of the opening 50u of the frame pattern 50 of the above-described first embodiment, and substantially corresponds to planar shapes of a top shield layer 37, a nonmagnetic layer 38 and a bottom pole layer 39 to be formed in the following step. Preferably, the frame pattern 150 is formed in such a manner that a distance L2 (FIGS. 30A and 30B) between a step region of a precursory bottom pole layer 39p to be formed in the following step and the MR film 5 is equal to or more than, for example, 4.0 µm to 5.0 µm, as in the case of forming the frame pattern 50 of the above-described first embodiment.

Next, as shown in FIGS. 30A and 30B, a precursory top shield layer 37p made of, for example, Permalloy (Ni: 45 wt %, Fe: 55 wt %) having high saturation magnetic flux density is formed with a thickness of about 1.0 µm to 1.5 µm by, for example, electroplating so as to cover the surface of the shield gap film 6 and the surface of the frame pattern 150 that are exposed in the opening 150u. Then, a precursory nonmagnetic layer 38p made of, for example, alumina is formed with a thickness of about 0.15 µm to 0.2 µm on the precursory top shield layer 37p by sputtering, for example. Then, the precursory bottom pole layer 39p made of, for example, nickel iron is formed with a thickness of about 2.0 µm to 2.5 µm on the precursory nonmagnetic layer 38p by sputtering, for example. The precursory top shield layer 37p, the precursory nonmagnetic layer 38p and the precursory bottom pole layer 39p extend so as to partly bend corresponding to a step portion between the surface of the frame pattern 150 and the surface of the underlayer (the shield gap film 6). The precursory top shield layer 37p and the precursory bottom pole layer 39p correspond to a specific example of "a precursory magnetic layer" of the method of forming a magnetic layer pattern of the invention. The precursory top shield layer 37p corresponds to a specific example of "a first precursory magnetic layer" of the method of manufacturing a thin film magnetic head of the invention (claim 6), and the precursory bottom pole layer 39p corresponds to a specific example of "a second precursory magnetic layer" of the method of manufacturing a thin film magnetic head of the invention (claim 6).

Next, the overall surface of the layer structure as mentioned above is polished and planarized by, for example, CMP until the frame pattern 150, for instance, is exposed. Thus, the precursory top shield layer 37p, the precursory nonmagnetic layer 38p and the precursory bottom pole layer 39p covering the frame pattern 150 are, in part, selectively removed, and thus, as shown in FIGS. 31A and 31B, the top shield layer 37, the nonmagnetic layer 38 and the bottom pole 39 are selectively formed so as to have a predetermined pattern shape so that the opening 150u of the frame pattern 150 may be filled with the top shield layer 37, the nonmagnetic layer 38 and the bottom pole 39. The top shield layer 37, the nonmagnetic layer 38 and the bottom pole 39 have a planar shape shown in FIGS. 37 and 41, for example. As shown in FIGS. 31A, 31B, 37 and 41, on the polished surface, the bottom pole 39 is exposed, an end face (38m) of the nonmagnetic layer 38 is exposed around the bottom pole 39, and furthermore an end face (37m) of the top shield layer 37 is exposed around the nonmagnetic layer 38. A magnetic material having high saturation magnetic flux density, such as iron nitride, is used as a material of the bottom pole 39, so that the phenomenon of saturation of a magnetic flux within the bottom pole 39 can be avoided and thus the flow of a magnetic flux can be smoothed. The top shield layer 37 and the bottom pole 39 correspond to a specific example of "a magnetic layer pattern" of the method of forming a magnetic layer pattern of the invention. The top shield layer 37 corresponds to a specific example of "a third magnetic layer" of the method of manufacturing a thin film magnetic head of the invention (claim 6), and the bottom pole 39 corresponds to a specific example of "a second magnetic layer" of the method of manufacturing a thin film magnetic head of the invention (claim 6).

Figures 32A, 32B:
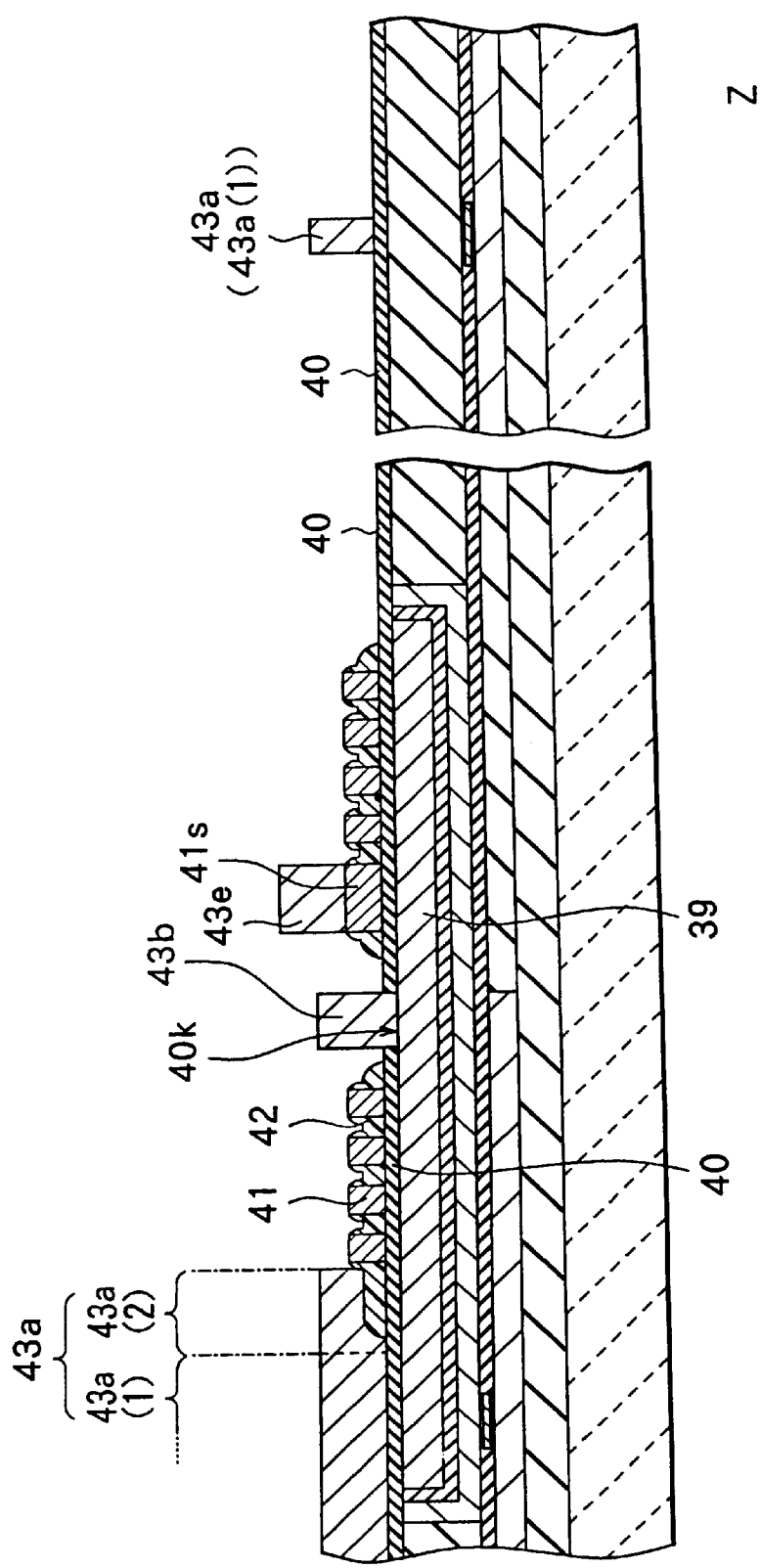
FIGS. 32A and 32B are cross sectional views for describing a step following the step of FIGS. 31A and 31B.

Next, as shown in FIGS. 32A and 32B, a write gap layer 40 made of, for example, alumina is formed with a thickness of about 0.1 µm to 0.2 µm on the planarized surface obtained through polishing, by means of sputtering, for example. The write gap layer 40 is flat over the overall surface thereof. When forming the write gap layer 40, a region where a magnetic path connecting portion 43b is to be formed in the following step is not covered with the write gap layer 40. The region is to be an opening 40k for connecting the bottom pole 39 to a top pole 43 to be formed in the following step. The write gap layer 40 corresponds to a specific example of "a gap layer" of the method of manufacturing a thin film magnetic head of the invention.

Next, as shown in FIGS. 32A and 32B, the thin film coil 41 made of, for example, copper (Cu) for an inductive recording head is selectively formed with a thickness of about 1.0 µm to 1.5 µm on the flat write gap layer 40 over the bottom pole 39 by electroplating, for example. For example, the thin film coil 41 has the same structural features as the thin film coil 16 of the above-described first embodiment has, and the planar structure thereof is as shown in FIG. 41. In FIGS. 32A and 32B, the thin film coil 41 is, in part alone, shown. At the same time when the thin film coil 41 is formed, for example, a wiring connecting portion 41s is integrally formed with the thin film coil 41 on the write gap layer 40 at an inner terminal end of the thin film coil 41. The wiring connecting portion 41s is a portion for electrically connecting the thin film coil 41 to a coil connecting wiring 43fh (see FIG. 34A) to be formed in the following step.

Next, as shown in FIGS. 32A and 32B, the insulating film 42 made of, for example, a photoresist is formed into a predetermined pattern between turns of the thin film coil 41 (including the wiring connecting portion 41s) and in a peripheral region around the turns by high-accuracy photolithography. A method of forming the insulating film 42 is the same as the method of forming the insulating films 17 and 20 of the above-described first embodiment. Portions of the insulating film 42 near the front edges thereof each has a round inclined surface declining in the direction of each edge. The position of the most front edge of the insulating film 42 corresponds to the throat height zero position (the TH0 position).

Next, as shown in FIGS. 32A and 32B and FIG. 38, a top pole tip 43a for constituting part of the top pole 43 is selectively formed by, for example, frame plating with a thickness of about 2.5 μm to 3.5 μm on a region between the flat write gap layer 40 located frontward with respect to a region where the thin film coil 41 is located and the front inclined surface of the insulating film 42. At the same time when the top pole tip 43a is formed, the magnetic path connecting portion 43b for constituting part of the top pole 43 is formed in the opening 40k, and an intermediate connecting pattern 43e is formed on the wiring connecting portion 41s (FIG. 38 does not show the magnetic path connecting portion 43b and the intermediate connecting pattern 43e). The intermediate connecting pattern 43e is a pattern for electrically connecting the thin film coil 41 to the coil connecting wiring 43fh (see FIG. 34A) to be formed in the following step. Permalloy (Ni: 45 wt %, Fe: 55 wt %) or the like, which is a magnetic material having high saturation magnetic flux density, is used as materials of the top pole tip 43a, the magnetic path connecting portion 43b and the intermediate connecting pattern 43e, as in the case of the top pole tip 14a of the above-described first embodiment, for example.

As shown in FIG. 41, both of a terminal 41x, provided at an outer terminal end of the thin film coil 41 and a rear end portion (not shown) of the coil connecting wiring 43fh, are connected to an external circuit (not shown), and thus the external circuit allows current to pass through the thin film coil 41.

For example, as shown in FIGS. 32A, 32B, 38 and 41, the top pole tip 43a has a structure including a front end portion 43a(1) and a rear end portion 43a(2), which are arranged in this order when being viewed from the side to form the air bearing surface 90 in the following step. Structural features of the front end portion 43a(1) and the rear end portion 43a(2) are substantially the same as those of the front end portion 14a(1) and the rear end portion 14a(3) of the top pole tip 14a of the above-described first embodiment, for example (see FIG. 15).

For example, as shown in FIG. 41, the top pole tip 43a is positioned in such a manner that a step surface 43ad of the rear end portion 43a(2) at a coupling portion between the front end portion 43a(1) and the rear end portion 43a(2) is located frontward with respect to the position of the most front edge of the insulating film 42.

Next, the overall surface of the layer structure as mentioned above is etched by about 0.3 μm to 0.4 μm by means of RIE as in the case of forming the pole portion 100 of the above-described first embodiment, using as a mask the top pole tip 43a and a photoresist film (not shown) that is selectively formed in a region located rearward with respect to the position of the most front edge of the insulating film 42. This etching process selectively removes the write gap layer 40, the bottom pole 39 and so on around the top pole tip 43a in a region located frontward with respect to the position of the most front edge of the insulating film 42, so that a pole portion 200 having a trim structure is formed as shown in FIG. 33B and FIG. 39.

Figures 33A, 33B:
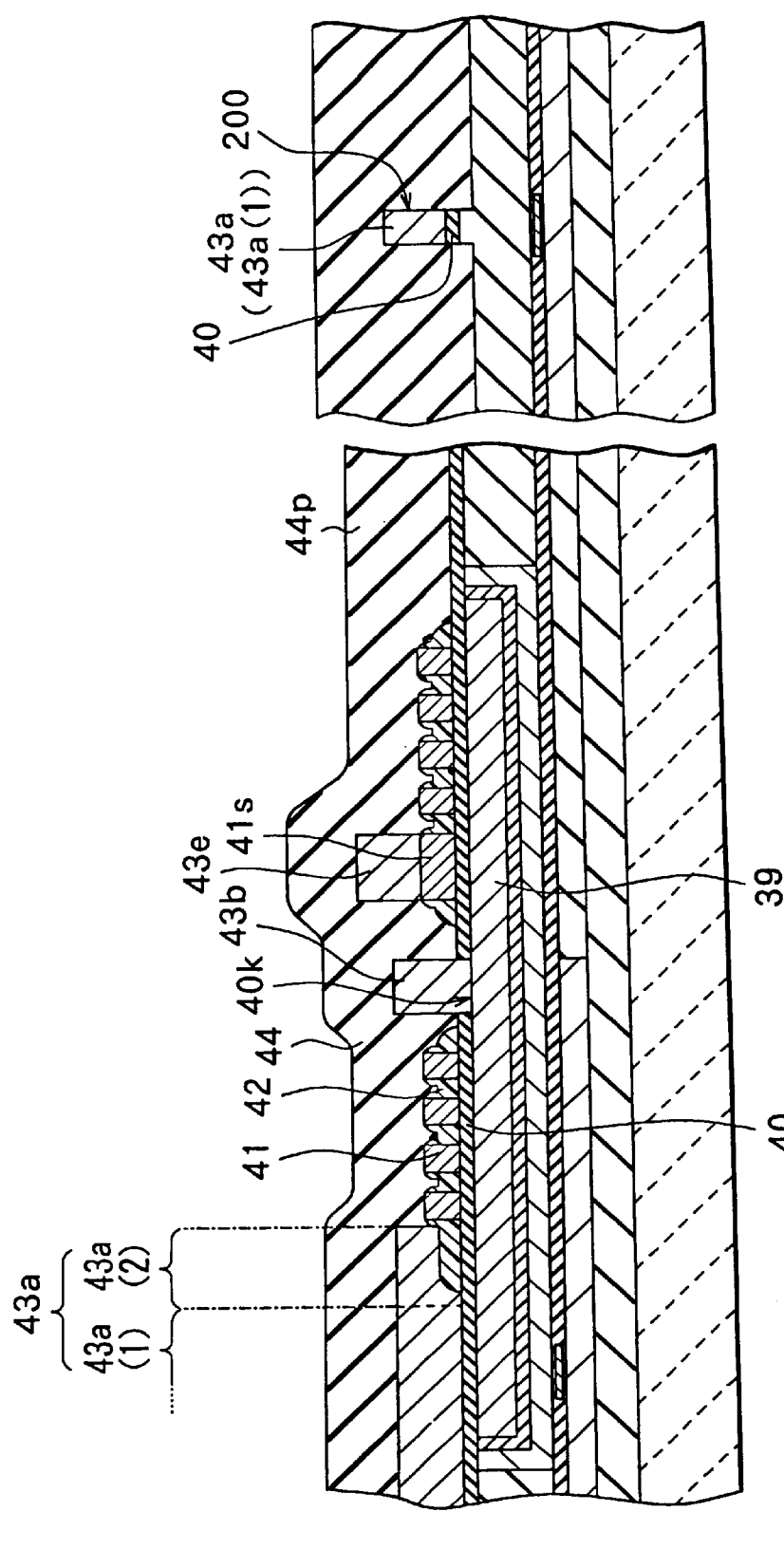
FIGS. 33A and 33B are cross sectional views for describing a step following the step of FIGS. 32A and 32B.

Next, as shown in FIGS. 33A and 33B, the alumina layer 44p, for example, is formed with a thickness of about 3.0 μm to 4.0 μm by, for example, sputtering so as to cover the overall surface of the layer structure as mentioned above, so that a region having a concave and convex structure comprising the top pole tip 43a, the magnetic path connecting portion 43b, the intermediate connecting pattern 43e, the thin film coil 41 and so on is filled with the alumina layer 44p.

Next, the overall surface of the alumina layer 44p is polished and planarized by, for example, CMP, so that the insulating film 44 which the thin film coil 41 and so on are to be filled with is formed as shown in FIGS. 34A and 34B. This polishing process takes place until at least the top pole tip 43a, the magnetic path connecting portion 43b and the intermediate connecting pattern 43e are exposed. The insulating films 42 and 44 correspond to a specific example of "an insulating layer" of the method of manufacturing a thin film magnetic head of the invention.

Next, as shown in FIGS. 34A and 34B, a top yoke 43f for constituting part of the top pole 43 is selectively formed with a thickness of about 2.0 □m to 3.0 □m in a region extending from over the magnetic path connecting portion 43b to over the rear end portion 43a(2) of the top pole tip 43a. At the same time when the top yoke 43f is formed, the coil connecting wiring 43fh is selectively formed in a region extending from over the intermediate connecting pattern 43e to an external circuit (not shown). Materials and methods for forming the top yoke 43f and the coil connecting wiring 43fh and so on are the same as in the case of forming the top pole tip 43a and so on of the above-described first embodiment.

The top yoke 43f has a planar structure shown in FIGS. 34A and 34B and FIG. 41, for example. That is, the top yoke 43f has a yoke portion 43f(1) and a connecting portion 43f(2) corresponding to the yoke portion 14f(1) and the connecting portion 14f(2) of the top yoke 14f of the above-described first embodiment, respectively. The top yoke 43f is positioned in such a manner that, for example, a position of a front edge surface 43ft of the top yoke 43f coincide with the position of the most front edge of the insulating film 42 and at least the edge surface 43ft has an inclined surface with respect to the flat surface of the underlayer. The top pole 43 comprising the top pole tip 43a, the magnetic path connecting portion 43b and the top yoke 43f corresponds to a specific example of "a first magnetic layer" of the method of manufacturing a thin film magnetic head of the invention.

Next, as shown in FIGS. 34A and 34B, the overcoat layer 45 made of, for example, alumina is formed with a thickness of about 20 μm to 40 μm by, for example, sputtering so as to cover the overall surface of the layer structure as mentioned above.

Finally, as shown in FIGS. 35A and 35B, the air bearing surface 90 of the recording head and the reproducing head is formed by machining and polishing, so that the thin film magnetic head is completed. The above-mentioned machining and polishing take place until the bottom pole 39 is exposed to the air bearing surface 90. In this case, a three-dimensional structure around the connecting portion 43*f*(2) is as shown in FIG. 40.

As shown in FIG. 35A and FIG. 41, the position of the most front edge of the insulating film 42 is the reference position for determining the throat height (TH), namely, the throat height zero position (the TH0 position). The throat height (TH) is defined as the distance between the position (the TH0 position) of the most front edge of the insulating film 42 and the position of the air bearing surface 90.

Incidentally, the structural features of the elements other than the above-mentioned elements shown in FIG. 41 are the same as those of the elements of the above-described first embodiment (see FIG. 15).

In the second embodiment, as shown in FIGS. 29A to 31B, the precursory top shield layer 37*p*, the precursory nonmagnetic layer 38*p* and the precursory bottom pole layer 39*p* are formed in sequence so as to cover the frame pattern 150 formed on the surface of the underlayer (the shield gap film 6), and thereafter the overall surface is polished until at least the frame pattern 150 is exposed, whereby the top shield layer 37, the nonmagnetic layer 38 and the bottom pole 39 are formed so as to have a predetermined pattern shape. Therefore, the same functions as in the case of forming the bottom pole 9 and so on of the above-described first embodiment allow reducing the number of manufacturing steps and the number of used masks required for forming the top shield layer 37, the nonmagnetic layer 38 and the bottom pole 39, thereby enabling reducing the time required for manufacturing a thin film magnetic head.

Specifically, the comparison described by referring to the above-mentioned first embodiment requires thirteen steps and four masks, whereas the second embodiment requires only six steps (steps E1 to E6) to be described below and can reduce the number of manufacturing steps from thirteen to six.

Step E1: formation of the frame pattern 150 (see FIGS. 29A and 29B)

Step E2: formation of an electrode film (not shown)

Step E3: formation of the precursory top shield layer 37*p* (see FIGS. 30A and 30B)

Step E4: formation of the precursory nonmagnetic layer 38*p* (see FIGS. 30A and 30B)

Step E5: formation of the precursory bottom pole layer 39*p* (see FIGS. 30A and 30B)

Step E6: formation of the top shield layer 37, the nonmagnetic layer 38 and the bottom pole 39 by CMP (see FIGS. 31A and 31B)

In this case, the same functions as in the case of the above-described first embodiment shown in FIGS. 26 and 27 allow eliminating a need for a step of forming a photoresist pattern for forming the precursory top shield layer 37*p*, a step of removing an electrode film (not shown) and so on. Therefore, the number of used masks can be also reduced from four to one (the frame pattern 150).

Moreover, the second embodiment can avoid an adverse influence from being exerted upon the reproducing operation of the MR film 5. Specifically, in the comparison described by referring to the above-mentioned first embodiment, the electrode film 61 is partly removed by use of an etching process using ion milling in "step A7: selective removal of electrode film 61". In this case, due to an influence of static electricity generated during the etching process, a defect such as a pinhole may be caused in the shield gap films 4 and 6 in which the MR film 5 is buried. When the shield gap films 4 and 6 are damaged due to the caused pinhole or the like, the damage causes insufficient magnetic protection for the MR film and thus has an adverse influence upon the reproducing operation of the MR film 5. On the other hand, the second embodiment does not require the etching process at all and can therefore avoid the above-mentioned disadvantage.

Moreover, in the second embodiment, the intermediate connecting pattern 43*e* is formed over the wiring connecting portion 41*s* provided at the end of the thin film coil 41 by the same step as the step of forming the top pole tip 43*a*. Therefore, the same functions as in the case of forming the intermediate connecting pattern 14*e* (see FIGS. 7A and 7B and FIGS. 8A and 8B) of the above-described first embodiment allow simplifying a step for connecting the thin film coil 41 to the coil connecting wiring 43*fh*, thereby enabling reducing the number of manufacturing steps.

Moreover, in the second embodiment, the front edge surface of the top yoke 43*f* has an inclined surface, and therefore the flow of a magnetic flux flowing from the top yoke 43*f* into the top pole tip 43*a* can be smoothed.

In the second embodiment, the precursory top shield layer 37*p* is formed by electroplating and the precursory bottom pole layer 39*p* is formed by sputtering, but the methods of forming the precursory top shield layer 37*p* and the precursory bottom pole layer 39*p* are not necessarily limited to this case, and, for example, the precursory top shield layer 37*p* and the precursory bottom pole layer 39*p* may be formed by using any combination of forming methods listed in VI to VIII in FIG. 42. FIG. 42 shows an example of the combinations of forming methods for forming the precursory top shield layer 37*p* and the precursory bottom pole layer 39*p*. The combination of forming methods listed in V in FIG. 42 corresponds to the combination described by referring to the above-mentioned embodiment. The same as in the case of FIG. 25 holds true for numeric values in the columns "change in the number of manufacturing steps" and "change in the number of used masks" in FIG. 42. With reference to FIG. 42, the description is given in sequence below with regard to changes in the number of manufacturing steps and the number of used masks for forming the top shield layer 37, the nonmagnetic layer 38 and the bottom pole 39 by using the combinations of forming methods listed in VI to VIII.

In the case of VI shown in FIG. 42, that is, to form both of the precursory top shield layer 37*p* and the precursory bottom pole layer 39*p* by electroplating, seven steps (steps F1 to F7) to be described below are required. In this case, the number of used masks is only one (the frame pattern 150).

Step F1: formation of the frame pattern 150

Step F2: formation of an electrode film for forming the precursory top shield layer 37*p*

Step F3: formation of the precursory top shield layer 37*p*

Step F4: formation of the precursory nonmagnetic layer 38*p*

Step F5: formation of an electrode film for forming the precursory bottom pole layer 39*p*

Step F6: formation of the precursory bottom pole layer 39*p*

Step F7: formation of the top shield layer 37, the nonmagnetic layer 38 and the bottom pole 39 by CMP In the case of VII shown in FIG. 42, that is, to form both of the precursory top shield layer 37p and the precursory bottom pole layer 39p by sputtering, five steps (steps G1 to G5) to be described below are required. In this case, the number of used masks is only one (the frame pattern 150).

Step G1: formation of the frame pattern 150

Step G2: formation of the precursory top shield layer 37p

Step G3: formation of the precursory nonmagnetic layer 38p

Step G4: formation of the precursory bottom pole layer 39p

Step G5: formation of the top shield layer 37, the nonmagnetic layer 38 and the bottom pole 39 by CMP In the case of VIII shown in FIG. 42, that is, to form the precursory top shield layer 37p by sputtering and form the precursory bottom pole layer 39p by electroplating, six steps (steps H1 to H6) to be described below are required. In this case, the number of used masks is only one (the frame pattern 150).

Step H1: formation of the frame pattern 150

Step H2: formation of the precursory top shield layer 37p

Step H3: formation of the precursory nonmagnetic layer 38p

Step H4: formation of an electrode film for forming the precursory bottom pole layer 39p Step H5: formation of the precursory bottom pole layer 39p Step H6: formation of the top shield layer 37, the nonmagnetic layer 38 and the bottom pole 39 by CMP As described above, in any case of VI to VIII shown in FIG. 42, the number of manufacturing steps and the number of masks required for forming the top shield layer 37, the nonmagnetic layer 38 and the bottom pole 39 can be reduced, and therefore the time required for forming a thin film magnetic head can be reduced. In the case of VII in particular, the number of manufacturing steps is minimized (five steps), so that the effect of reducing the manufacturing time becomes remarkable. Preferably, electroplating is used as the method of forming the precursory top shield layer 37p and the precursory bottom pole layer 39p in that the composition of Permalloy that is the materials of the layers 37p and 39p is properly controlled. Frame plating may be used as the method of forming the precursory top shield layer 37p and the precursory bottom pole layer 39p. Also in this case, the number of manufacturing steps and the number of used masks can be reduced, as compared to the case of the comparison.

Since other functions, effects and modifications of the method of manufacturing a thin film magnetic head according to the second embodiment are the same as those of the above-described first embodiment, the description thereof is omitted.

Figures 43A, 43B:
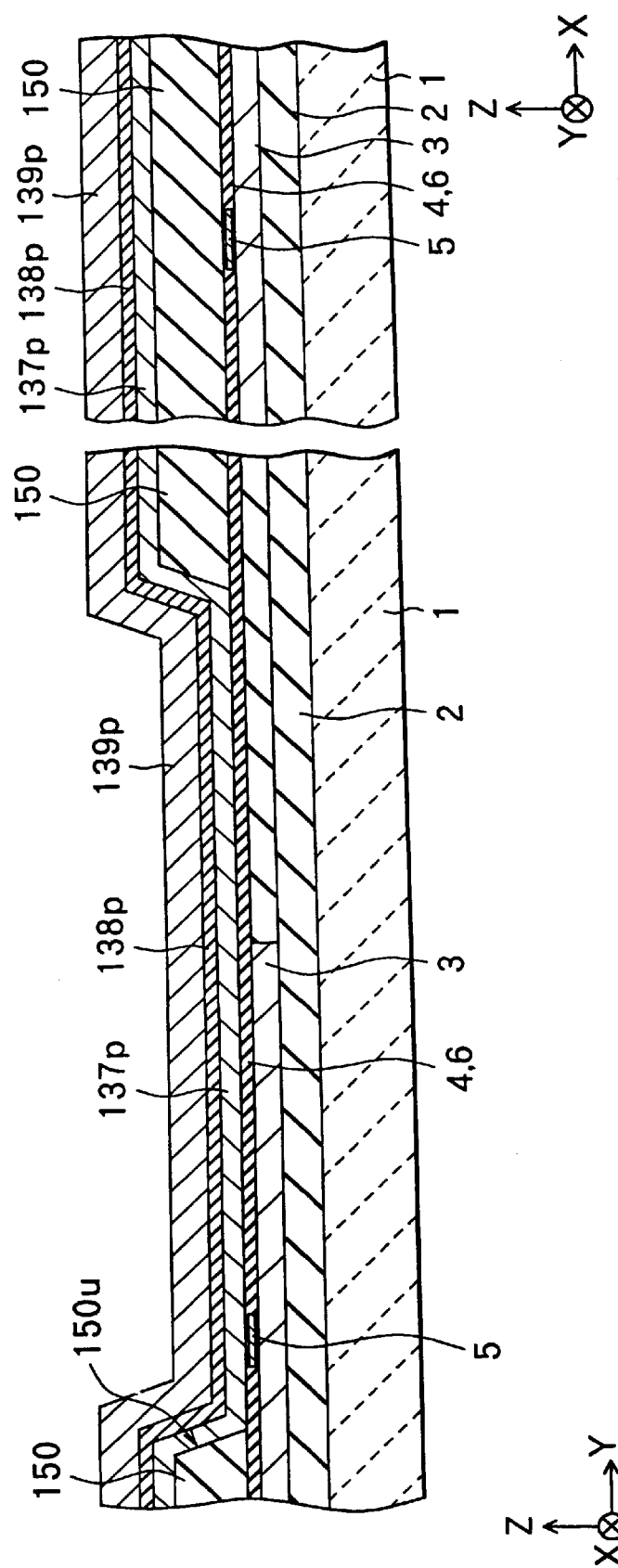
FIGS. 43A and 43B are cross sectional views for describing a step of another modification of the method of manufacturing a thin film magnetic head according to the second embodiment of the invention.
Figures 44A, 44B:
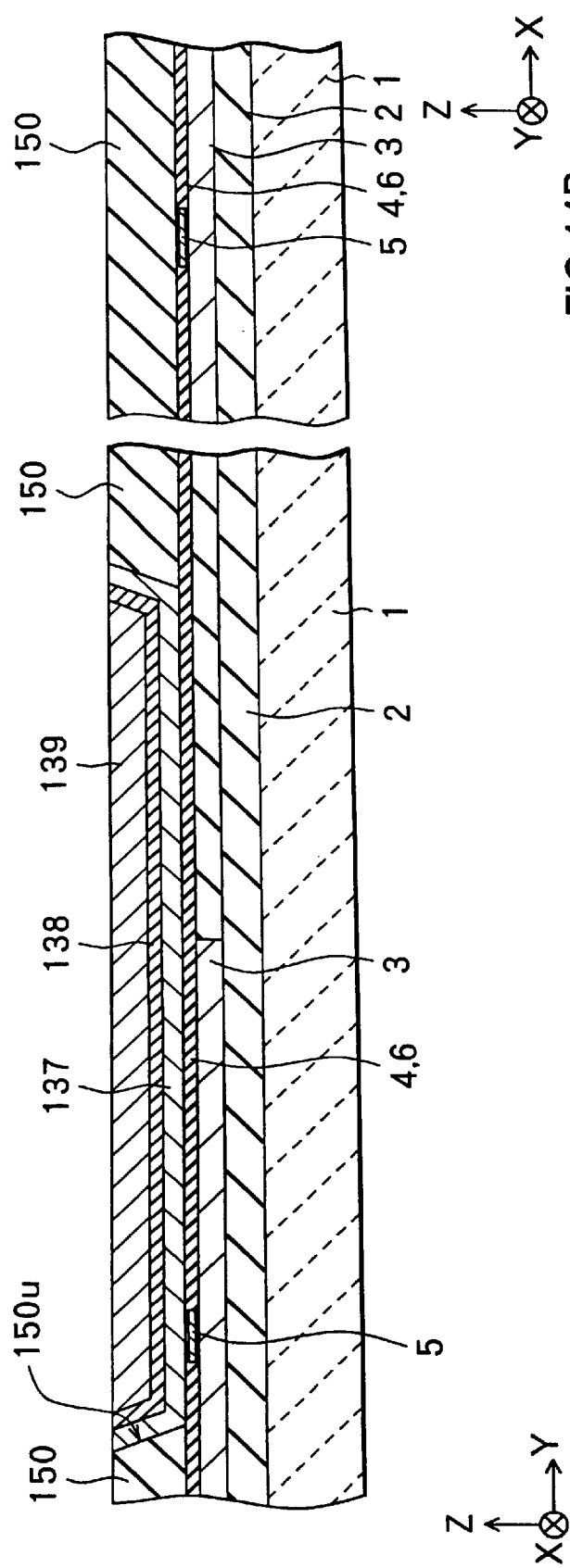
FIGS. 44A and 44B are cross sectional views for describing a step following the step of FIGS. 43A and 43B.

Although the invention has been described above by referring to some embodiments, the invention is not limited to these embodiments and various modifications of the invention are possible. For example, in the above-described second embodiment (see FIGS. 29A and 29B), an inner wall surface of the frame pattern 150 in the opening 150u is substantially perpendicular to the surface of the underlayer (the shield gap film 6), but the inner wall surface of the frame pattern 150 is not necessarily limited to this embodiment. For example, as shown in FIGS. 43A and 43B, the inner wall surface of the frame pattern 150 may be inclined with respect to the surface of the underlayer. Also in this case, a precursory top shield layer 137p, a precursory nonmagnetic layer 138p and a precursory bottom pole layer 139p are formed in sequence so as to cover the frame pattern 150, and thereafter the overall surface is polished by, for example, CMP until at least the frame pattern 150 is exposed, so that a three-layer structure constituted of a top shield layer 137, a nonmagnetic layer 138 and a bottom pole 139 can be formed as shown in FIGS. 44A and 44B. In this case, in particular, the bottom pole 139 bends more gently corresponding to the step portion between the surface of the frame pattern 150 and the surface of the underlayer (the shield gap film 6), as compared to the case shown in FIGS. 31A and 31B. Therefore, the occurrence of crystalline anisotropy is suppressed in a bending portion of the bottom pole 139, so that deterioration in the magnetic flux transmittance can be reduced. In FIGS. 44A and 44B, the manufacturing steps after forming the above-mentioned portions are substantially the same as the steps shown in FIGS. 32A and 32B and the following drawings. Also in the above-described first embodiment (see FIGS. 2A and 2B), the inner wall surface of the frame pattern 50 in the opening 50u may be inclined with respect to the surface of the underlayer (the shield gap film 6). Also in this case, the same effects can be obtained.

For example, in the above-described first embodiment, in a state in which the frame pattern is not formed, the magnetic layer portions such as the bottom shield layer 3, the top shield layer 7, the portions constituting the top pole 14 and the coil connecting wiring 14fh are formed by frame plating, but the method of forming the magnetic layer portions is not necessarily limited to this embodiment. For example, the above-mentioned magnetic layer portions may be formed by the same method as the method of forming the bottom pole 9. In this case, the number of manufacturing steps required for forming the above-mentioned magnetic layer portions can be reduced, and therefore the time required for manufacturing a thin film magnetic head can be greatly reduced. This change of the method of forming the magnetic layer portions is also applicable to the above-described second embodiment. Also in this case, a further reduction of the manufacturing time can be accomplished.

Figure 45:
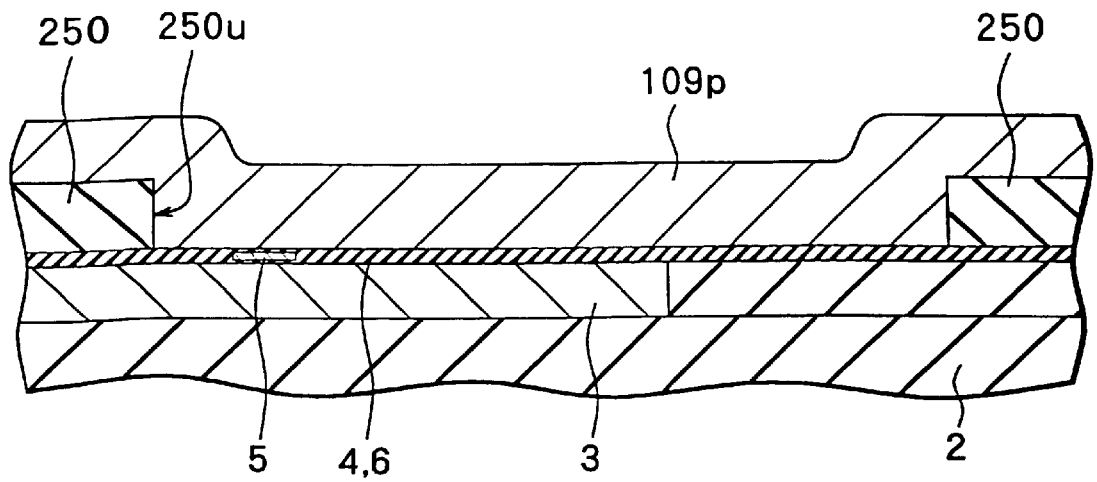
FIG. 45 is a cross sectional view for describing a step of still another modification of the method of manufacturing a thin film magnetic head according to the first embodiment of the invention.
Figure 46:
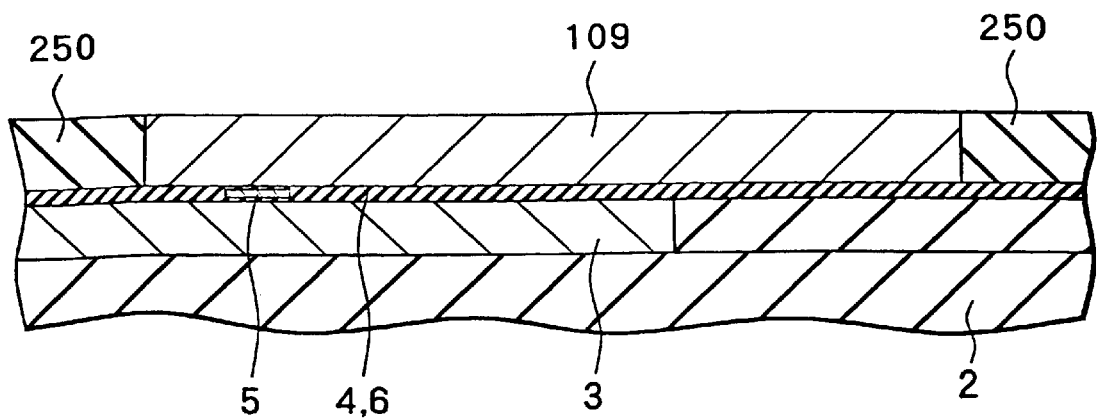
FIG. 46 is a cross sectional view for describing a step following the step of FIG. 45.

For example, in the above-described first embodiment, the nonmagnetic layer 8 is provided between the top shield layer 7 and the bottom pole 9 as shown in FIGS. 1A to 4B, but the provision of these layers is not necessarily limited to this embodiment, and the top shield layer may be integrally formed with the bottom pole without providing the nonmagnetic layer between the magnetic layer portions. Specifically, as shown in FIG. 45, after forming the shield gap film 6, a frame pattern 250 having an opening 250u is formed on the shield gap film 6, and subsequently a precursory layer 109p is formed over the overall surface. Then, as shown in FIG. 46, the precursory layer 109p is polished by, for example, CMP until at least the frame pattern 250 is exposed, and thus a bottom pole 109 functioning as a top-shield-layer-cum-bottom-pole-layer is formed in such a manner that the opening 250u of the frame pattern 250 is filled with the bottom pole 109. In this case, the step of forming the shield gap film 6 and the preceding steps are the same as the step of forming the shield gap film 6 shown in FIGS. 1A and 1B and the preceding steps, and the steps after forming the bottom pole 109 are the same as the step shown in FIGS. 5A and 5B and the following steps. In this case, the time required for manufacturing a thin film magnetic head can be further reduced. Preferably, the three-layer structure constituted of the top shield layer, the nonmagnetic layer and the bottom pole is adopted to avoid magnetic noise caused in the bottom pole 109 from reaching to the MR film 5. In FIGS.

45 and 46, the substrate 1 and the like are not shown, and the insulating layer 2 is, in part alone, shown. In FIGS. 45 and 46, the same parts as the elements shown in FIGS. 1A and 1B are indicated by the same reference numerals. Also in the above-described second embodiment, the top shield layer may be integrally formed with the bottom pole without providing the nonmagnetic layer 38 between the top shield layer 37 and the bottom pole 39. Also in this case, the same effects can be obtained. The precursory layer 109p corresponds to a specific example of "a precursory magnetic layer" of the method of forming a magnetic layer pattern of the invention, and the bottom pole 109 corresponds to a specific example of "a magnetic layer pattern" of the method of forming a magnetic layer pattern of the invention. The precursory layer 109p corresponds to a specific example of "a precursory magnetic layer" of the method of manufacturing a thin film magnetic head of the invention (claim 4), and the bottom pole 109 corresponds to a specific example of "a magnetic layer pattern forming at least part of two magnetic layers" of the method of manufacturing a thin film magnetic head of the invention (claim 4).

Although the method of manufacturing a composite thin film magnetic head has been described in the above-mentioned embodiments and the modifications thereof, the invention can be applied to a record-only thin film magnetic head having an inductive-type magnetic transducer for writing or a thin film magnetic head having an inductive-type magnetic transducer for both recording and reproducing. Moreover, the invention can be applied to a thin film magnetic head having a structure in which the element for writing and the element for reading are stacked in reverse order.

As described above, according to a method of forming a magnetic layer pattern of the invention, the method of forming a magnetic layer pattern includes: a first step of forming a frame pattern having an opening with a predetermined shape on the underlayer; a second step of forming at least a precursory magnetic layer as a preparatory layer for the magnetic layer pattern so as to cover at least a region including the opening of the frame pattern; and a third step of forming the magnetic layer pattern by polishing at least the precursory magnetic layer until at least the frame pattern is exposed. Therefore, the number of manufacturing steps required for forming the magnetic layer pattern can be reduced and thus the time required for manufacturing can be reduced, as compared to the case of forming the magnetic layer pattern without forming the frame pattern.

When the second step includes the steps of forming a plurality of precursory magnetic layers and forming a precursory nonmagnetic layer between the plurality of precursory magnetic layers and the third step includes polishing the plurality of precursory magnetic layers and the precursory nonmagnetic layer, the number of manufacturing steps required for forming the magnetic layer pattern can be reduced and thus the time required for manufacturing can be reduced, even if a precursory nonmagnetic layer is sandwiched between a plurality of precursory magnetic layers. Moreover, the precursory nonmagnetic layer can be patterned at the same time when the magnetic layer pattern is formed.

According to a method of manufacturing a thin film magnetic head of a first aspect of the invention, the method of manufacturing a thin film magnetic head includes: a first step of forming a frame pattern having an opening with a predetermined shape on a predetermined underlayer; a second step of forming a precursory magnetic layer as a preparatory layer for a magnetic layer pattern forming at least part of the two magnetic layers in at least a region including the opening of the frame pattern; and a third step of forming at least part of the two magnetic layers by polishing the precursory magnetic layer until at least the frame pattern is exposed. Therefore, the number of manufacturing steps required for forming at least part of the two magnetic layers can be reduced, as compared to the case of forming the precursory magnetic layer without forming the frame pattern. Accordingly, the time required for manufacturing a thin film magnetic head can be reduced.

According to a method of manufacturing a thin film magnetic head of a second aspect of the invention, the method of manufacturing a thin film magnetic head includes: a first step of forming the third magnetic layer on a predetermined underlayer; a second step of forming a frame pattern with an opening having a predetermined shape on the third magnetic layer; a third step of forming a precursory nonmagnetic layer as a preparatory layer for the nonmagnetic layer and then forming a precursory magnetic layer as a preparatory layer for the second magnetic layer, so as to cover at least a region including the opening of the frame pattern; and a fourth step of forming the nonmagnetic layer and the second magnetic layer by polishing both the precursory nonmagnetic layer and the precursory magnetic layer until at least the frame pattern is exposed. Therefore, the number of manufacturing steps required for forming the nonmagnetic layer and the second magnetic layer can be reduced, as compared to the case of forming the precursory nonmagnetic layer and the precursory magnetic layer without forming the frame pattern. Accordingly, the time required for manufacturing a thin film magnetic head can be reduced.

When the third magnetic layer is formed by growing a plated film and both the precursory nonmagnetic layer and the precursory magnetic layer are formed by sputtering, the composition of the third magnetic layer can be properly controlled, and therefore the occurrence of magnetic noise or the like can be avoided.

When both the third magnetic layer and the precursory magnetic layer are formed by growing a plated film and the precursory nonmagnetic layer is formed by sputtering, the respective compositions of the third magnetic layer and the second magnetic layer can be properly controlled, and therefore the occurrence of magnetic noise or the like can be avoided.

According to a method of manufacturing a thin film magnetic head of a third aspect of the invention, the method of manufacturing a thin film magnetic head includes: a first step of forming a frame pattern having an opening with a predetermined shape on a predetermined underlayer; a second step of forming a first precursory magnetic layer as a preparatory layer for the third magnetic layer, then forming a precursory nonmagnetic layer as a preparatory layer for the nonmagnetic layer, and then forming a second precursory magnetic layer as a preparatory layer for the second magnetic layer, so as to cover at least a region including the opening of the frame pattern; and a third step of forming the third magnetic layer, the nonmagnetic layer and the second magnetic layer by polishing the first precursory magnetic layer, the precursory nonmagnetic layer and the second precursory magnetic layer until at least the frame pattern is exposed. Therefore, the number of manufacturing steps required for forming the third magnetic layer, the nonmagnetic layer and the second magnetic layer can be reduced, as compared to the case of forming the first precursory magnetic layer, the precursory nonmagnetic layer and the second precursory magnetic layer without forming the frame pattern. Accordingly, the time required for manufacturing a thin film magnetic head can be reduced.

When the first precursory magnetic layer is formed by growing a plated film and both the precursory nonmagnetic layer and the second precursory magnetic layer are formed by sputtering, the composition of the third magnetic layer can be properly controlled, and therefore the occurrence of magnetic noise or the like can be avoided.

When both the first precursory magnetic layer and the second precursory magnetic layer are formed by growing a plated film and the precursory nonmagnetic layer is formed by sputtering, the respective compositions of the third magnetic layer and the second magnetic layer can be properly controlled, and therefore the occurrence of magnetic noise or the like can be avoided.

In the method of manufacturing a thin film magnetic head of the second and third aspects, when layers capable of magnetically shielding the second magnetic layer are used as the nonmagnetic layer and the third magnetic layer, the second magnetic layer can be magnetically separated from other regions.

In the method of manufacturing a thin film magnetic head of the first, second and third aspects, when the frame pattern is formed by using a nonmagnetic material, the magnetic layer pattern magnetically separated from the peripheral region therearound can be formed.

In the method of manufacturing a thin film magnetic head of the first, second and third aspects, when the frame pattern is formed by reactive ion etching, the frame pattern can be formed in a shorter time, as compared to the case where ion milling is used. This also contributes to the reduced time required for manufacturing a thin film magnetic head.

In the method of manufacturing a thin film magnetic head of the first, second and third aspects, when a material containing either nickel iron or iron nitride is used as a material of at least part of the first magnetic layer and the second magnetic layer, the propagation of a magnetic flux within at least part of the first magnetic layer and the second magnetic layer can be smoothed.

In the method of manufacturing a thin film magnetic head of the first, second and third aspects, when a material containing an amorphous alloy such as a cobalt-iron alloy or a zirconium-cobalt-iron alloy is used as a material of at least part of the first magnetic layer and the second magnetic layer, the propagation of a magnetic flux within at least part of the first magnetic layer and the second magnetic layer can be smoothed.

Obviously many modifications and variations of the present invention are possible in the light of the above teachings. It is therefore to be understood that within the scope of the appended claims the invention may be practiced otherwise than as specifically described.

What is claimed is:

1. A method of forming a magnetic layer pattern on a surface of a predetermined underlayer, including:
    a first step of forming a frame pattern having an opening with a predetermined shape on the underlayer;
    a second step of forming at least a precursory magnetic layer as a preparatory layer for the magnetic layer pattern so as to cover at least a region including the opening of the frame pattern; and
    a third step of forming the magnetic layer pattern by polishing at least the precursory magnetic layer until at least the frame pattern is exposed, wherein the second step includes the steps of:
        forming at least a pair of precursory magnetic layers; and
        forming a precursory nonmagnetic layer between each precursory magnetic layer, and
    the third step includes polishing the at least a pair of precursory magnetic layers and the precursory nonmagnetic layer.

2. A method of forming a magnetic layer pattern according to claim 1, wherein a nonmagnetic material is used as a material of the frame pattern.

3. A method of manufacturing a thin film magnetic head including a first magnetic layer and a second magnetic layer magnetically coupled to each other and having two magnetic poles which face each other, with a gap layer in between, in a recording-medium-facing surface, a thin film coil portion provided between the two magnetic layers, an insulating layer for insulating the thin film coil portion from the two magnetic layers, and a nonmagnetic layer and a third magnetic layer which are provided on the side opposite to the first magnetic layer with respect to the second magnetic layer, including:
    a first step of forming the third magnetic layer on a predetermined underlayer;
    a second step of forming a frame pattern having an opening with a predetermined shape on the third magnetic layer;
    a third step of forming a precursory nonmagnetic layer as a preparatory layer for the nonmagnetic layer and then forming a precursory magnetic layer as a preparatory layer for the second magnetic layer, so as to cover at least a region including the opening of the frame pattern; and
    a fourth step of forming the nonmagnetic layer and the second magnetic layer by polishing both the precursory nonmagnetic layer and the precursory magnetic layer until at least the frame pattern is exposed.

4. A method of manufacturing a thin film magnetic head according to claim 3, wherein the third magnetic layer is formed by growing a plated film, and both the precursory nonmagnetic layer and the precursory magnetic layer are formed by sputtering.

5. A method of manufacturing a thin film magnetic head according to claim 3, wherein both the third magnetic layer and the precursory magnetic layer are formed by growing a plated film, and the precursory nonmagnetic layer is formed by sputtering.

6. A method of manufacturing a thin film magnetic head according to claim 3, wherein layers capable of magnetically separating the second magnetic layer from other regions are used as the nonmagnetic layer and the third magnetic layer.

7. A method of manufacturing a thin film magnetic head according to claim 6, wherein a predetermined nonmagnetic material is used as a material of the frame pattern.

8. A method of manufacturing a thin film magnetic head according to claim 7, wherein a material containing either aluminum oxide or silicon oxide is used as the nonmagnetic material.

9. A method of manufacturing a thin film magnetic head according to claim 6, wherein the frame pattern is formed by reactive ion etching.

10. A method of manufacturing a thin film magnetic head according to claim 6, wherein a material containing either nickel iron or iron nitride is used as a material of at least part of the first magnetic layer and the second magnetic layer.

11. A method of manufacturing a thin film magnetic head according to claim 6, wherein a material containing an amorphous alloy is used as a material of at least part of the first magnetic layer and the second magnetic layer.

12. A method of manufacturing a thin film magnetic head according to claim 11, wherein either a cobalt-iron alloy or a zirconium-cobalt-iron alloy is used as the amorphous alloy.

13. A method of manufacturing a thin film magnetic head according to claim 3, wherein a predetermined nonmagnetic material is used as a material of the frame pattern.

14. A method of manufacturing a thin film magnetic head according to claim 13, wherein a material containing either aluminum oxide or silicon oxide is used as the nonmagnetic material.

15. A method of manufacturing a thin film magnetic head according to claim 3, wherein the frame pattern is formed by reactive ion etching.

16. A method of manufacturing a thin film magnetic head according to claim 3, wherein a material containing either nickel iron or iron nitride is used as a material of at least part of the first magnetic layer and the second magnetic layer.

17. A method of manufacturing a thin film magnetic head according to claim 3, wherein a material containing an amorphous alloy is used as a material of at least part of the first magnetic layer and the second magnetic layer.

18. A method of manufacturing a thin film magnetic head according to claim 11, wherein either a cobalt-iron alloy or a zirconium-cobalt-iron alloy is used as the amorphous alloy.

19. A method of manufacturing a thin film magnetic head including a first magnetic layer and a second magnetic layer magnetically coupled to each other and having two magnetic poles which face each other, with a gap layer in between, in a recording-medium-facing surface, a thin film coil portion provided between the two magnetic layers, an insulating layer for insulating the thin film coil portion from the two magnetic layers, and a nonmagnetic layer and a third magnetic layer which are provided on the side opposite to the first magnetic layer with respect to the second magnetic layer, including:
   a first step of forming a frame pattern having an opening with a predetermined shape on a predetermined underlayer;
   a second step of forming a first precursory magnetic layer as a preparatory layer for the third magnetic layer, then forming a precursory nonmagnetic layer as a preparatory layer for the nonmagnetic layer, and then forming a second precursory magnetic layer as a preparatory layer for the second magnetic layer, so as to cover at least a region including the opening of the frame pattern; and
   a third step of forming the third magnetic layer, the nonmagnetic layer and the second magnetic layer by polishing the first precursory magnetic layer, the precursory nonmagnetic layer and the second precursory magnetic layer until at least the frame pattern is exposed.

20. A method of manufacturing a thin film magnetic head according to claim 19, wherein the first precursory magnetic layer is formed by growing a plated film, and both the precursory nonmagnetic layer and the second precursory magnetic layer are formed by sputtering.

21. A method of manufacturing a thin film magnetic head according to claim 19, wherein both the first precursory magnetic layer and the second precursory magnetic layer are formed by growing a plated film, and the precursory nonmagnetic layer is formed by sputtering.

22. A method of manufacturing a thin film magnetic head according to claim 19, wherein layers capable of magnetically shielding the second magnetic layer are used as the nonmagnetic layer and the third magnetic layer.

23. A method of manufacturing a thin film magnetic head according to claim 19, wherein a predetermined nonmagnetic material is used as a material of the frame pattern.

24. A method of manufacturing a thin film magnetic head according to claim 23, wherein a material containing either aluminum oxide or silicon oxide is used as the nonmagnetic material.

25. A method of manufacturing a thin film magnetic head according to claim 19, wherein the frame pattern is formed by reactive ion etching.

26. A method of manufacturing a thin film magnetic head according to claim 19, wherein a material containing either nickel iron or iron nitride is used as a material of at least part of the first magnetic layer and the second magnetic layer.

27. A method of manufacturing a thin film magnetic head according to claim 19, wherein a material containing an amorphous alloy is used as a material of at least part of the first magnetic layer and the second magnetic layer.

28. A method of manufacturing a thin film magnetic head according to claim 27, wherein either a cobalt-iron alloy or a zirconium-cobalt-iron alloy is used as the amorphous alloy.

* * * * *